(12) United States Patent
Oosaka et al.

(10) Patent No.: US 6,278,484 B1
(45) Date of Patent: *Aug. 21, 2001

(54) FILM IMAGE INPUT SYSTEM

(75) Inventors: Shigenori Oosaka; Katuo Asami; Hitoshi Yozawa; Kazuo Ikari; Takeshi Misawa, all of Tokyo; Nakao Oi, Minami-Ashigara; Kuniharu Kitagawa, Minami-Ashigara; Tadayoshi Shibata, Minami-Ashigara, all of (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/417,364

(22) Filed: Oct. 13, 1999

Related U.S. Application Data

(62) Division of application No. 09/271,299, filed on Mar. 17, 1999, which is a division of application No. 08/379,281, filed on Jan. 27, 1995, which is a division of application No. 08/093,140, filed on Jul. 19, 1993, now abandoned, which is a continuation of application No. 07/755,475, filed on Sep. 5, 1991, now abandoned.

(30) Foreign Application Priority Data

| Sep. 13, 1990 | (JP) | 2-242971 |
| Sep. 14, 1990 | (JP) | 2-245112 |
| Sep. 14, 1990 | (JP) | 2-245118 |
| Apr. 30, 1991 | (JP) | 3-98660 |
| Apr. 30, 1991 | (JP) | 3-98883 |
| Apr. 30, 1991 | (JP) | 3-99042 |
| Apr. 30, 1991 | (JP) | 3-99081 |
| May 1, 1991 | (JP) | 3-99360 |
| May 1, 1991 | (JP) | 3-99361 |
| May 1, 1991 | (JP) | 3-99362 |
| May 1, 1991 | (JP) | 3-99363 |
| May 1, 1991 | (JP) | 3-99364 |
| Jul. 18, 1991 | (JP) | 3-178447 |
| Jul. 30, 1991 | (JP) | 3-190127 |

(51) Int. Cl.$^7$ .................................................. H04N 5/253
(52) U.S. Cl. ............................................. 348/96; 348/207
(58) Field of Search .................................. 348/373, 374, 348/375, 96, 97, 98, 207, 209; 352/166, 167, 34; 396/646, 647, 648, 649, 387, 411, 413, 408, 415, 416, 536; 358/487; H04N 5/253

(56) References Cited

U.S. PATENT DOCUMENTS 4,482,924  11/1984  Brownstein .

(List continued on next page.)

FOREIGN PATENT DOCUMENTS 1-28994  11/1989  (JP) .

(List continued on next page.)

Primary Examiner—Tuan Ho
(74) Attorney, Agent, or Firm—Sughrue, Mion, Zinn, Macpeak & Seas, PLLC

(57) ABSTRACT

A film image input system is disclosed which can use a film cartridge constructed in such a manner that it requires a small space for storing a developed still photo film and also can protect the film against dust and damage, and also which allows the film cartridge to be mounted into a cartridge mounting part very simply and positively. The film image input system 1 is arranged such that it reproduces the image of the developed still photo film 2 on a video monitor 18. The system uses a film cartridge 6 which comprises a cartridge main body having an outlet opening 7 for sending out the film 2 in the longitudinal direction thereof, a single spool which fixes one end of the film 2 in the longitudinal direction thereof and round which the whole length of the film 2 can be wound, and support means for supporting the spool in such a manner that it can be rotated in both directions. The film image input system includes film supply means 13 which is engageable with the spool of the film cartridge 6 to rotationally drive the spool in a direction to send out the film 2 from the cartridge main body and in a direction to rewind the film back into the cartridge main body. Due to this, the film image can be reproduced by one touch on the video monitor 18.

4 Claims, 54 Drawing Sheets

U.S. PATENT DOCUMENTS

| | | |
|---|---|---|
| 4,485,400 | 11/1984 | Brownstein . |
| 4,506,300 | 3/1985 | Fearnside . |
| 4,678,300 | 7/1987 | Beach . |
| 4,991,004 | 2/1991 | Hayashi et al. . |
| 5,006,873 | 4/1991 | Wash . |
| 5,010,410 | 4/1991 | Bernstein . |
| 5,016,030 | 5/1991 | Dwyer et al. . |
| 5,049,984 | 9/1991 | Moore et al. . |
| 5,093,680 | 3/1992 | Shigaki et al. . |
| 5,124,742 | 6/1992 | Yoshikawa . |
| 5,142,310 | 8/1992 | Taniguchi et al. . |
| 5,229,810 | 7/1993 | Cloutier et al. . |
| 5,309,242 | 5/1994 | Asami et al. . |
| 5,329,362 | 7/1994 | Takaiwa . |
| 5,430,478 | 7/1995 | Kaye et al. . |
| 5,541,691 | 7/1996 | Inoue . |

FOREIGN PATENT DOCUMENTS

| | | |
|---|---|---|
| 1-289948 | 11/1989 | (JP) . |
| 90/04301 | 4/1990 | (WO) . |

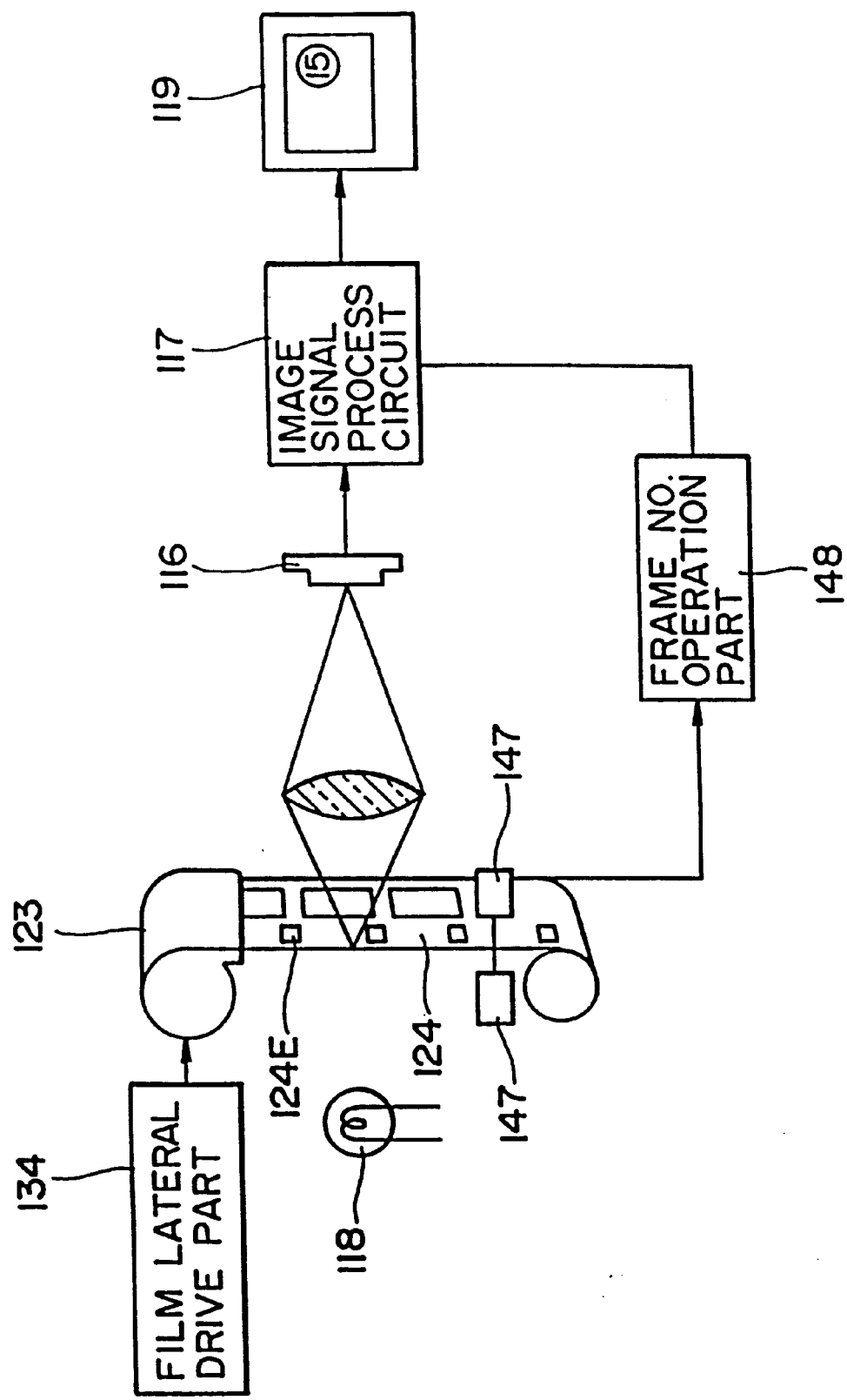

FIG. 50
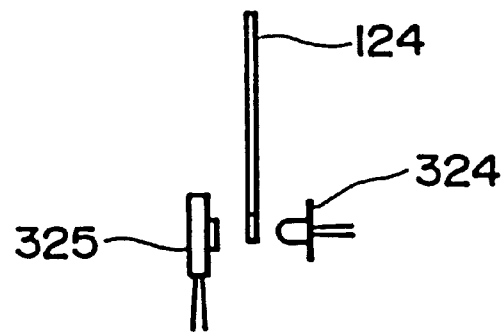
FIG. 51(A)     FIG. 51(B)
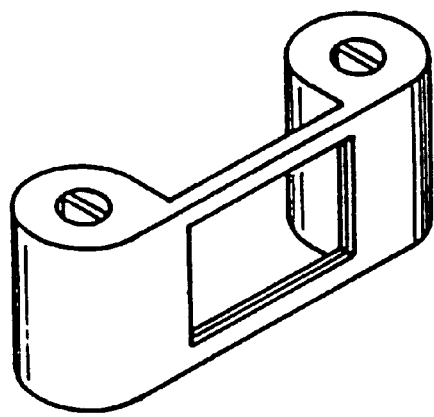 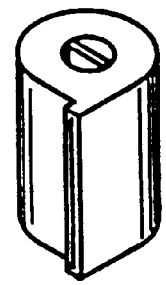
FIG. 52(A)     FIG. 52(B)
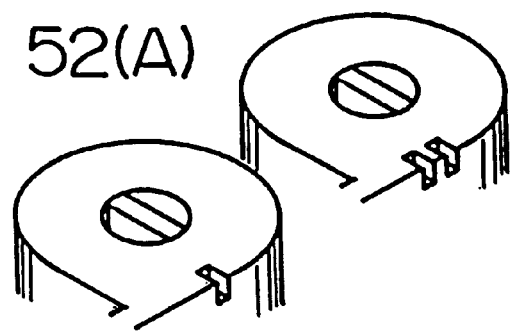

330

FILM IMAGE INPUT SYSTEM

This is a divisional of application Ser. No. 09/271,299 filed Mar. 17, 1999; which is a divisional of application Ser. No. 08/379,281 file Jan. 27, 1995, which is a divisional of application Ser. No. 08/093,140 filed Jul. 19, 1993 and later abandoned, which is a continuation of application Ser. No. 07/755,475, filed Sep. 5, 1991 and later abandoned.

BACKGROUND OF THE INVENTION

1. Field of the Invention

The present invention relates to a film image input system and, in particular, to a film image input system which picks up the image of a long roll of developed film for a still camera by use of image pickup means, converts the image into a image signal, and outputs the image signal to a video monitor to thereby reproduce the film image on the video monitor.

2. Description of the Related Art

Conventionally, a film image input system which is adapted to reproduce the image of a roll of developed film for a still camera on a video monitor is known from U.S. Pat. No. 4,482,924, U.S. Pat. No. 4,485,406, U.S. Pat. No. 4,506,300, WO90/04301 and the like.

For example, as shown in FIG. 61, a conventional film image input system 36 includes a film feed system comprising a supply reel 38 for feeding a long roll of developed film 37 for a still camera and a take-up reel 40, an image pickup optical system 41 comprising an illumination unit 41A and a taking lens 41B, an image sensor 48A formed of a CCD, and an image signal process circuit 48B.

The above-mentioned film 37 is fed frame by frame between the illumination unit 41A and taking lens 41B. The image of the film 37 is illuminated by an illuminating light from the illumination unit 41A, and the illuminated image is picked up by the taking lens 41B and is then formed on the image sensor 48A. By means of this, the image on the film 37 is converted by the image sensor 48A into an image signal and is then signal processed by the image signal process circuit 48B. After then, the signal is output to the video monitor 49 as a video signal and is displayed on the video monitor 49. Also, some of this type of conventional film image input systems include a zoom mechanism, a film scan mechanism (X-Y moving mechanism), an image sensor rotating mechanism and other mechanisms.

However, according to the above-mentioned film image input system, due to the fact that, after the developed photo film 37 is directly rolled round the supply reel 38 and take-up reel 40 within the system, the film is fed, it is complicated to handle the photo film 37 and also there is a danger that the film 37 may be damaged or stained.

For example, as shown in FIG. 61, when using the supply reel 38 round which the photo film 37 is wound, the supply reel 38 is loaded in a film loading part 39, and with one end of the outer-most roll of the film being extended manually, the film 37 is inserted through the image pickup system 41 and is wound round the take-up reel 40, and the image surface of the film 37 is set to the focal surface of the image pickup optical system 41, which completes preparation for reproduction. Also, when taking out the film after the reproduction of the whole picture is completed, with one end of the outer-most roll of the film wound the take-up reel 40 being extended manually, the film is wound round the supply reel 38, and a switch for rewinding is depressed to thereby rewind the film. And, after completion of the rewinding of the whole film, a stop button is pressed down to take out the supply reel 38 from the loading part 39. The above-mentioned conventional film image input system requires the troublesome operations mentioned above.

Also, in Japanese Patent Application Laid-Open (Tokkai) No. 1-289948, there is disclosed a film image input system using a film cartridge. However, this publication teaches no description of a film cartridge having a single spool and of an interface to the film image input system. For example, as shown in FIG. 62, when using a film cartridge 46 in which one end of a photo film 43 is fixed to a supply spool 44, the other end is fixed to a take-up spool 45, and these two spools 44 and 45 are spaced at a given distance from each other and are supported rotatably, the following problems arise:

That is, due to the fact that the design of a film image input system 42 is limited because the distance between the two spools 44 and 45 of the film cartridge 46 and also that the film cartridge 46 is constructed in such a manner to stretch over the image pickup optical system and thus the film image input system 42 must be larger in size in order to guarantee its loadability, a great space is necessary for storing the film image input system 42. Also, since the film surface is exposed by at least 1 frame on the front and rear sides thereof, there is a possibility that dust may enter from the exposed film surface. Further, the film cartridge 46 includes a picture frame 47 which makes it impossible to design freely a mechanism to coincide the focal surface of the image pickup optical system with the image surface of the film.

Also, in the case where the above-mentioned film has a magnetic recording layer, the arrangement of a recording/reproducing magnetic head with respect to the magnetic recording layer is limited by the shape of the film cartridge.

Further, the film is formed of acetate or polyester base material with a photosensitive emulsion coated thereon. For this reason, when compared with a magnetic tape such as an audio tape, a video tape and the like, the film is wider, easier to curl and has a greater rigidity, which gives rise to the following problems:

In other words, as shown in FIG. 63, the film (especially, the developed film) is heavily curled (see FIG. 63 (A)) and, if such curled film is to be stretched, it will be curved in the width direction thereof, as shown in FIG. 63 (B). Also, when one end of the film is wound automatically round the take-up reel, the leading end of the heavily curled film gets into the opposite side of the take-up reel to the winding side thereof, which makes it impossible for the film to be taken up. Further, since the great rigidity of the film provides a great restoring force for the film that has been taken up, the film is easy to flex or come loose in winding. Moreover, since the film has a broad width but has a limited number of frames, the film has a relatively small winding diameter, with the result that the film cartridge is different in shape from a tape cassette. For this reason, when loading the film cartridge into the cartridge loading part, there is required a cartridge loading mechanism which is different from a tape cassette loading mechanism.

Further, in order that the film image input system can always reproduce the film image in an excellent manner, it is necessary to take measures to prevent damage of the film and to correct the fading of the film image.

A film includes negative and positive films and, therefore, it is necessary to check whether a film is a negative film or a positive film. It is troublesome that, after whether the film is positive or negative is confirmed visually, the image signal processings in the film image input system are manually switched according to the kinds of the film. Also, it may happen that nothing is taken when the film image input system is started. In this case, it cannot be decided whether this is because the film is not set or because a frame in which nothing is taken is picked up.

When the winding and rewinding of the film is performed by use of a single reel motor, it is considered that a driving force is transmitted from the reel motor through a swing gear mechanism to a supply reel or to a take-up reel. However, the swing gear mechanism swings its head portion according to the directions of rotation of the reel motor and transmits the driving force to the supply or take-up reel only in the film winding direction thereof and, therefore, in the film loading (that is, when the film is sent out from the film cartridge), it is not possible to drive the supply reel in the film sending direction by use of the swing gear mechanism.

Also, when the film and image pickup means are moved relatively to each other to execute the X-direction and Y-direction scans of the film image, it is considered that the X-direction scan is carried out by sending the film. In this case, a speed ratio between the frame sending speed and the X-direction scan speed requires on the order of 20 times but this speed ratio cannot be realized only by changing the speed of rotation of the reel motor, with the result that the film frame sending and the X-direction scan cannot be executed by the single reel motor. Also, when executing the frame sending, a notch and the like indicating the position of the frame can be provided in every film frame and thus the film frames can be sent one by one accurately by detecting such notch and the like by use of a frame detector. However, as described above, if the X-direction scan is carried out by sending the film, then the same notch may be detected again in the next frame sending, as the scan position prior to the frame sending may be. That is, in this case, the same frame will be reproduced again.

In addition, in the case where the film has a magnetic recording layer and trimming information and the like are magnetically recorded into and reproduced from the magnetic recording layer in the frame sending, the frame sending speed must be maintained constant.

SUMMARY OF THE INVENTION

The present invention aims at eliminating the drawbacks found in the above-mentioned conventional film image input systems.

It is an object of the invention to provide a compact and low-cost film image input system which can use a film cartridge having a small space for storing a roll of developed film for a still camera and free from dust and damage, can load the film cartridge into a cartridge loading part very simply and positively, and allows free design of the sizes and positions of various mechanisms.

It is another object of the invention to provide a film image input system which, when a magnetic recording film is used, is capable of magnetically recording and reproducing a film very quickly in feeding the frames of the film, and also capable of maintaining a film feeding speed constant to realize an excellent magnetic recording and reproducing operation in a simple structure.

It is a further object of the invention to provide a film image input system which can flatten a developed, heavily curled still photo film fed to an image pickup area by film feed means, can surely guide the leading end of the film to the winding side of a taking-up shaft when the film is fed out from a film cartridge, can prevent striped damage which could occur on a developed still photo film during the feeding of the film, and can prevent flexing of the surface of the film or loosening of the winding of a reel when the film is fed or stopped.

It is a still further object of the invention to provide a film image input system which can perform a film feeding operation including a high speed film feeding such as the film frame feeding, quick feeding and the like and a low speed film feeding such as a scan feeding with a single reel motor by use of a swing gear mechanism, can rotate a supply reel in the reverse direction as well, can send out a film from a film cartridge, and can surely perform a frame feeding operation to the next frame irrespective of the current scan position by means of scan feeding.

In order to achieve the above objects, according to the invention, there is provided a film image input system adapted to reproduce on a video monitor the image of a long and narrow roll of developed film for a still camera, the film image input system using: a film cartridge including a cartridge main body for storing the above film and having an outlet opening for feeding out the film in the longitudinal direction thereof, a single spool for fixing one end of the film in the longitudinal direction thereof to wind the whole length of the film round the fixed end, and support means for supporting the spool in such a manner that the spool can be rotated in both directions; and, the film image input system comprising: film supply means engageable with the spool of the film cartridge to rotationally drive the spool in a direction to feed out the film from the cartridge main body as well as in a direction to rewind the film into the cartridge main body. The film image input system further comprises a cartridge holder for storing the film cartridge, the cartridge holder including holding means for holding the film cartridge in such a manner that the film cartridge floats a given amount in the axial direction of the spool, the cartridge holder, when opened, allowing the film cartridge to be inserted or taken out from the axial direction of the spool and, when closed, allowing the spool of the film cartridge to be positioned on a supply reel; holing means including a freely rotatable spool holding member and capable of holding the spool holding member in such a manner that the spool holding member can be advanced and retreated with respect to the supply reel; and, drive means for driving the holding means to advance and retreat the spool holding member with respect to the supply reel, and for causing the spool holding member to push the film cartridge within the cartridge holder into the supply reel to thereby load the lower end portion of the spool into the head portion of the supply reel as well as to load the spool holing member into the upper end portion of the spool.

Also, the present invention is characterized in that it uses a film on which a magnetic recording layer is coated, that magnetic heads touchable with the magnetic recording layer of the film are disposed respectively on the entrance and exit sides of the image pickup area of the film, that the magnetic head disposed on the entrance side reads out the information on a frame entering the image pickup area from the magnetic recording layer at the upper or lower end of the frame, and that the magnetic head disposed on the exit side writes information into the magnetic recording layer at the upper or lower end of a frame leaving the image pickup area. The present invention further includes detect means for detecting the film winding diameter of a take-up reel or the data that corresponds to the film winding diameter, and control means for finding a motor drive voltage from a table or a calculation expression which shows the motor drive voltages for the film winding diameter or the data corresponding to the film winding diameter in order to maintain a film feeding speed at a previously set, constant speed, and for outputting the motor drive voltage to a reel motor.

Further, the present invention is characterized by film guide members respectively disposed on the entrance and exit sides of an image pickup area to be picked up by image pickup means for guiding a film to be fed by film feed means in such a manner that the film is curved in an S shape or in a Z shape. The film guide members are respectively guide rollers which are touchable with at least the film image surface of the film and are rotatable with the movement of film. The present invention further includes a film storage part surrounding the winding shaft of a take-up reel, and a guide member extending out from the film entrance/exit opening of the film storage part toward the above-mentioned winding shaft. The guide member, when the film is fed out from the film cartridge, guides the leading end of the film to the winding side of the winding shaft and at the same time comes into contact with the outer-most roll of the film wound round the winding shaft and then retreats. Moreover, the present invention further includes a first reel brake for braking the supply reel, a second reel brake for braking the take-up reel, and control means for controlling the first and second reel brakes such that the first and second reel brakes always brake the supply reel and take-up reel while the film is being loaded between the supply and take-up reels.

In addition, the present invention is characterized by: frame detect means for detecting a notch, a hole or the like which is formed at each of frames of a film to thereby detect the frame; film feed means for feeding the film until the frame detect means detects the next frame to thereby feed the frame, and for feeding the film within a scan range narrower than the lateral width of one frame after the frame feeding to thereby execute a scanning operation in the film feeding direction; scan position detect means for detecting a scan position after the frame feeding with the frame detect position as a reference position; and, control means for enabling the frame detect means to detect the next frame after a scan position detected by the scan position detect means in the frame feeding exceeds at least the scan range. Also, the present invention further includes: a reel motor which can be rotated reversibly and of which rotary speed varies according to input voltages; a first swing or oscillating gear mechanism which can be rotated according to the direction of rotation of the reel motor to transmit a rotary drive force to a supply reel or a take-up reel; a second oscillating gear mechanism which can be rotated according to the direction of rotation of the reel motor to transmit a rotary drive force to the supply reel or the take-up reel at a different reduction gear ratio from that of the first oscillating gear mechanism; and, control means for controlling the rotary range of one of the first and second oscillating gear mechanism to thereby enable the other oscillating gear mechanism to transmit the rotary drive force. In addition, the present invention still further includes means which fixes an oscillating gear mechanism unrotatable in such a manner that a rotary drive force can be transmitted through the oscillating gear to the supply reel and also enables the supply reel to be driven in a direction where the film is sent out from the film cartridge.

According to the invention, by using a compact cartridge having a single spool round which a film is wound, the whole cartridge can be disposed near to one side of a film image input system and, therefore, the freedom of design relating to the number, size and arrangement of various mechanisms in the central part and the other side of the system can be expanded. Also, the film cartridge can be mounted through a cartridge holder to a predetermined cartridge mounting part. The cartridge holder includes holding means for holding the film cartridge in such a manner that the film cartridge is floated a given amount in the axial direction of the spool, and also the cartridge holder is constructed such that it can be opened and closed, that is, when it is opened, the film cartridge can be inserted from the axial direction of the spool or can be taken out, and when it is closed, the spool of the film cartridge can be placed on a reel. The film cartridge with the spool placed on the reel is then loaded into a predetermined position by holding means which includes a rotatable spool holding member and holds the spool holding member in such a manner that the spool holding member can be advanced and retreated with respect to the reel. That is, the holding means is driven to move the spool holding member toward the reel and the spool holding member is used to push in the film cartridge within the cartridge holder, so that the lower end side of the spool can be loaded into the head portion of the spool and the spool holding member can be loaded into the upper end side of the spool. Due to this, the cartridge can be mounted to the cartridge mounting part in a very simple and positive manner.

According to another embodiment of the invention, due to the fact that magnetic heads contactable with the the magnetic recording layer of the film are disposed on the entrance and outlet sides of a film image pickup area respectively, the trimming information and the like of the frame entering the image pickup area can be read out from the magnetic recording layer of the frame by the magnetic head disposed on the entrance side in frame feeding, and at the same time the information of the frame leaving the image pickup area can be written into the magnetic recording layer of the frame by the magnetic head on the outlet side. This eliminates the need to carry out the forward and reverse feedings of the film repetitively when the film is recorded into and reproduced from the magnetic recording layer, so that the film recording and reproduction can be executed quickly in the frame feeding.

According to still another embodiment of the invention, a film can be guided in a curved manner, that is, in an S-like or Z-like shape by film guide members respectively disposed on the entrance and outlet sides of an image pickup area. This allows the film to be stretched or flattened without giving a great tension to the film and thus allows a taking lens to be focused over the whole of one frame. Also, two guide rollers are used as the film guide members, respectively. The guide rollers can contact with at least the film image surface of the film and can rotate as the film moves. This prevents the film against stripe d damage which could otherwise occur in the film feeding. Further, in feeding the film from the film cartridge, the leading end of the film can be positively guided to the winding side of a take-up shaft by use of a guide member which is provided in a manner to extend from a film insertion and removal opening in a film storage part toward the take-up shaft. While the winding diameter of the film wound round the take-up shaft increases gradually, the guide member contacts with the outer-most winding or roll of the film wound round the take-up shaft and then retreats. Moreover, while the film is being loaded between a supply reel and a take-up reel, the supply and take-up reels are always to be braked simultaneously. This can give the film a proper tension to thereby prevent the film surface from being flexed or the winding of the reel from being loosened. By applying soft braking to the reel that is driven by reel drive means as well, there is eliminated the possibility that the film may be flexed or the film winding may be loosened even when the reel to be driven is switched by an oscillating gear mechanism or the like. In addition, when the feeding of the film is stopped while the film is being loaded between the supply and take-up reels, full braking is applied to the supply and take-up reels to thereby prevent the film surface from flexing or the winding of the reel from loosening during the film feeding stop.

According to yet another embodiment of the invention, the scan position after a frame is fed is detected by scan position detect means with a frame detect position as a reference position. And, after the scan position detected by the scan position detect means in the frame feeding exceeds at least a predetermined scan range, the next frame can be detected by frame detect means. That is, after the frame feeding is started, until the scan position detected by the scan position detect means exceeds the above-mentioned scan range, the frame detection by the frame detect means is nullified to thereby eliminate the possibility that the frame detect means may detect again a notch or the like formed in the same frame. Also, a rotary drive force is transmitted from a single motor through first and second oscillating gear mechanisms to a supply reel or to a take-up reel. A gear train to transmit the drive force through the first oscillating gear mechanism is different in the reduction ratio from a gear train to transmit the drive force through the second oscillating gear mechanism. Thus, by selecting either of the first and second oscillating gear mechanisms to transmit the drive force therethrough, the rotational speed of the supply reel or take-up reel can be changed. That is, by selectively using either of the first and second oscillating gear mechanisms according to cases, the rotational speed of the supply or take-up reel can be changed beyond a range of speed changeable by a voltage applied to the reel motor. This allows the film feeding speed to be changed, for example, on the order of 22 to 23 times and, therefore, a wide variety of film feedings ranging from a high speed film feeding necessary in feeding the film quickly to a low speed feeding necessary in scan feeding the film image can be executed by the single reel motor. There is provided control means for controlling the range of rotation of the first and second oscillating gear mechanisms and only one of the two gear mechanisms can be used to transmit the rotary drive force by the control means. Further, the oscillating gear mechanisms can be rotated respectively according to the direction of rotation of the reel motor to transmit the rotary drive force to the supply reel or take-up -reel and, therefore, normally the supply reel or take-up reel can be rotated only in a given direction. However, according to the invention, the oscillating gear mechanisms are fixed unrotatable, so that the supply reel can be rotated in the reverse direction as well and thus the film can be sent out from the film cartridge.

BRIEF DESCRIPTION OF THE DRAWINGS

The exact nature of this invention, as well as other objects, features and advantages thereof, will be readily apparent from consideration of the following specification relating to the accompanying drawings, in which like reference character s designate the same or similar parts throughout the figures thereof and wherein:

FIG. 11 is a block diagram of main portions of a film image input system including an embodiment of frame detect means;

FIG. 50 is a view of another embodiment of the light projecting and receiving means respectively shown in FIG. 48;

FIG. 51(A) is a perspective view of a film cartridge having two spools (that is, two shafts);

FIG. 51(B) is a perspective view of a film cartridge having a spool (one shaft);

FIG. 52(A) is a perspective view of main portions of a film cartridge having a notch formed therein;

FIG. 52((B) is a perspective view of main portions of a film cartridge having two notches formed therein;

DESCRIPTION OF THE PREFERRED EMBODIMENT

Detailed description will hereunder be given of the preferred embodiments of a film image input system according to the present invention with reference to the accompanying drawings.

First Embodiment

Figure 1:
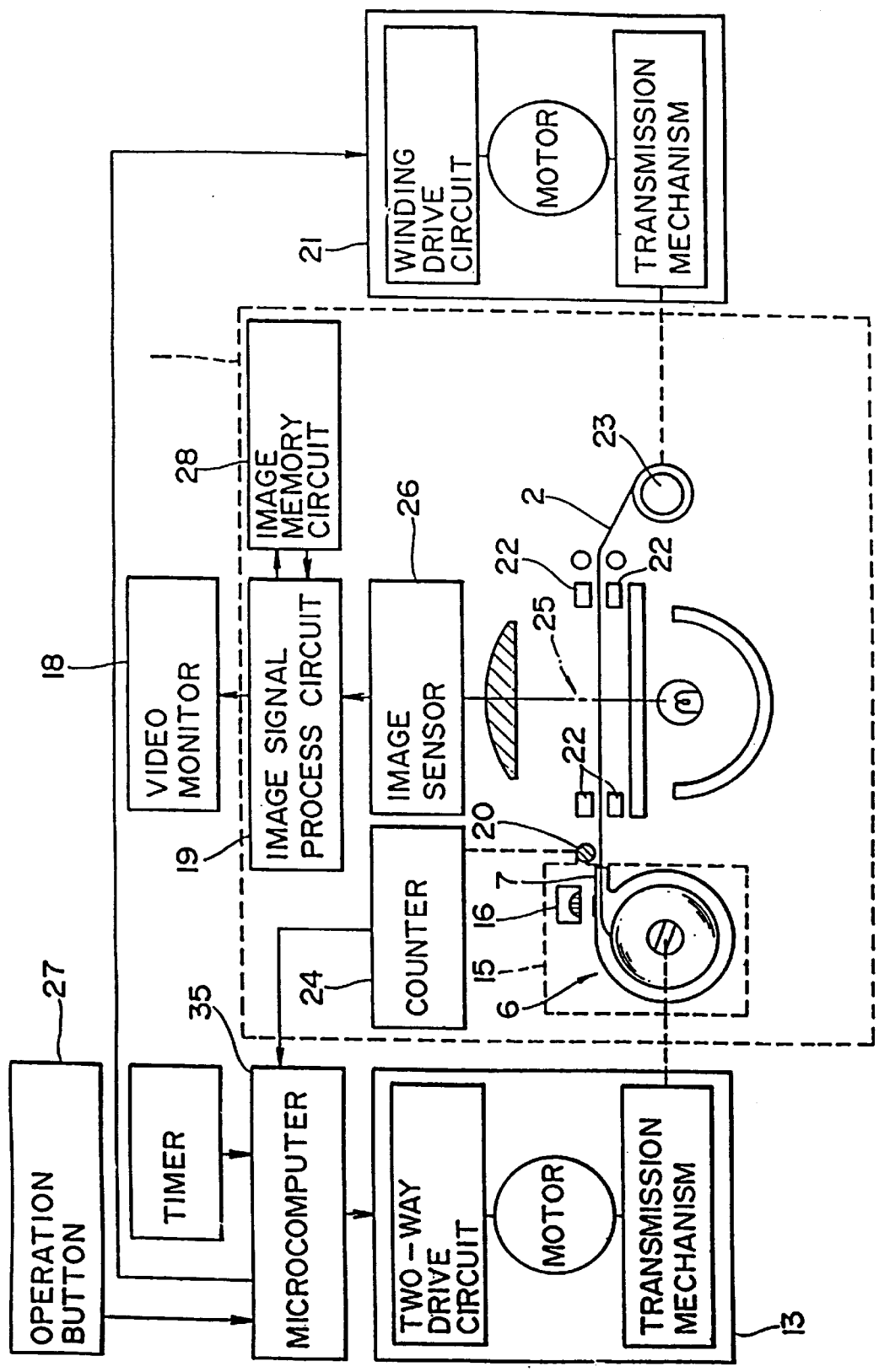
FIG. 1 is a block diagram of a first embodiment of a film image input system according to the invention.

In FIG. 1, there is shown a block diagram of a first embodiment of a film image input system according to the present invention. As shown in FIG. 1, a film 2 (see FIG. 3) used in the film image input system 1 has a plurality of perforations 3, one for one image. The perforations 3 are formed in such a manner that they correspond to the positions at which images are recorded. A perforation exists so as to correspond to at least a virtual image position 4 right in front of the image of the first frame and a perforation exists so as to correspond to at least a virtual image position 5 right in the rear of the image of the final frame.

Figure 3:
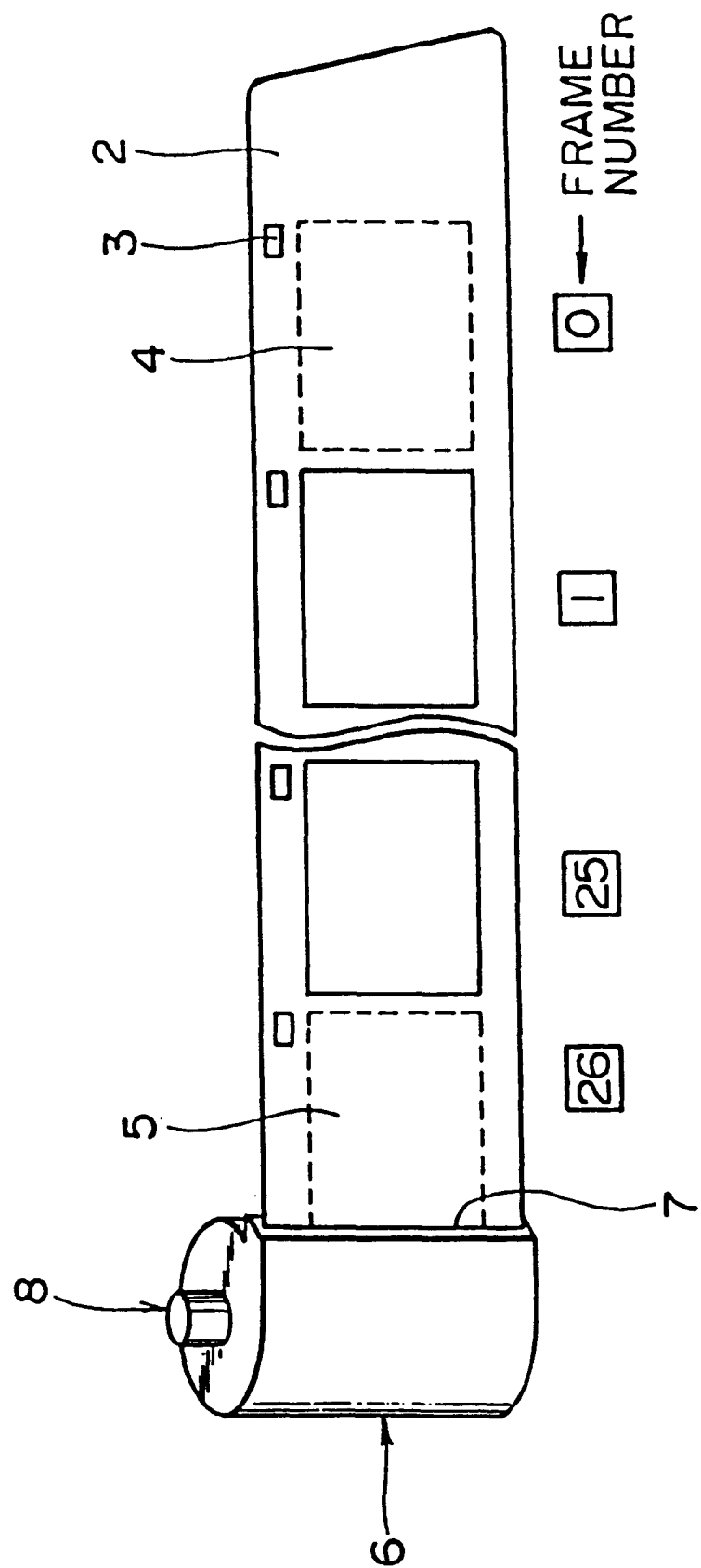
FIG. 3 is a view of an embodiment of a film cartridge to be applied to the film image input system shown in FIG. 1.
Figure 4:
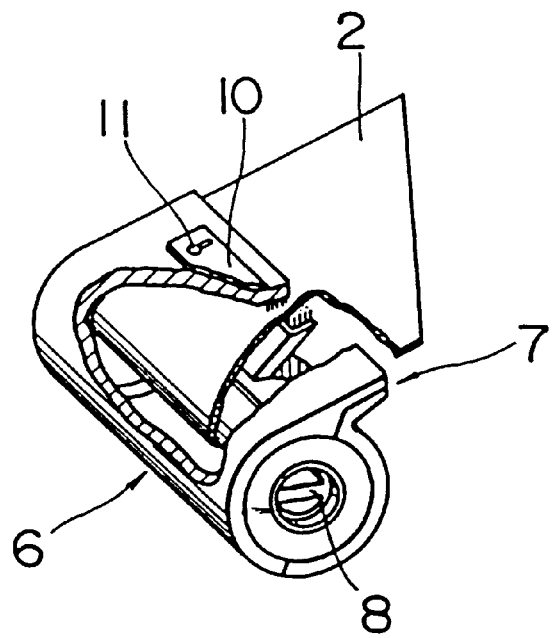
FIG. 4 is a perspective view partly in section of the above film cartridge.
Figure 5:
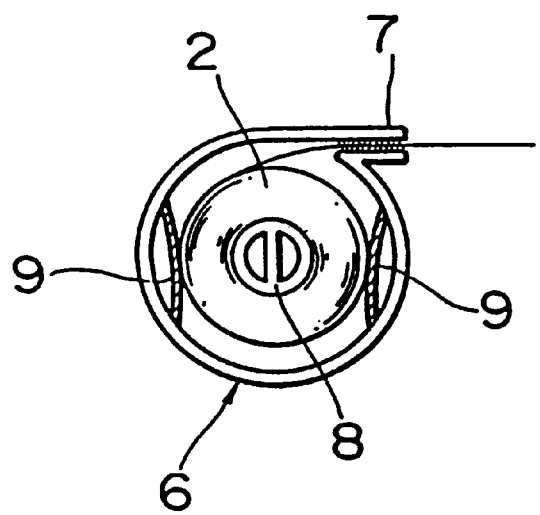
FIG. 5 is a transverse sectional view of the film cart ridge.

Also, a film cartridge 6 used in the film image input system has a single outlet opening 7 for feeding out the film 2 and a single spool 8, as shown in FIGS. 3 to 5. The spool 8 fixes one end of the film 2 in the longitudinal direction thereof and is supported by a main body of the film cartridge 6 in such a manner that it is rotatable in both directions to feed out and to take up the film 2. Before the film 2 is loaded into the film image input system, the the whole length of the film 2 is normally wound round the spool 8 and is stored within the film cartridge 6.

In order that the film 2 can be fed out smoothly from the interiors of the film cartridge 6 by rotating the spool 8 of the film cartridge 6, the film cartridge 6 includes means for preventing the winding of the film from loosening. According to an embodiment of the film winding loosening preventive means, as shown in FIG. 5, a plurality of plate springs 9 are provided in the interiors of the film cartridge 6 to thereby be able to keep the winding diameter of the film 6 to a minimum in any case and, therefore, when the spool 8 is given a rotary force in a direction to feed out the film 2, the rotary force can be transmitted efficiently without waste in the longitudinal direction of the film 2 so that the leading end of the film 2 can be sent out smoothly from the film outlet opening 7 of the film cartridge 6.

Figure 2:
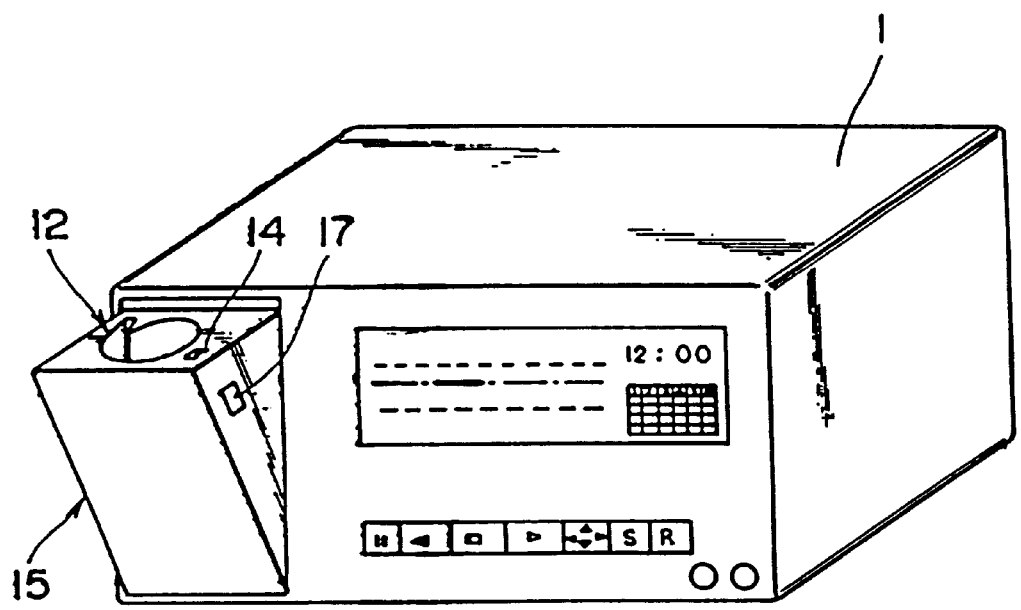
FIG. 2 is an exterior view of the film image input system shown in FIG. 1.

According to another feature of the film cartridge 6, the film cartridge 6, as shown in FIG. 4, includes a label 10 which is used display the fact that the film 2 stored within the film cartridge 6 is already developed and to display the kinds of the film (including the number of frames taken, a negative film or a reversal film, and the like), and a mark 11 printed on the label, the mark 11 corresponding to the display of the label and being detectable optically. The film image input system 1 according to the invention, as shown in FIG. 2, includes a cartridge storage opening 12 for storing the film cartridge 6. And, the opening 12 has a shape substantially identical with the shape of the film cartridge 6, which eliminates the possibility that a different kind of cartridge can be loaded in by mistake.

Also, the film image input system 1, as shown in FIG. 1, further includes film supply means 13 which can be rotationally driven in both directions, and the film supply means 13 is disposed at a position to be engageable with the spool 8.

Further, the film image input system 1 further includes loading completion detect means 14 (FIG. 2) which can detect that the loading of the film cartridge 6 has been completed when the film cartridge 6 has been inserted into the storage opening 12 and the storage opening 12 has been closed. Also, the cartridge storage part 15 includes optical mark readout means 16 (FIG. 1) which confirms the fact that the film 2 has already been developed and the kind of the film 2, allows lock means 17 to lock the storage opening so that the opening cannot be opened by mistake, and after then switches an image signal process circuit 19 for a video monitor 18 in accordance with the kind of the film, with the result that the supply means 13 starts to rotate in the direction to feed out the film 2.

However, if the film cartridge 6 does not include the label 10 with the printed optical mark 11 for displaying the developed film or if the contents of the printed mark 11 are different, then the film image input system 1 displays an alarm to that effect and enters the wait state. Also, according to another function of the present system 1, the system 1 displays the above-mentioned alarm and allows the closed storage opening 12 to open automatically so that the film cartridge 6 can be taken out.

If it is confirmed that the film is a developed one, as expected, then the leading end of the film 2 is fed out from the film outlet opening 7 in the cartridge main body by means of the rotational movement of the supply means 13. Also, at a position adjacent to the cartridge storage part 15 and where the perforation 3 of the film 2 exists, there is disposed an optical sensor 20 which is used to detect the presence or absence of the film 2, that is, the optical sensor 20 confirms the fact that the film 2 has been sent out. The width-direction end of a developed negative film (FIG. 3) can be detected optically because normally it is slightly colored. Also, in the case of a reversal film, if the above-mentioned end reaches an undeveloped area, since the end is virtually opaque, then the end of the film can be detected some time after the end has passed.

Film take-up means 21, substantially at the same time when the film supply means 13 starts to rotate, rotates slightly faster than the film supply means 13 at the speed of the longitudinal direction of the film 2.

In order to pick up the film image, the film image input system 1 includes a pair of opening frames 22 as means which is used to provisionally stop the film 2 at a prescribed position to thereby form a picture screen. The opening frames 22 are arranged to open and close in synchronization with the movements of the film supply means 13 and film take-up means 21. That is, the opening frames 22 are closed only when both of the means 13, 21 are stopped and, in other cases, the opening frames 22 are opened spaced from each other at such a distance that does not interfere with the passage of the film 2. For this reason, the leading end of the film 2 is able to pass easily between the two opening frames 22 and reach the take-up side spool 23. Since the take-up side spool 23 is constructed in such a shape that allows easy winding of the leading end of the film 2, the spool 23 starts to take up the film 2 round itself.

The film supply means 13 stops its movement at a given interval after it confirms that the film 2 has been sent out, and at the same time the film supply means 13 applies to the film 2 a tension in the opposite direction to the advancing direction of the film 2. The tension is used only to prevent the film 2 from loosening and thus it is not so strong as can damage the film 2.

The film presence/absence detect means 20 is also able to detect the perforations 3 (FIG. 3) and is disposed at a position to be able to detect any one of the perforations when the first frame of the film image reaches the position where the opening frames 22 are formed. A counter 24 connected to the film presence/absence detect means 20 counts the number of the perforations 3 detected and, when the first frame of image reaches the position of the opening frames 22, the film take-up means 21 is caused to stop and at the same time the opening frames 22 are closed.

Then, the film image is projected through the image pickup optical system 25 on to the image sensor 26 and it is then reproduced through the image signal process circuit 19 on the video monitor 18 as a video image.

After the lapse of a given time or when a frame feed button 27 is depressed, the opening frames 22 are opened and, after this opening, the film take-up means 21 resumes its rotation. During this, the video monitor 18 is still displaying the first frame video image thereon by means of an image signal memory circuit 28 provided in the image signal process circuit 19.

The following advancement of the film 2 and detection of the perforations as well as the stop of the film 2 and the sequences of reproduction are almost similar to the those of the first frame.

If the number of frames taken that is displayed by a mark 11 (FIG. 4) optically detectable by the film cartridge 6 coincides with the number of frames reproduced by the film image input system 1 (FIG. 1), the film image input system 1 stops the winding operation of the film take-up means 21, terminates the reproduction of the video images, and rotates the film supply means 13 in the opposite direction to the film feeding direction to thereby rewind the film 2 into the film cartridge 6. In this state, the opening frames 22 are left closed and the film take-up means 21 is applying to the film a tension in the opposite direction to the advancing direction of the film 2. And, the film presence/absence detect means 20 detects the perforations 3 passing therethrough and thus subtracts the value of the counter 24.

The time when the value of the counter 24 becomes (−1) corresponds to the time when the whole film has passed through the film presence/absence detect means 20. After then, at a given interval, the fact that the film cartridge 6 can be discharged is displayed and at the same time the lock 17 (FIG. 2) of the cartridge storage opening 12 is removed, or the cartridge storage opening 12 is automatically opened to thereby enable the film cartridge 6 to be taken out.

However, the above-mentioned first embodiment has still some problems to be solved. That is, when using a film taken by a camera of a type that, just after loading the film cartridge 6 into the camera, sends out once the whole film from the cartridge and then takes a picture sequentially from the last end frame of the film while rewinding the film, according to the reproducing method described in the above-mentioned first embodiment, the picture-taking order and the reproducing order are reversed and, therefore, the image reproduced in this manner may give an appreciator a slightly strange feeling. And, when there exists an unphotographed frame between the photographed frames, the unphotographed frame must be wasted.

In order to solve the above-mentioned problems, there has been proposed a method in which the information on the photograph starting frame number, photograph end frame number and the numbers of unphotographed frames is added to the film cartridge 6 as optical detect marks at a processing laboratory or by the reproduced image appreciator himself or herself. However, it cannot be said that this is an efficient method.

Second Embodiment

The above-mentioned problems can be solved by a second embodiment of the invention which will be described hereinbelow.

Figure 7:
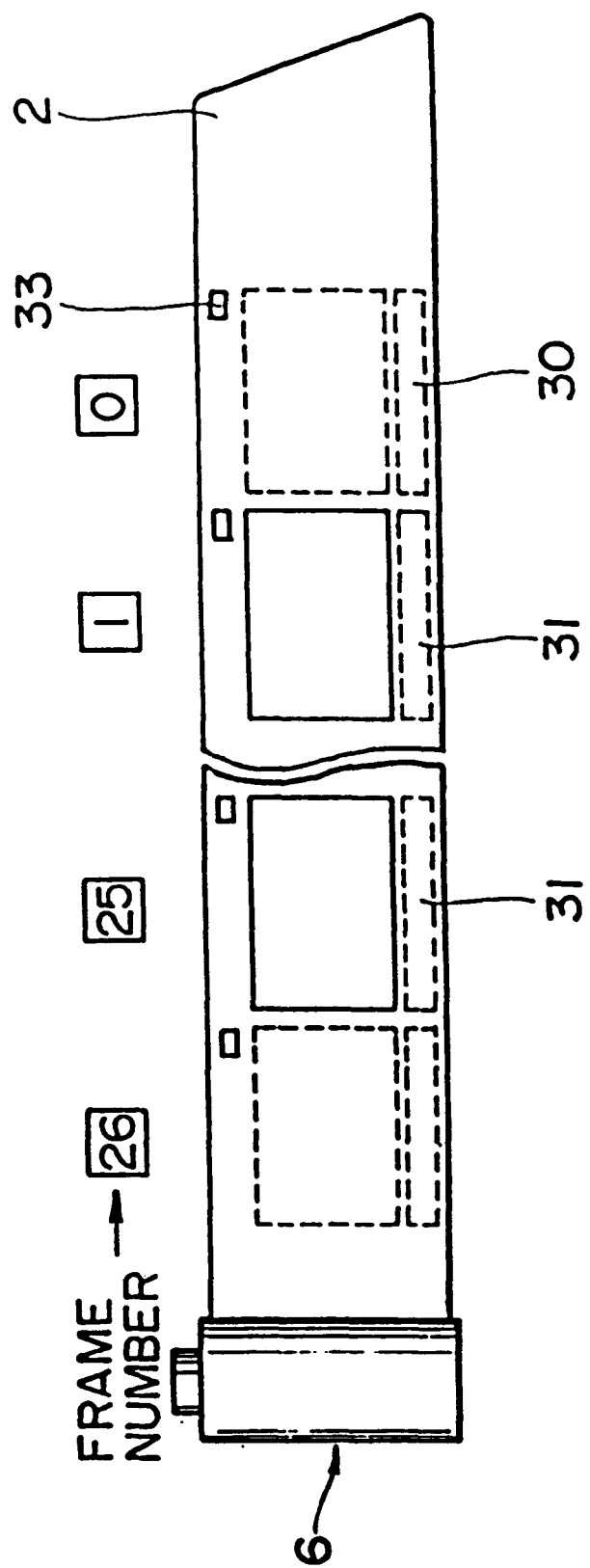
FIG. 7 is a view of an embodiment of a film cartridge to be applied to the film image input system shown in FIG. 6.

That is, according to the second embodiment, as shown in FIG. 7, the film 2 is coated with a magnetic recording layer. In the magnetic recording layer, the photograph start frame number and the photograph end frame number are recorded at the magnetic recording position 30 of the 0 frame which is a virtual image surface by the camera and whether a frame is already photographed or not is recorded at the corresponding position 31 of each frame also by the camera.

Figure 6:
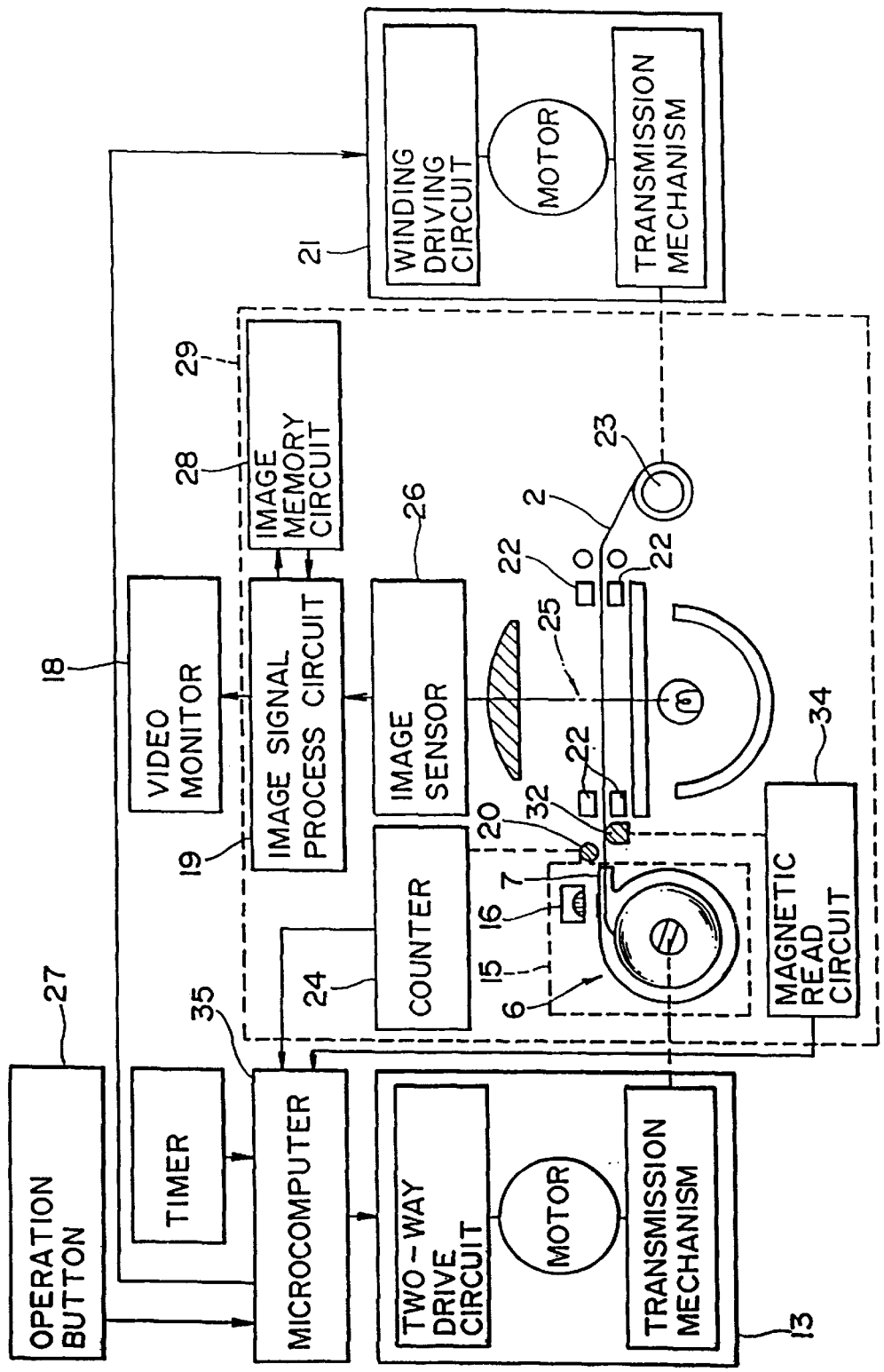
FIG. 6 is a block diagram of a second embodiment of a film image input system according to the invention.

In the second embodiment of the film image input system of the invention, as shown in FIG. 6, a magnetic head 32 contactable with the magnetic recording layer of the film is disposed adjacent to the film output opening 7 of the film cartridge 6.

When the film cartridge 6 (FIG. 7) in which the magnetically recorded film is stored is loaded into the film image input system 29, various operations necessary until the film is sent out are executed in the same manner as mentioned above. However, after such operations, at the same time when the film presence/absence detect means 20 detects a perforation 33 corresponding to the position of the virtual image surface 0 frame, the magnetic recording information is read in by the magnetic head 32. By decoding the information, a microcomputer 35 stores the photograph start number and the photograph end number. If the photograph start number is greater than the photograph end number, then the microcomputer 35 feeds the film quickly to the position of the photograph start frame while counting the number of perforations by use of the film presence/absence detect means 20 and counter 24 and stops the film there.

In the above operation, the magnetic head 32 reads the magnetic recording information corresponding to the respective frames and, if there exists any unphotographed frame, then stores the number thereof. Other operations are similar to those described before. Also, after the film is stopped at the photograph start frame position, reproduction of the respective frames ranging from the photograph start frame to the photograph end frame is performed sequentially while rewinding the film into the film cartridge 6. In this reproduction, if there is found an unphotographed frame which is stored during the quick feeding, then the reproduction of the frame is omitted and the operation is advanced to the next frame. The stored final photograph frame number is compared with the counter value of the perforation number to thereby judge the photograph end frame. If the reproduction of the photograph end frame is completed, then the film is rewound into the film cartridge 6 similarly as in the first embodiment.

Contrary to the above mentioned case, when the photograph start frame is smaller than the photograph end frame number, the images of the respective frames of the film can be reproduced while delivering the film in the direction to send out the film from the film cartridge 6.

A further embodiment is also effective. In other words, instead of the optical mark to display the kind of the film and whether the film is developed or not used in the film cartridge 6 in the above-mentioned first embodiment, it is possible in the second embodiment of the present film image input system to use magnetic record information which is recorded in a film maker and in a developing laboratory.

Third Embodiment

Figure 8:
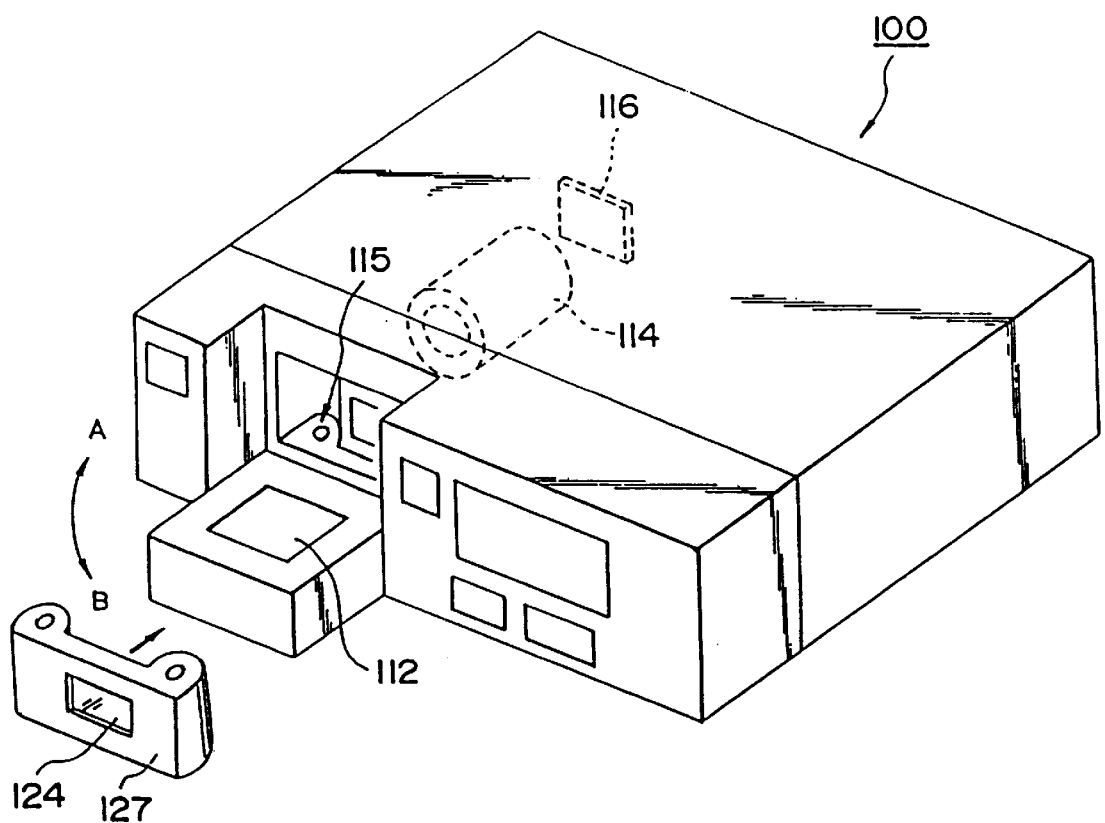
FIG. 8 is a perspective view of the outlines of a third embodiment of a film image input, system according to the invention.

Referring now to FIG. 8, there is shown a perspective view of an outline of a third embodiment of a film image input system according to the invention. As shown in FIG. 8, according to the present film image input system 100, a developed still photo film 124 is illuminated by a lighting unit 112, then the image of the film is picked up by an image pickup device including a taking lens (zoom lens 114) and a solid image pickup element 116 formed of a CCD or the like, the image signal is output to a video monitor 119 (FIG. 9), and finally the film image is reproduced on the video monitor 119.

The film 124 is a developed negative or positive film and is stored in a film cartridge 127 having two spools (two shafts), and the film cartridge 127 is set into a cartridge mounting part 115.

Figure 9:
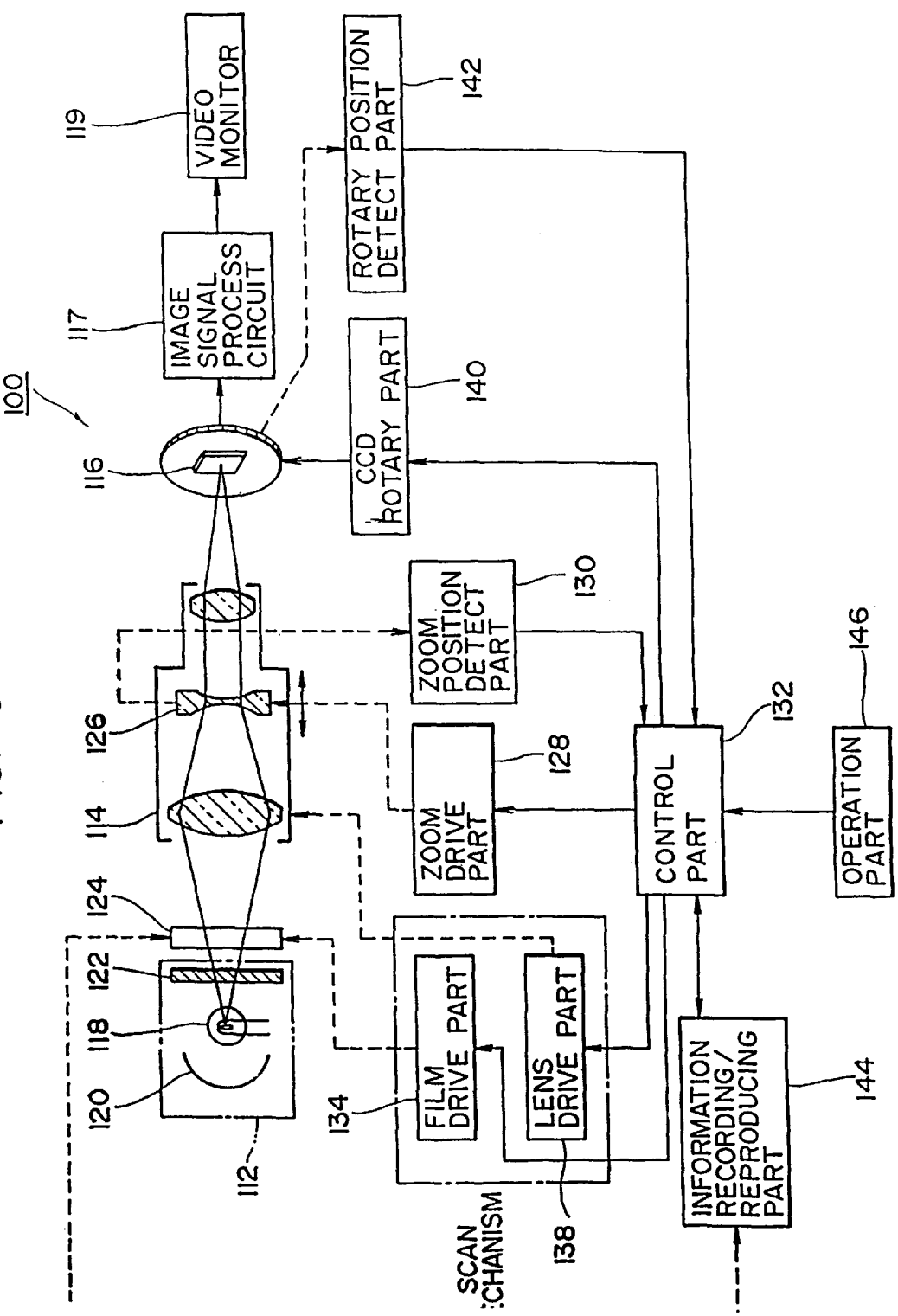
FIG. 9 is a block diagram of the interior structure of the film image input system show n in FIG. 8.

The lighting unit 112, which also serves as the cover of the cartridge mounting part 115, is rotated in a direction of an arrow A-B to open and close the cartridge mounting part 115. The lighting unit 112, as shown in FIG. 9, includes a light source 118, a reflection plate 120 and a diffusion plate 122 and the light from the light source 118 and the light that is reflected by the reflection plate 120 are projected on to the diffusion plate 122, where the light is diffused to turn out into a film illuminating light. The illuminating light illuminates the image of the film 124 and is then guided into the taking lens 114.

The taking lens 114 is a zoom lens including a magnification varying lens 126. That is, the magnification varying lens 126 is moved in the right and left directions in FIG. 9 by a zoom drive part 128 which inputs a zoom signal from a control part 132 to thereby perform a zooming operation so as to zoom in and zoom out the image of the film 124. Also, a zoom position detect part 130 detects the moving position (zooming position) of the magnification varying lens 126 and adds the zoom information to the control part 132.

A film drive part 134 is arranged such that various kinds of film feed signals can be applied thereto from the control part 132 and, in accordance with the signals input thereto, the film drive part 134 moves the film 124 within the film cartridge 127 in an X direction (that is, a direction intersecting the sheet of paper at right angles in FIG. 9). Also, the film drive part 134 moves the film 124 at high speeds in the fast feeding, rewinding and frame feeding, and moves the film 124 at low speeds in the scan feeding.

On the other hand, in accordance with a scan signal applied thereto from the control part 132, a lens drive part 138 moves the taking lens 114 and CCD 116 in a Y direction (that is, a vertical direction in FIG. 9). That is, by means of the scan feeding of the film 124 by the film drive part 134 and the movements of the taking lens 114 and CCD 116 by the lens drive parts 138, the vertical and horizontal direction scans of the image of the film 124 can be achieved.

The film image taken by the taking lens 114 is formed on the light receiving surface of the CCD 116 and is then converted by the respective sensors of the CCD 116 into a signal charge in an amount corresponding the intensity of the light. These signal charges are read out sequentially and output to an image signal process circuit 117. The image signal process circuit 117, which includes a sample hold circuit, a white balance circuit, a λ correction circuit, a matrix circuit, an encoder circuit and the like, executes a given signal process by means of these circuits and after then outputs to the video monitor 119 an image signal representing the film image. In this manner, the image of the film 124 can be displayed on the video monitor 119. When the film 124 is a negative film, then a signal process for carrying out a negative and positive inversion is also executed in the image signal process circuit 117.

A CCD rotary part 140 rotates the CCD 116 is rotated 90°, 180°, and 270° in a clockwise direction when viewed from the taking lens side, in accordance with a rotary instruction signal applied thereto from the control part 132, and a rotary position detect part 142 detects the rotary position of the CCD 116 and outputs the position information to the control part 132. When the image reproduced on the video monitor 119 is rotated 90° in a counter clockwise direction (CCW), the the CCD 116 is rotated 90° in the clockwise direction (CW) to thereby be able to turn the monitor image into an erect image. Similarly, when the image reproduced on the video monitor 119 is rotated 90° in the CW direction, then the CCD 116 is rotated 270° in the CW direction (90° in the CCW direction) to thereby be able to turn the monitor image into an erect image and also when the image reproduced on the video monitor 119 is turned upside down, then the CCD 116 is rotated 180° in the CW direction to thereby be able to turn the monitor image into an erect image.

The control part 132, in accordance with signals from the zoom position detect part 130, rotary position detect part 142, film information recording/reproducing part 144 and an operation part 146, outputs various control signals to the zoom drive part 128, film drive part 134, lens drive part 138 and CCD rotary part 140, and also it outputs the film information to the film information recording/reproducing part 144 to record the film information into the film 124, according to demand.

The film information recording/reproducing part 144, in accordance with the signal from the control part 132, records the film information (such as zoom information, scan position information, CCD rotation information and the like) on to the magnetic recording surface of every frame of the film, and it also reads out the film information from the film 124 and then outputs the film information to the control part 132.

Figure 10:
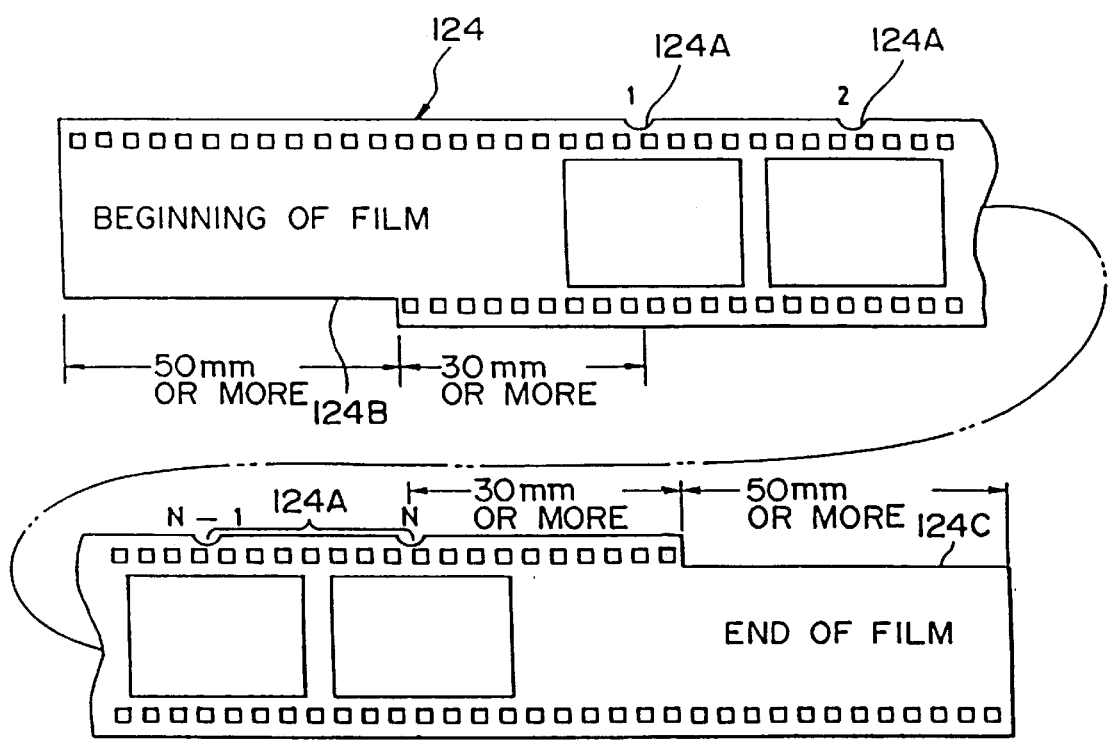
FIG. 10 is a plan view of an embodiment of the shape of a film which is reproduced by a film image input system.

Detection of the frames of this film 124 is achieved by the film information recording/reproducing part 144 reading out the frame information of each frame recorded in the film, or, as shown in FIG. 10, by use of frame detect means for detecting optically or mechanically a notch 124A representing a frame position previously set in the film 124, and the frame detect means is outputting the frame information to the control part 132. When the frame position is detected optically or mechanically, the invention is not limited to the above-mentioned notch 124A, but a hole may be formed for each frame of the film 124.

Also, as shown in FIG. 10, in the leading and trailing ends of the film 124 there are formed long cutaway portions 124B and 124C, respectively, and thus the beginning and end of the film 124 can be detected by detecting these cutaway portions 124B and 124C, respectively.

In FIG. 11, there is shown an example of the above mentioned frame detect means. This frame detect means is composed of a photo interrupter 147 which optically detects a hole 124E formed in each frame for representing the position of the frame and outputs a frame detect signal to a frame No. operation part (counter) 148. The frame No. operation part 148 calculates the frame number of a film image being currently reproduced in accordance with the frame detect signal applied thereto from the photo interrupter 147. That is, the frame No. operation part 148 resets its count value to 0 when the beginning of the film 124 is detected and, after then, when a frame detect signal is input while the film 124 is being fed in a forward direction (+X direction), then it counts up its count value and, when a frame detect signal is input while the film 124 is being fed in the reverse direction (-X direction), counts down its count value.

Besides the image signal from the CCD 116, information representing the frame number from the frame No. operation part 148 is being applied to the image signal process circuit 117. The image signal process circuit 117, in accordance with the frame number information, reads out a character signal indicating the frame number from a character generator (not shown), inserts the character signal into the image signal from the CCD 116, and outputs the signal to the video monitor 119. In this manner, the frame number is superimposed on the image displayed on the video monitor 119. Here, the frame number display method may include a method of always displaying the frame number in the image reproduced, a method of displaying the frame number only for a given period of time after change of the frame number and other methods. Also, in the case of the final frame, for example, by displaying the frame number flickerlingly, the final frame can also be informed.

Figure 12A:
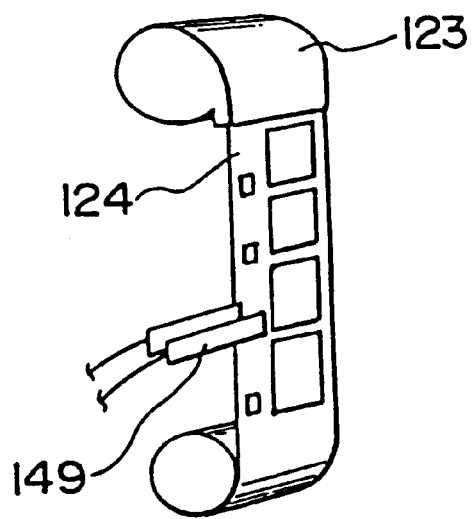
FIG. 12 is a view of another embodiment of the frame detect means.
Figure 12B:
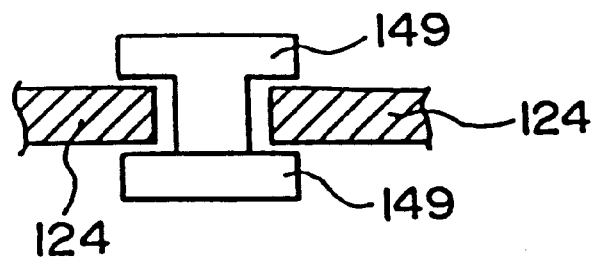

Also, as shown in FIG. 12(A), as the frame detect means, an electric contact 149 of a contact type may be used. This electric contact 149, as shown in FIG. 12(B), is energized at the position of the hole 124 E and is cut off at other positions, so that the electric contact 149 is able to detect the frame position.

Further, for example, when the film 124 has a magnetic recording part, that is, a magnetic layer, in order to detect the frame number, the frame number information may be recorded into the magnetic layer and, in the frame feeding, the frame number information may be reproduced by the information recording/reproducing part 144.

Figure 13:
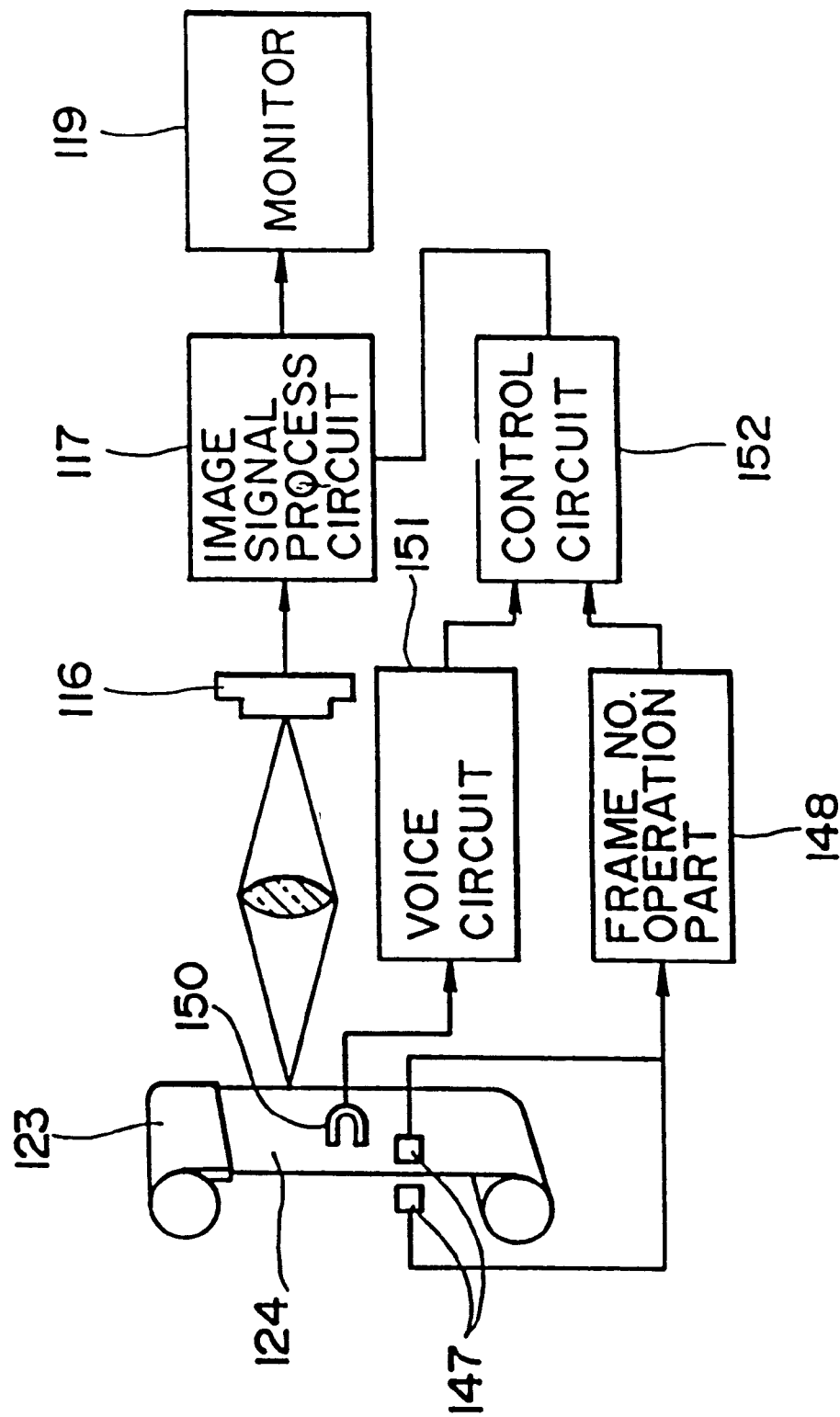
FIG. 13 is a block diagram of main portions of a film image input system including a voice circuit.

Moreover, when voice information is recorded in the magnetic layer of the film 124, as shown in FIG. 13, the voice information is detected by a magnetic head 150 and the detected voice information is then output to a voice circuit 151. The voice circuit 151, which includes a memory part for storing the voice information temporarily, stores the voice information in the memory part and at the same time outputs to a control circuit 152 a signal indicating the presence or absence of the voice information. Since the frame number information is being applied to the other input of the control circuit 152 from the frame No. operation part 148, the control circuit 152 outputs to the image signal process circuit 117 a signal indicating the frame number information-and the presence or absence of the voice information.

The image signal process circuit 117 displays the frame number having the voice information recorded therein and the frame number having no voice information in distinction from each other. For example, the circuit 117 changes the display color of the frame number or flickers the frame number according to the presence or absence of the voice information. And, if an operation to output a voice is executed responsive to the change of display of the frame number, then the circuit 117 outputs to a speaker (not shown) the voice information temporarily stored in the voice circuit 151 to thereby be able to reproduce the voice.

Figure 14:
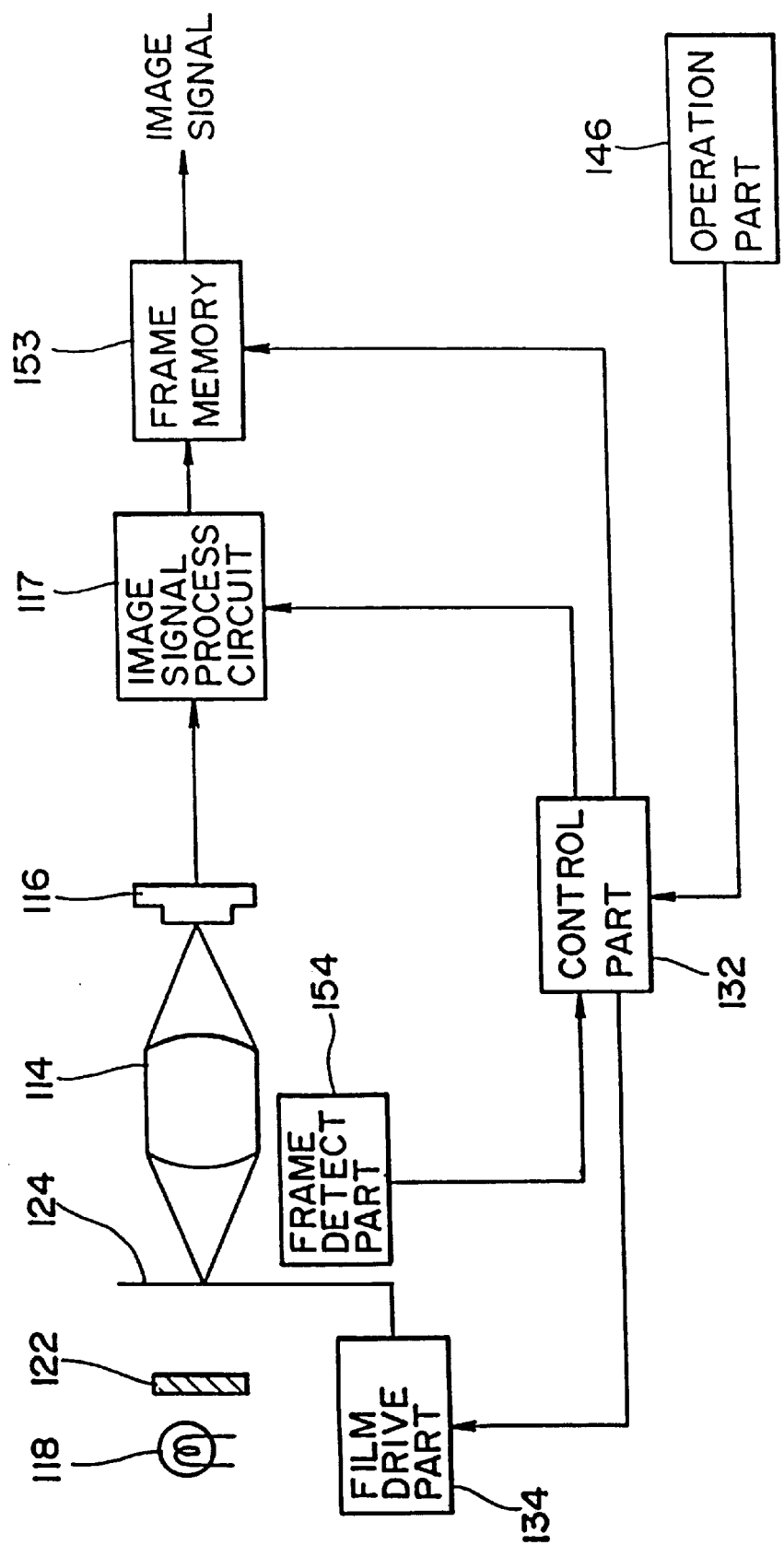
FIG. 14 is a block diagram of main portions of a modification of the film image input system shown in FIG. 9.

Referring now to FIG. 14, there is shown a block diagram of main portions of a modification of the film image input system shown in FIG. 9. This modification is different from the system shown in FIG. 9 mainly in that it includes a frame memory 153 which is used to record a frame of image signal.

A frame detector 154 detects the frame position of the film 124 and then outputs a frame detect signal to the control part 132. When the frame detect signal is input thereto from the frame detector 154 in the frame feeding, then the control part 132 instructs the film drive part 134 to stop its film feeding operation. This permits feeding of the frames of the film 124.

The control part 132 is able to control the image signal process circuit 117 enabled or disabled and at the same time is abled to control the writing of the image signal into the frame memory 153. That is, the control part 132, after completion of the frame feeding, enables the image signal process circuit 117 to thereby output the image signals for the currently photographed frames to the frame memory 153 sequentially, and at the same time enables the writing of the image signals into the frame memory 153. And, the image signals sequentially read out from the frame memory 153 are output to the video monitor 119 and are then reproduced on the video monitor 119.

On the other hand, various signals are being applied to the control part 132 from the operation part 146. If a fast feeding signal or a frame feeding signal is applied thereto, then the control part 132 controls the film drive part 134 to fast feed or frame feed the film 124. At the same time, the control part 132 disables the image signal process circuit 117 to thereby stop the output of the image signals and also prohibits updating of the storage contents of the frame memory 153. As a result of this, in the film fast feeding or in the film frame feeding, the film image that is photographed just before the film feeding is reproduced on the video monitor 119 as a still image.

Figure 15:
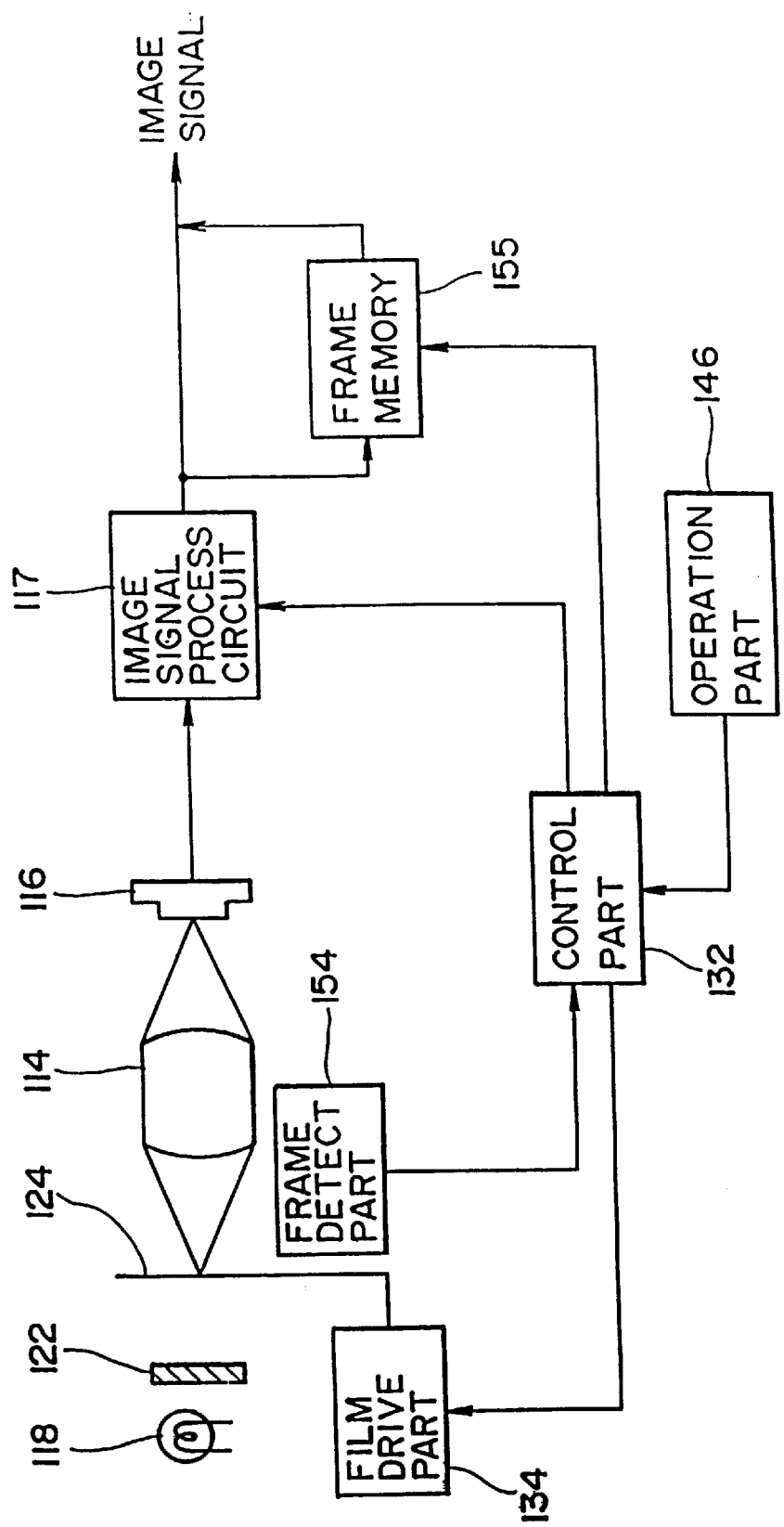
FIG. 15 is a block diagram of main portions of another modification of the film image input system shown in FIG. 9.

Now, in FIG. 15, there is shown a block diagram of main portions of another modification of the film image input system shown in FIG. 9. This modification is different from the modification shown in FIG. 14 in the method of connecting the frame memory. That is, in FIG. 14, the frame memory 153 is connected in series to the output of the image signal process circuit 117, while in FIG. 15 a frame memory 155 is connected in parallel to the image signal process circuit 117. With such parallel connection, the image signals in: other cases than the film feeding operation can be applied from the image signal process circuit 117 directly to the video monitor 119 not through the frame memory 155, thereby improving the image quality. Also, in the film feeding operation, similarly as in FIG. 14, the image signals are read out from the frame memory 155 and the film image that is photographed just before the film feeding is reproduced on the video monitor 119 as a still image. It should be noted here that the image signals for a plurality of frames can be compressed and stored in the frame memory 155 and they can be reproduced as a multi-image (for example, an index image, a combined image or the like).

Figure 16:
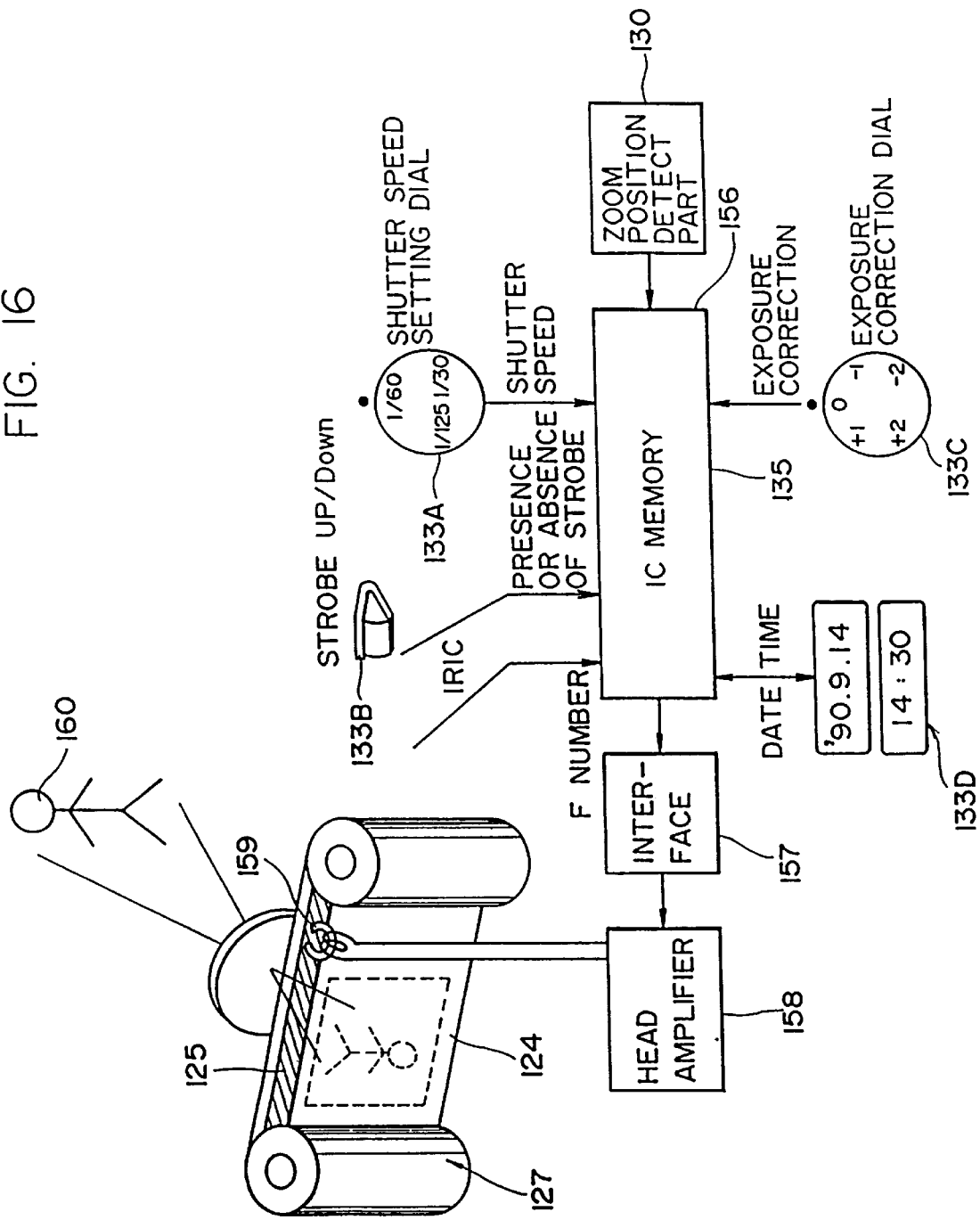
FIG. 16 is a block diagram of a recording system for recording various kinds of information into a magnetic layer of a film.
Figure 17:
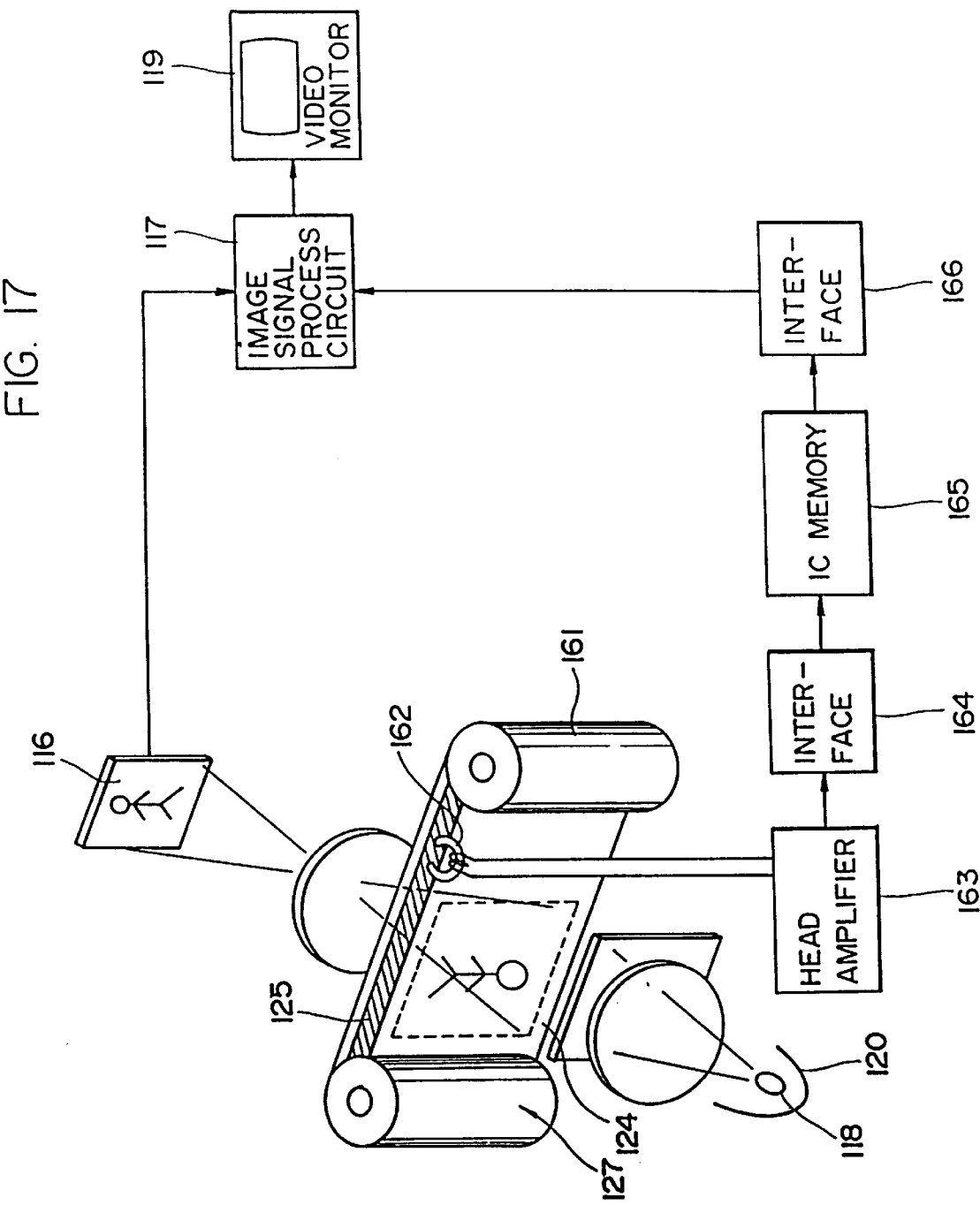
FIG. 17 is a block diagram of a reproducing system for reproducing the various kinds of information recorded in the magnesia layer of the film.

In FIG. 16, there is shown a block diagram of a recording system for recording various kinds of information into the magnetic layer 125 of the film 124, and in FIG. 17 there is shown a block diagram of a reproducing system for reproducing various kinds of information recorded in the magnetic layer 125 of the film 124.

As shown in FIG. 16, at first in photographing, zoom information from the zoom position detect part 130, F number information calculated based on an AE sensor (not shown) or the like, shutter speed information from a shutter speed setting dial 133A, information indicating UP/DOWN of a strobe-light 133B of a pop-up type (presence or absence of strobe flash light), exposure correction information from -an exposure correction dial 133C, and photographing date and time information from a timer 133D are input to an IC memory 135 provided in a main body of a camera, and such information is recorded, in the frame feeding operation, through an interface 157 and a head amplifier 158 by a magnetic head 159 into the magnetic layer 125 in the upper end of the frame in which an object 160 is photographed.

On the other hand, as shown in FIG. 17, in reproduction, if a film cartridge 127 with a developed film 124 wound thereround is set in a film image input system 100 and the frames of the film 124 are fed, then the information recorded in the magnetic layer 125 of this film 124 (for example, the photographing information input from the camera in photographing, as described above) is read out by means of a magnetic head 162, and the thus read-out information is then stored through a head amplifier 163 and an interface 164 in an IC memory 165.

The information stored in the IC memory 165 is applied through an interface 166 to the image signal process circuit 117 when the image signal converted photo-electrically by a CCD 116 is applied to the image signal process circuit 117, and is then converted into a character signal indicating the photographing information in the image signal process circuit 117. And, the character signal is mixed with the above-mentioned image signal and is then output to the video monitor 119, whereby the photographing information is superimposed on the image displayed on the video monitor 119. Here, if pseudo zoom information (that is, information for enlarging a given range in printing without zooming the taking lens) is recorded in the above-mentioned photographing information, then the taking lens 114 of the film image input system is automatically zoomed in accordance with the pseudo zoom information recorded in the film 124, whereby a film image in a pseudo zoom state in photographing can be reproduced on the video monitor 119.

Figure 18:
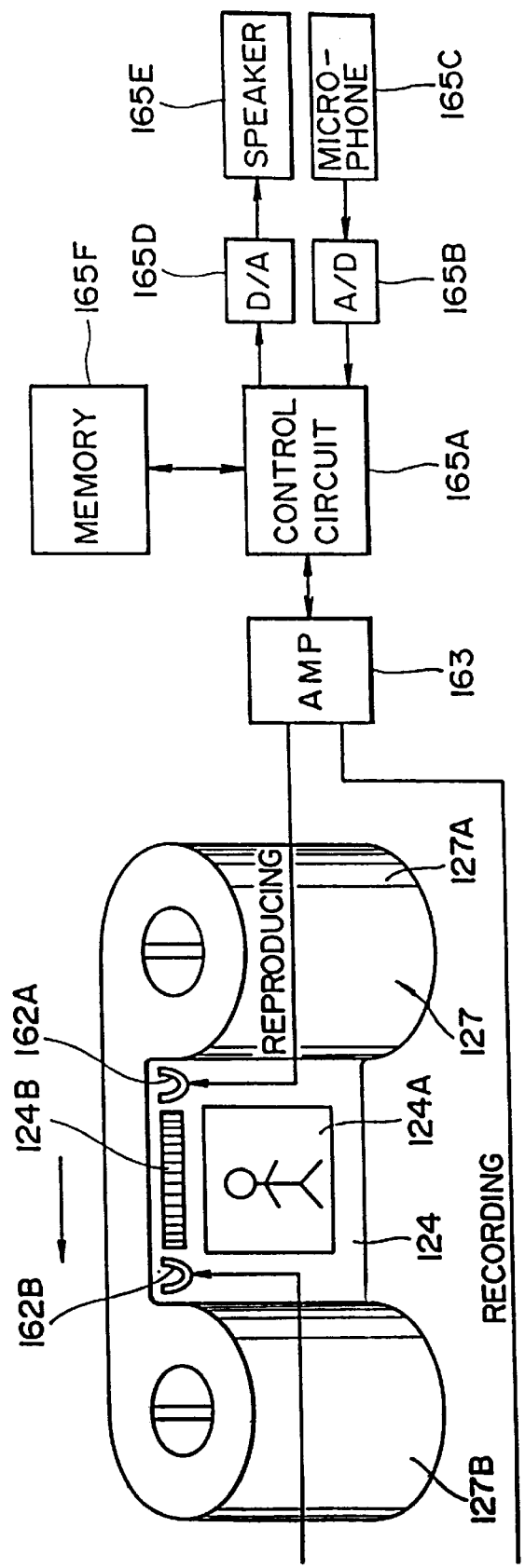
FIG. 18 is a block diagram of details of a film information recording and reproducing part shown in FIG. 9.

In FIG. 18, there is shown a block diagram of details of the film information recording/reproducing part 144 shown in FIG. 9. A film cartridge 127 shown in FIG. 18 includes a film supply room 127A and a film take-up room 127B and the film 124, that is, the frames of the film 124 are fed in a direction of an arrow from the film supply room 127A to the film take-up room 127B. The film 124 includes on the upper or lower end portion thereof a long and narrow magnetic layer on which a recording track 124B is formed. Necessary information such as postrecording information, trimming information and the like can be recorded into and reproduced from the magnetic recording track 124B.

In the film image input system, a magnetic head 162A for reproduction is disposed on the, film supply side (upstream side of the film feeding direction) of the film cartridge 127 and a magnetic head 162B for recording is disposed on the film winding side (downstream side of the film feeding direction) of the film cartridge 127. The two magnetic heads 162A and 162B are spaced by one frame from each other. The magnetic heads 162A and 162B are respectively connected through a head amplifier 163 to a control circuit 165A.

The control circuit 165A, in voice recording, compresses the voice information that is input therein through an A/D converter 165B from a microphone 165C and allows a memory 165F to store the compressed voice information and, in frame feeding, reads out the voice information stored in the memory 165F and then outputs the voice information through the amplifier 163 to the magnetic head 162B for recording. In this manner, the voice information is recorded into the magnetic recording track 124B.

Also, the control circuit 165A, in voice reproduction, inputs the voice information from the magnetic recording track 124B through the reproducing magnetic head 162A and the amplifier 163 in frame feeding, and allows the memory 165F to store the voice information. After then, the control circuit 165A reads out the voice information from the memory 165F and then outputs the voice information through a D/A converter 165D to a speaker 165F after the voice information is expanded. As a result of this, the voice information that is recorded in the recording track 124B can be reproduced as a voice.

Now, description will be given below of the operation of the film information recording/reproducing part for use in a film image input system according to the invention constructed in the above-mentioned manner.

At first, description will be given of a case in which the voice information is recorded. The film 124 is fed in a direction of an arrow in FIG. 18 and at the present time the image of the film 124 is situated in a photograph frame 124A. In this state, the voice information is input from the microphone 165C. The input voice information is stored through the A/D converter 165B and control circuit 165A into the memory 165F.

And, in order to display a next new frame, if the frame feeding of the film 124 is started, then the control circuit 165A reads out the input voice information simultaneously from the memory 165F and records the voice information through the amplifier 163 and the recording magnetic head 162B into the magnetic recording track 124B of the frame 124A.

Next, description will be given of a case in which the recorded voice information is reproduced. In a state where in reproduction the film 124 is frame fed in the arrow direction (forward direction) and the frame 124A shown in FIG. 18 is being displayed, the reproducing magnetic head 162A has completed tracing the magnetic recording track 124B in which the voice information for the frame 124A is recorded, and thus the voice information has been input through the amplifier 163 into the control circuit 165A and has been recorded in the memory 165F. And, if an instruction is given by means of a voice output button or the like, then the control circuit 165A reads out the voice information from the memory 165F, expands the voice information and then outputs the voice information through the D/A converter 165D to the speaker 165E. By means of this, a voice commenting on the image can be heard while viewing the image.

In the above-mentioned embodiment, the reproducing magnetic head 162A is disposed on the upstream side in the film feeding direction and the recording magnetic head 162B is disposed on the downstream side in the film feeding direction. However, this arrangement is not limitative, but recording/reproducing magnetic heads may be disposed on the downstream and upstream sides, respectively.

In other words, if the film feeding direction is reversed, then the upstream and downstream sides are reversed accordingly. However, if the above-mentioned recording/reproducing magnetic heads are used by switching in such a manner that the downstream side magnetic head is always a recording head and the upstream side magnetic head is always a reproducing head, then the recording/reproducing magnetic heads can also be applied even when the film feeding direction is reversed.

Here, it should be noted that, when the film feeding direction in recording is different from the film feeding direction in reproduction, the voice information recorded into the memory must be reproduced reversely to turn into a normal voice.

Also, a part into which the information input to the camera is recorded is not limited to the magnetic layer of the film, but the information may be recorded optically into a photosensitive layer, or may be recorded into an IC memory mounted in the film cartridge. Here, the information to be recorded into the film from the camera includes pre-wind information indicating that after the film was wound previously, the photographing has been started. In order to reproduce the film with the pre-wind information recorded therein by means of the film image input system, the film within the film cartridge is automatically pre-wound and, after then, the frames of the film may be fed forwardly.

Figure 19:
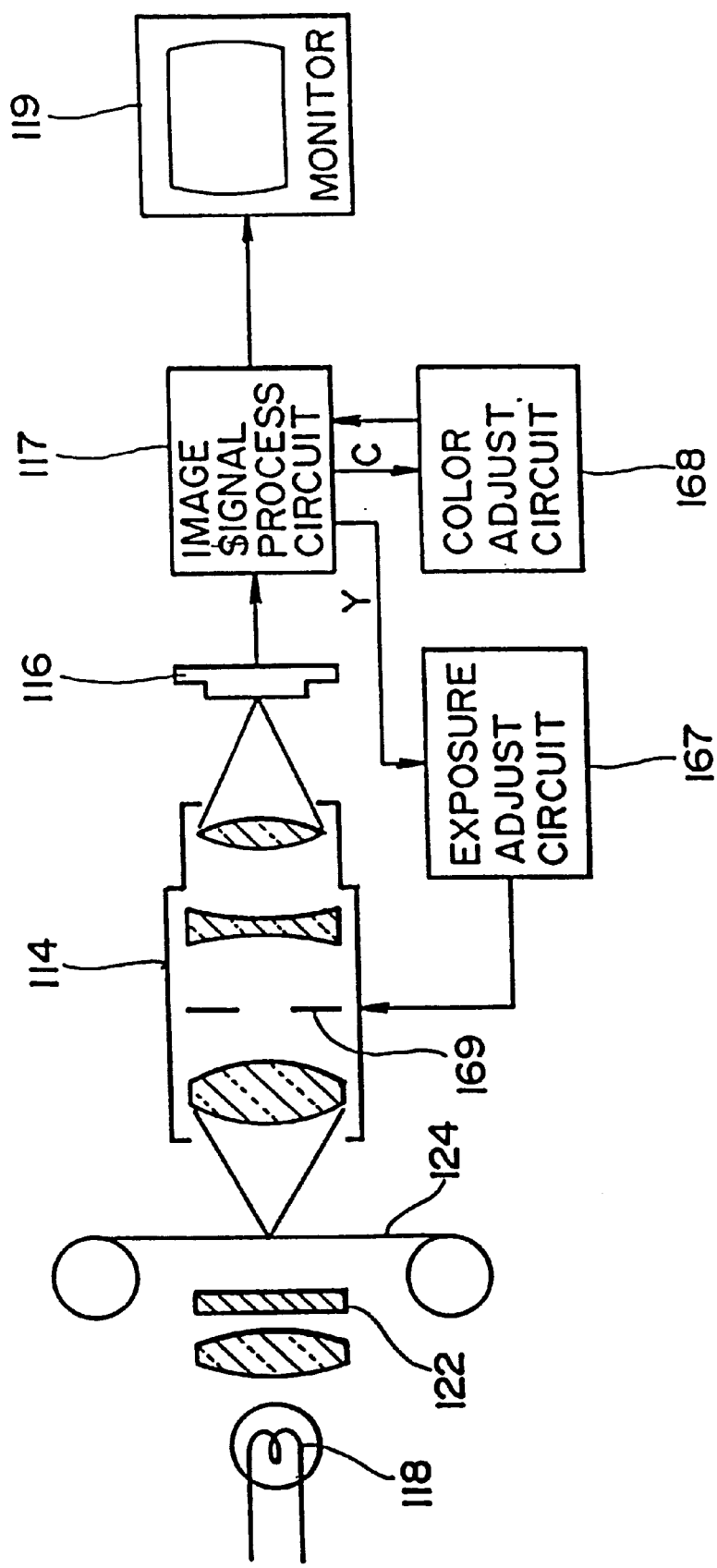
FIG. 19 is a block diagram of details of a film image input system including an exposure adjust circuit and a color tone adjust circuit.

Referring now to FIG. 19, there is shown a block diagram of main portions of a film image input system including an exposure adjust circuit 167 and a color adjust circuit 168. In this figure, in the exposure adjust circuit 167 there is previously set a brightness level at which a monitor image can have a desired brightness. The exposure adjust circuit 167 compares the brightness level of a brightness signal Y input from the image signal process circuit 117 with the previously set brightness level. If the brightness of the film image is darker, the circuit 167 increases the degree of opening of an iris 169 and, if the brightness of the image is lighter, the circuit 167 decreases the degree of opening of the iris 169.

On the other hand, there is previously set in the color adjust circuit 168 a chroma level at which the monitor image can have a desired color. The color adjust circuit 168 compares the chroma level of a chroma signal C input from the image signal process circuit 117 with the previously set chroma level, and adjusts the chroma signal so that the film image can have the best color.

Figure 20:
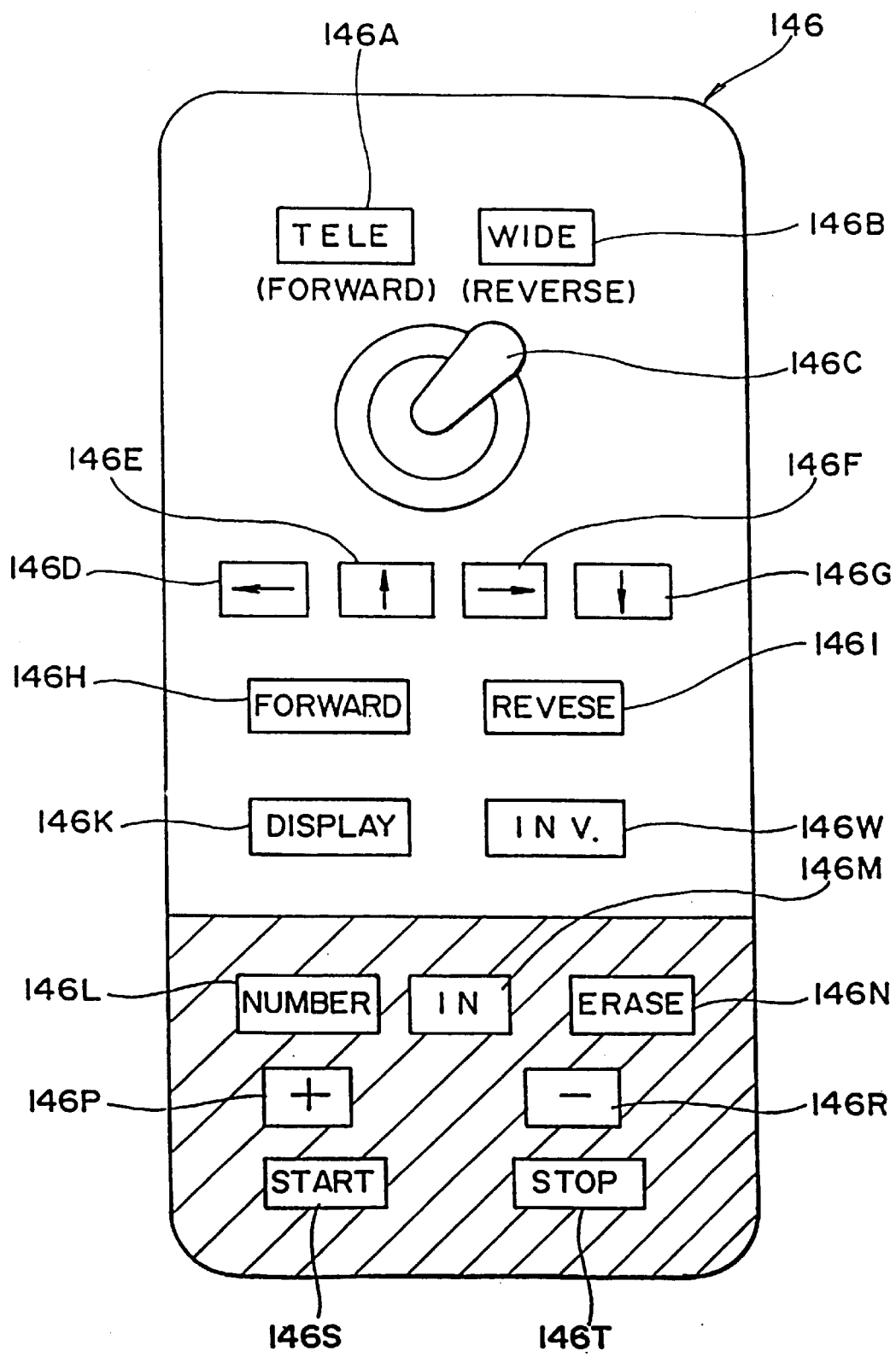
FIG. 20 is a plan view of an embodiment of an operation part of a film image input system.

In FIG. 20, there is shown a plan view of an embodiment of an operation part 146 of a film image input system 100. The operation part 146, which comprises, for example, an infrared remote-controlled transmitter, transmits an infrared remote-controlled signal to a receiver (not shown) provided on the film image input system side, responsive to the operations of various switches.

In the operation part 146, there are provided zoom switches 146A, 146B which are respectively used to zoom in and zoom out the image, a scan lever 146C used to scan the film image, switches 146D, 146E, 146F, 146G respectively used to rotate the CCD 116 and erect the monitor image, switches 146H, 146I, respectively used to feed frames forwardly and reversely, a display switch 146K for monitoring all information recorded in the film including the frame number, date and the like of the film 124, and other switches.

Also, in the lower end portion of the remote-control operation part, there is provided a cover which can be opened and closed. Below the cover, there are arranged, as hidden switches, a number setting switch 146L which inputs the number of prints, an input switch 146M which inputs a reprint or inputs automatic reproducing information, an erasing switch 146N which erases the input of the reprint or the input of the automatic reproducing information, switches 146P, 146R respectively for setting a display time, a start switch 146S, a stop switch 146T and the like. In FIG. 20, 146W designates an INV switch which is depressed before a new bit of information is input.

Next, description will be given below of the operation of the film image input system of the invention constructed in the above-mentioned manner.

At first, the film cartridge 127 having therein a developed film 124 is set into the film image input system 100. Responsive to this, the control part 132 controls the film drive part 134 such that the first frame of the film 124 is situated between the lighting unit 112 and the taking lens 114. The image of the first frame is illuminated by the lighting unit 112 and is then output through the taking lens 114, CCD 116 and image signal process circuit 117 to the video monitor 119.

When the film image of the whole of one frame displayed in this state is to be zoomed or scanned, the zoom switches 146A, 146B or scan lever 146C in the operation part 146 are (or is) operated to thereby apply a zoom signal or a scan signal to the control part 132. Responsive to the signals input from the operation part 146, the control part 132 drives the zoom drive part 128, lens drive part 138 and film drive part 134 to thereby zoom the taking lens 114 or scan the film image. By means of this, the film image of the whole of one frame is trimmed properly and is then reproduced as a trimming image on the video monitor 119. Here, it should be noted that the reproducing information of the film image such as the then zoom information, scan position, CCD rotation information and the like can be recorded from the control part 132 through the information recording/ reproducing part 144 to the magnetic layer of the frame as occasion demands in the frame feeding.

Next, when the film 124 is frame fed and the image of the next frame is reproduced, the reproduction of the film image is carried out according to the mode selected by a mode select switch (not shown) which can select a desired mode from a manual mode, an auto mode and a standard mode. That is, the manual mode is a mode in which the image of a new frame is reproduced in the same condition as in the scanning condition, the auto mode is a mode in which the image is automatically reproduced in accordance with the reproduction information recorded in the film 124, and the standard mode is a mode in which the image of a new frame is reproduced in a standard condition irrespective of the zooming and scanning condition of the previous frame. Here, the standard condition is a condition in which the image of the whole of a frame is put into the entire picture of the video monitor 119. Specifically, the standard condition includes two kinds of standard conditions: in one of the standard conditions, an object is photographed transversely in the film; and, in the other standard condition, the object is photographed longitudinally in the film. Also, in reproduction, either of the two standard conditions can be selected automatically according to the CCD rotation information from the rotary position detect part 142.

Figure 21:
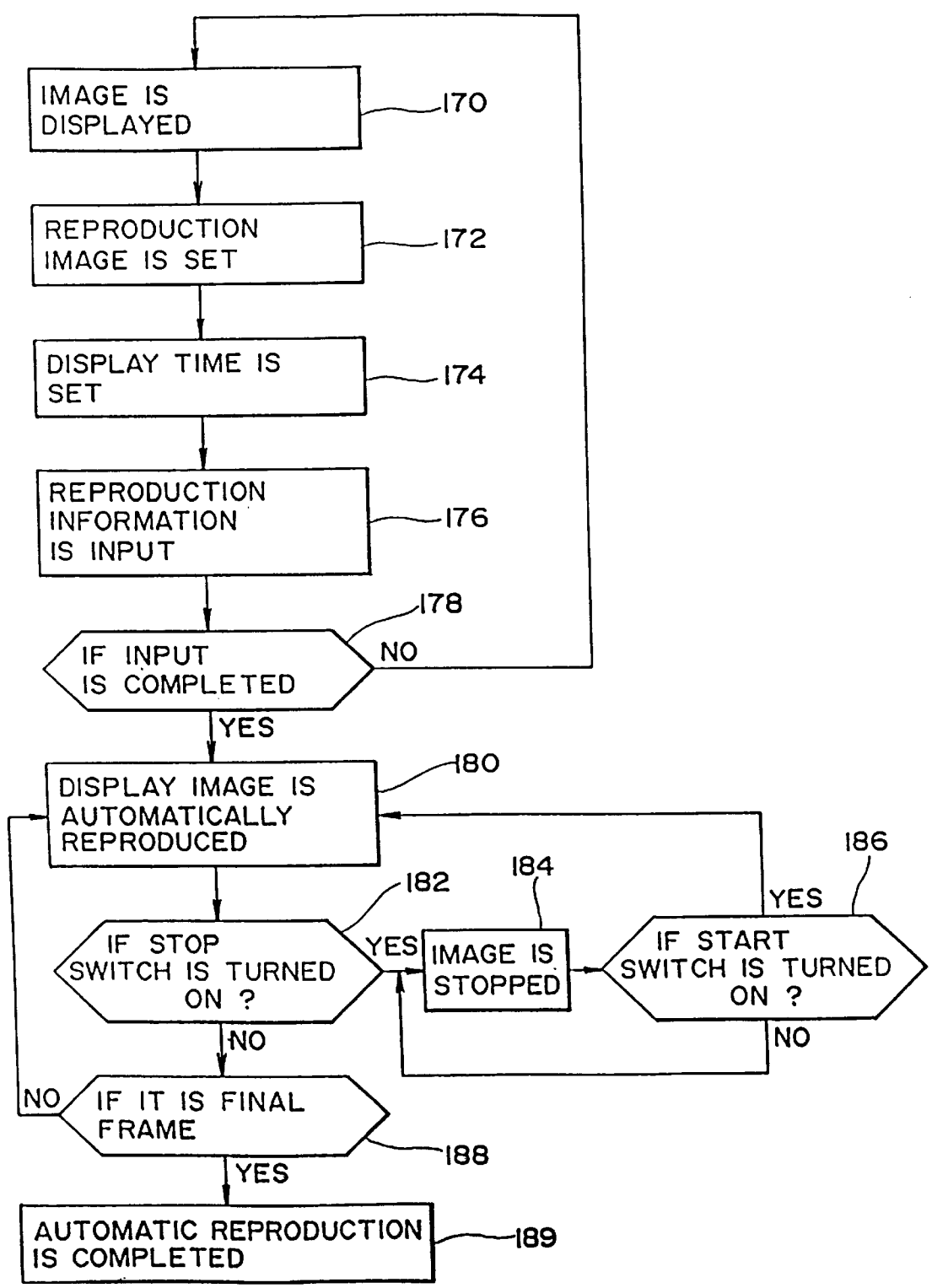
FIG. 21 is a flow chart to explain a method of inputting the reproducing information of the display image of each frame using the operation part and an automatic reproducing method using the reproducing information.

Next, description will be given below of a method of inputting the reproduction information (such as the zoom information, scan position and the like) on the display image of each frame using the operation part 146 as well as an automatic reproducing method using the reproduction information with reference to a flow chart shown in FIG. 21. As the recording means for recording the reproduction information in this case, the magnetic layer of the film, an IC memory mounted into the cartridge, an IC memory provided within the film image input system or the like can be used.

At first, the frame feeding switch 146H for feeding frames in a forward direction is depressed to feed one frame of the film 124 so as to display the image of the frame by and on the video monitor 119 (Step 170). Next, while observing the displayed image, the zoom switches 46A, 46B, scan lever 46C, and the like are operated to thereby set a desired reproduction image (Step 172). Here, as occasion demands, increasing or decreasing seconds with respect to a standard display time (for example, 5 seconds) are corrected by pressing down the time setting switches 146P, 146R (Step 174). After then, the input switch 146M is depressed to thereby input the reproduction information (Step 176). And, until input of the reproduction information of all frames is completed, the foregoing procedures are executed repeatedly (Step 178).

After input of the reproduction information, if the mode select switch is switched into the auto mode and the start switch 146S is pressed down, then the reproduction information is read out and the frames are automatically reproduced sequentially one by one in accordance with the reproduction information (Step 180).

On the other hand, when it is desired to stop the reproducing image for a longer period of time than a set time during the automatic reproduction, the stop switch 146T is pressed down to thereby stop the image (Steps 182, 184). After then, when reproducing the image again, the start switch 146S is depressed (Steps 186, 180). Also, if the reproductions are executed sequentially and the reproduction of the image of the final frame is completed, then the automatic reproduction is completed (Steps 188, 189).

By the way, when some automatic reproduction information is input by mistake or when some input is desired to change, the INV switch 146W is depressed while the corresponding frame is being displayed on the video monitor 119 and after then the erasing switch 146N is pressed down, so that the automatic reproduction information on the image being displayed on the video monitor 119 can be erased. Also, when it is desired to erase the automatic reproduction information on all films within the film cartridge, the INV switch 146W as well as the erasing switch 146N are depressed.

Figure 22:
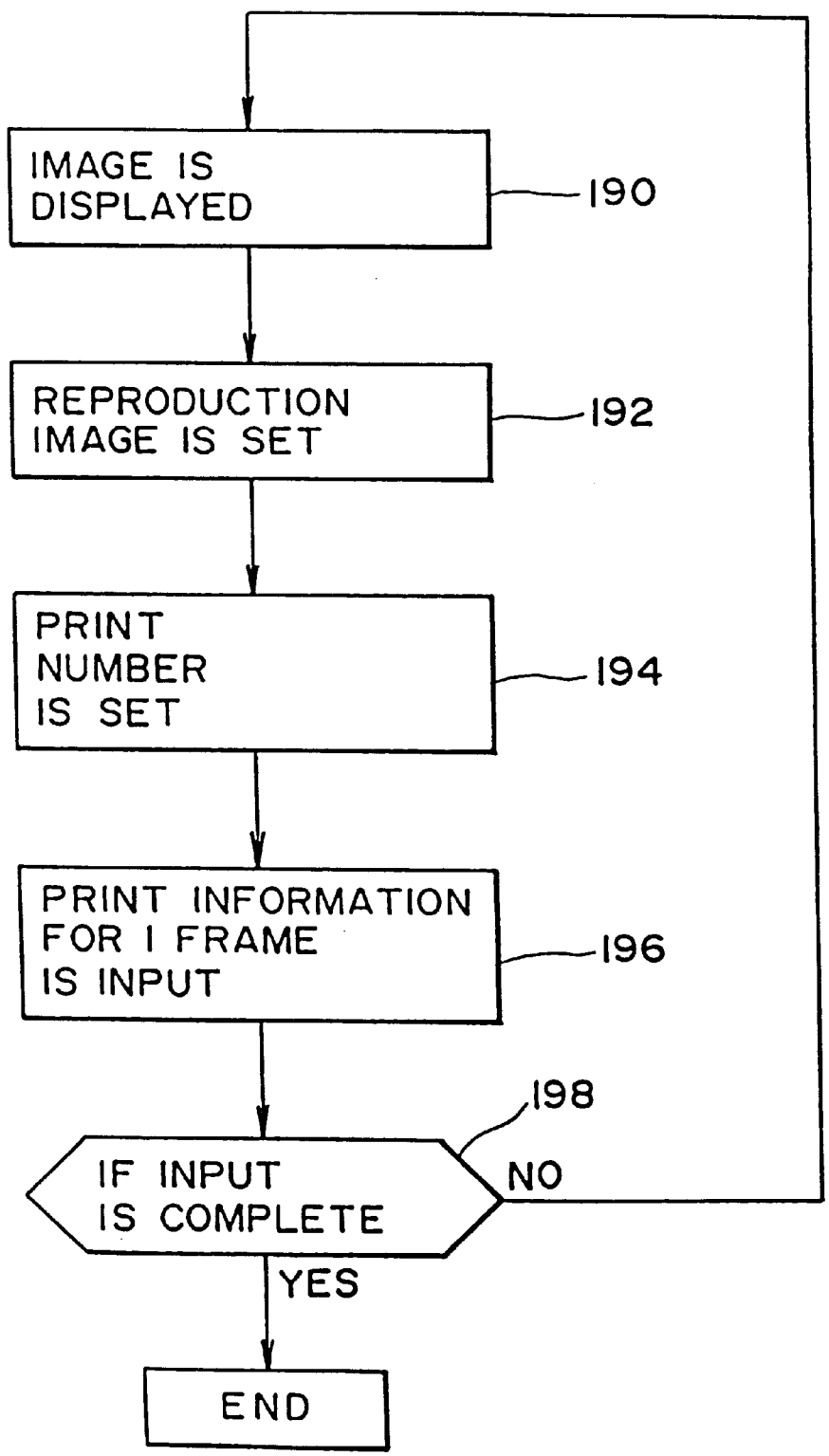
FIG. 22 is a flow chart to explain a method of inputting re-print information with respect to a suitable frame in the operation part.

Next, description will be given below of a method of inputting reprint information for a proper frame in the operation part 146 with reference to a flow chart shown in FIG. 22. Here, Steps 190 and 192 are the same as the Steps 170 and 172 described above, respectively, and thus the description thereof is omitted. And, zooming magnification of the reproducing image is possible up to about ten times a standard magnification, for example, because the resolving power of the image on the film is higher than that of the screen of the video monitor 119. However, when reprint information is input, the zooming magnification must not exceed 3 times the standard magnification (for example, a magnification at which the image of the whole of one frame is put in the entire picture), in order not to lower the quality of the print image. By the way, 3 times is the maximum magnification that can keep the quality as an ordinary photo print.

After a reproduction image (trimming) is set in Step 192, the number setting switch 146L is pressed down to thereby set the number of prints (Step 194). Here, when decreasing the print number, the INV switch 146W is depressed and after then the number setting switch 146L is depressed. If both of these switches 146W and 146L are pressed down once, then the number of prints can be increased or decreased by one. After setting the number of prints, the input switch 146M is pressed down to thereby input the trimming information and print number information. And, until input of the print information of all frames is completed, the foregoing operations are executed repeatedly (Step 198). Wrong input can be erased in the similar procedures described in the above-mentioned automatic reproducing method. Also, the film cartridge is not limited to the film cartridge shown in FIG. 8 which has two shafts, that is, the film supply spool and take-up spool, but a film cartridge having one shaft like the film cartridge 123 shown in FIGS. 11, 12 and 13 may also be used.

Fourth Embodiment

Figure 23:
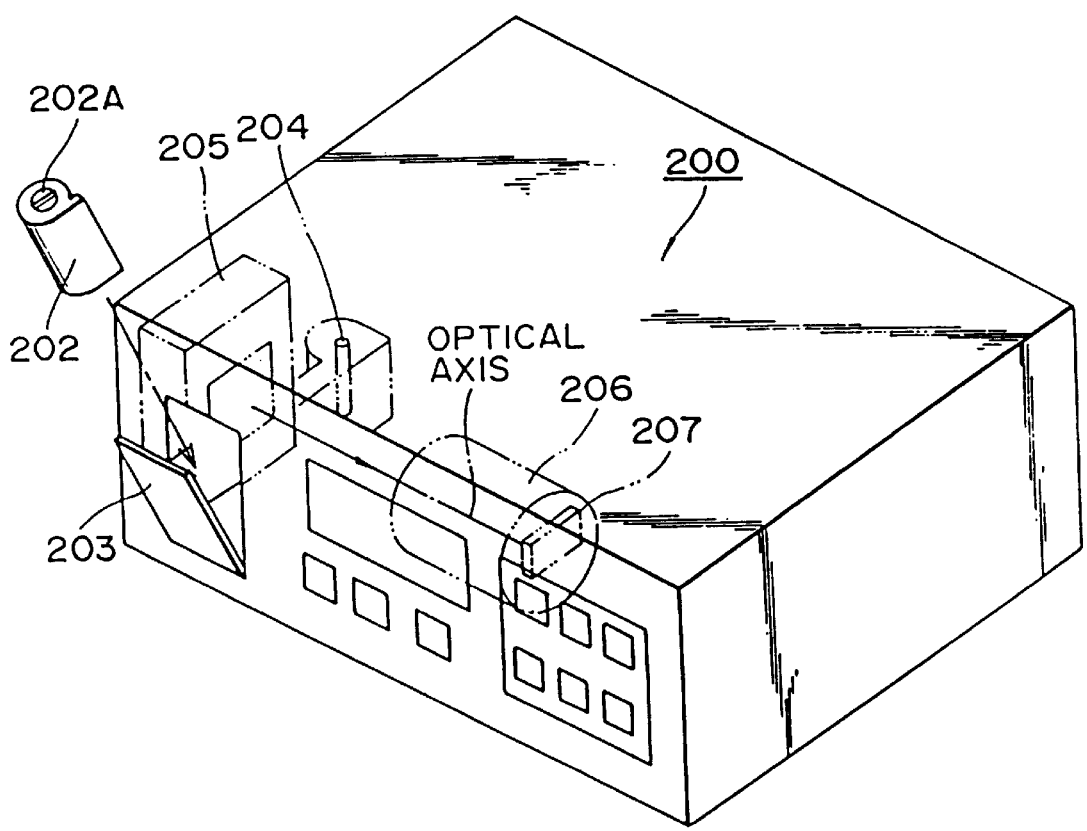
FIG. 23 is a perspective view of the outlines of a fourth embodiment of a film image input system according to the invention.

In FIG. 23, there is shown a perspective view of an outline of a fourth embodiment of a film image input system according to the invention. As shown in FIG. 23, a long and narrow, developed still photo film is stored in a film cartridge 202 having a spool (a shaft) 202A, the film cartridge 202 is in turn stored in a cartridge holder 203, and thus the film is set into a cartridge mounting part of the present film image input system 200 by use of the cartridge holder 203.

The film in the film cartridge 202 set in the cartridge mounting part is sent out from the film cartridge 202, is wound round a take-up reel 204, and is then taken up frame by frame by the take-up reel 204. The respective frames of the film fed in this manner are then illuminated by a lighting unit 205, and the film images of the respective frames illuminated are picked up by a taking lens 206 and are then formed on photocells on the light receiving surface of a CCD 207, where they are converted into image signals respectively. The image signals are then output to a video monitor (not shown) so that the film images can be reproduced by the video monitor.

Next, description will be given below in detail of a film guide mechanism, a reel drive mechanism, a cartridge mounting mechanism, a holder lock mechanism, a mode select mechanism and the like included in the present film image input system 200.

[Film Guide Mechanism]

Figure 24:
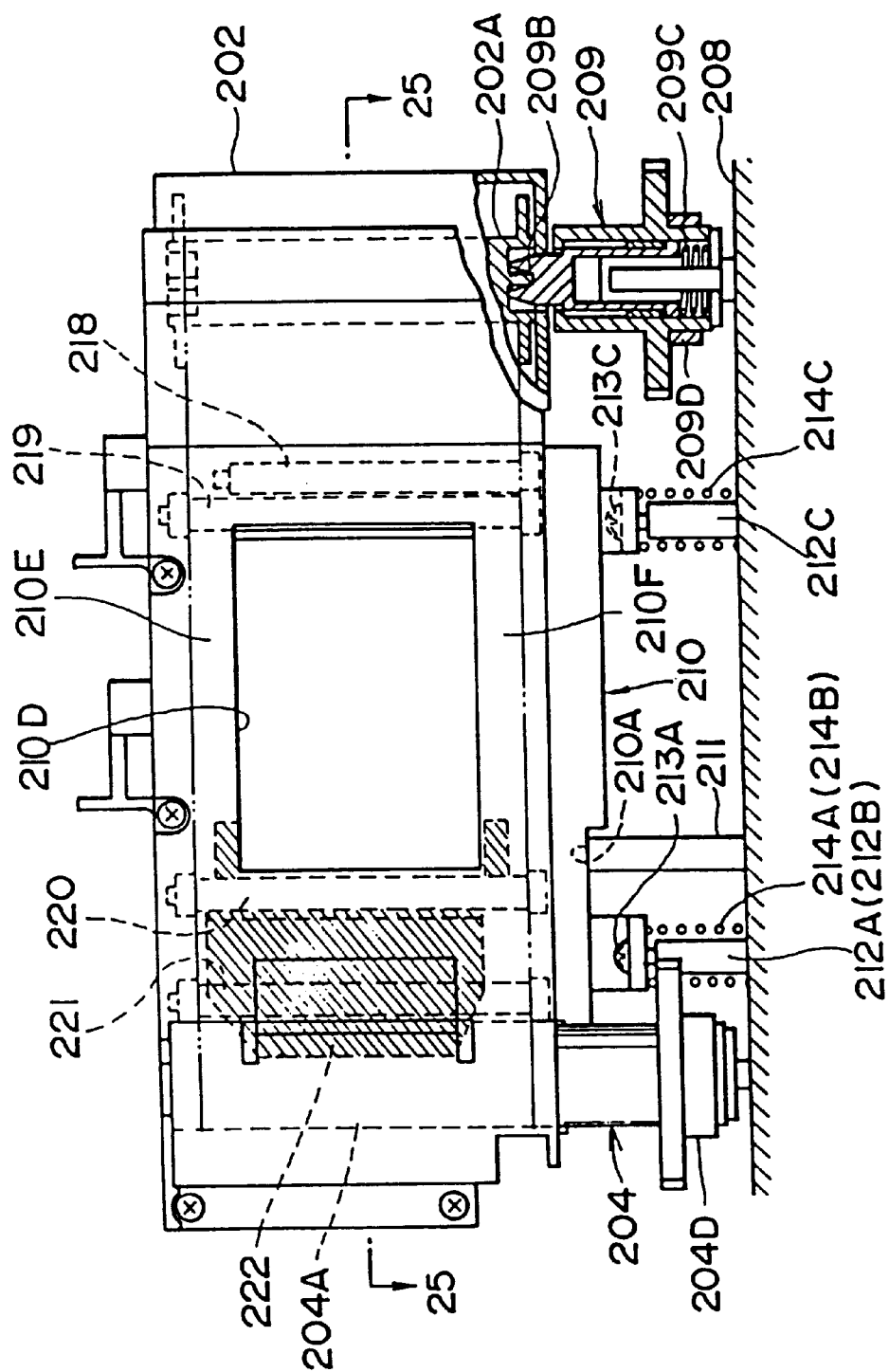
FIG. 24 is a plan view of a film guide mechanism employed in the film image input system shown in FIG. 23.

In FIG. 24, there is shown a front view of the film image input system, mainly the film guide mechanism thereof, when viewed from the side of the lighting unit 205 of FIG. 23. Also, in FIG. 25, there is shown a section view taken along the line 25—25 in FIG. 24.

As shown in FIG. 24, there is provided a base plate 208 on which a supply reel 209 and the take-up reel 204 are rotatably disposed. Also, on the base plate 208, there are erected a positioning pin 211 for resting a film guide member 210 thereon and three support pins 212A, 212B, 212C each having an internally threaded portion.

Figure 25:
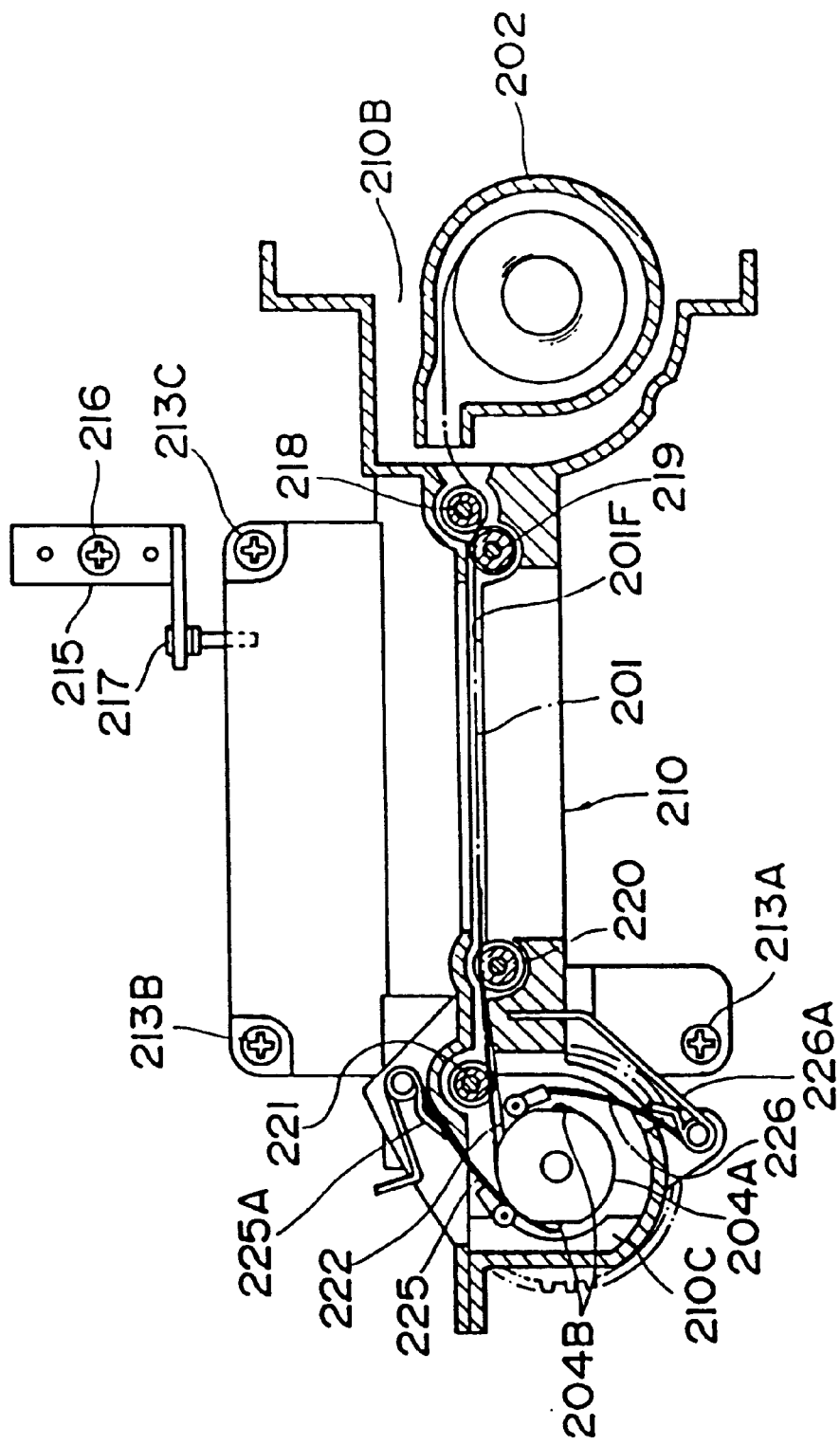
FIG. 25 is a section view taken along the line 25—25 in FIG. 24.

On the bottom surface of the film guide member 210, there is formed a hole 210A into which the positioning pin 211 can be fitted. The film guide member 210 can be positioned at one point thereof by the positioning pin 211 and can be threadedly mounted on to the support pins 212A, 212B, 212C by means of screws 213A, 213B, 213C (FIG. 25). Also, coil springs 214A, 214B, 214C are inserted into the support pins 212A, 212B, 212C, respectively, and the film guide member 210 are resiliently supported by means of these coil springs 214A, 214B, 214C.

And, the amounts of tightening of the screws 213A and 213B are adjusted to thereby control the film guide member 210 so that it can stand erect perpendicularly to the base plate 208. Also, the tightening amounts of the screws 213B and 213C are adjusted to thereby control the film guide member 210 so that it is parallel to the base plate 208.

On the other hand, as shown in FIG. 25, an angle 215 is fixed to the base plate 208 by a screw 216. A screw 217 is fixed to one end of the angle 215 and is also threadedly engageable with the film guide member 210. And, by turning the screw 217, the angle of the film guide member 210 can be adjusted so that the surface of the film can intersect the optical axis of the taking lens 206 at right angles. The positioning pin 211 is disposed in such a manner that it is located perpendicularly below the film 201 to be guided by the film guide member 210.

Now, the film guide member 210 includes a film storage part 210B for storing the film cartridge 202 which is stored in the cartridge holder 203, and a film storage part 210C in which a take-up shaft 204A of the take-up reel 204A is stored. Between the two film storage parts 210B and 210C, there is formed a window part 210D to which the film image of one frame of the film 201 faces and at the same time there are formed guide grooves 210E and 210F which are respectively used to guide the upper and lower ends of the film 201.

Also, on the entrance and outlet sides of the window part 210D of the film guide member 210, that is, on the entrance and outlet sides of an image pickup area to be photographed by the taking lens 206, there are disposed guide rollers 218, 219 and guide rollers 220, 221, respectively.

Figure 63A:
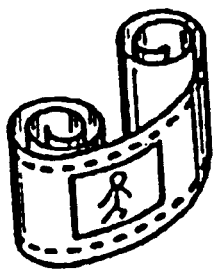
FIG. 63(A) is a view of a heavily curled, developed photographic film; and, FIG. 63(B) is a view of a developed photo film which is curved in the axial direction because it is enlarged.
Figure 63B:
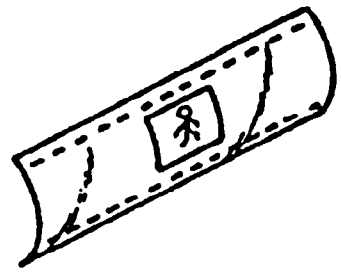

One pair of guide rollers 218, 219 are disposed so that they can guide the film 201 in an S-shaped manner or in a Z-shaped manner and the other pair of guide rollers 220, 221 are similarly disposed so that they can guide the film 201 in an S-shaped or Z-shaped manner. By means of these guide rollers 218, 219, 220, 221, as shown in FIG. 63(B), the film curved in the width direction can be flattened.

At least in the portions of the respective guide rollers 218, 219, 220, 221 that can contact with the image photographed range of the film, there are provided rollers, respectively. Due to this, even if dust is attached on to the surface of the film 201, the dust can never be stagnant in the contact portion with the guide rollers 218, 219, 220, 221, thereby protecting the film against strip-like damage due to the dust. In particular, it is effective to provide, in the guide member contactable with the emulsion surface side (the side of the guide rollers 219, 220) of the film 201, a guide roller which can be rotated with the movement of the film 20.

On the other hand, within the film guide member 210, there is provided a guide tongue piece 222 which extends from the guide roller 220 toward the take-up shaft 204A. The guide tongue piece 222 is formed of a material which is flexible and is softer than the film (such as vinyl chloride) and the piece 222 has a shape shown by oblique lines in FIG. 24.

Especially when the film 201 is sent out from the film cartridge 202 and the leading end of the film 201 is automatically wound round the take-up shaft 204A, the guide tongue piece 222 guides the leading end of the film 201 to the take-up side of the take-up shaft 204A (that is, the left side of the take-up shaft 204A in FIG. 25). That is, although the developed film is strongly curled, the guide tongue piece 222 prevents the leading end of the film from entering the right side of the take-up shaft 204A. Also, as the film 201 is wound round the take-up shaft 204A and the winding diameter is gradually increased, the guide tongue piece 222 retreats while it is contacting with the outer-most winding of the film 201.

Figure 26:
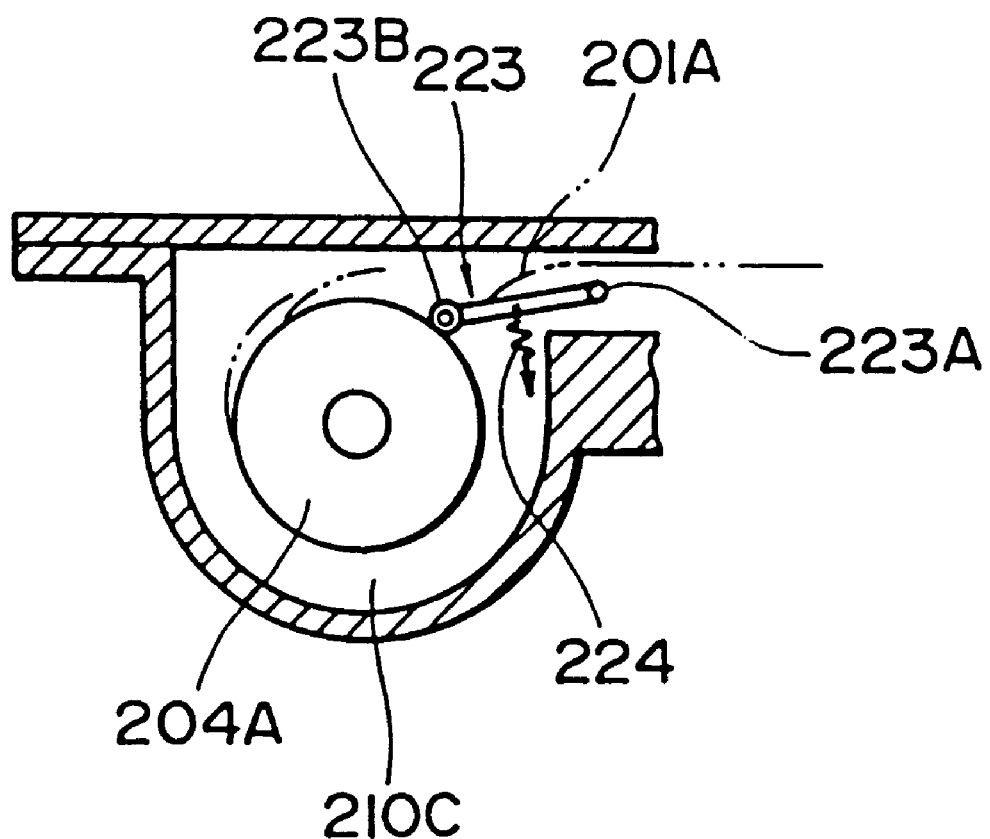
FIG. 26 is a section view of main portions of a guide arm used instead of a guide tongue piece shown in FIG. 25.

In FIG. 26, there is shown a guide arm 223 which can be used in place of the above-mentioned guide tongue piece 222. The guide arm 223 is free to rotate about its support shaft 223A and includes a roller 223B at the leading end thereof. Also, the guide arm 223 is energized in a counter clockwise direction by a spring 224, so that the roller 223B can contact with the take-up shaft 204A or the film wound round the take-up shaft 204A.

The guide arm 223, similarly as in the guide tongue piece 222, prevents the leading end 201A of the film 201 from entering the film storage part 210C on the right side of the take-up shaft 204A shown in FIG. 26.

In FIG. 25, there are provided film holders 225 and 226 round the take-up shaft 204A. The film holders 225 and 226 are respectively arranged in such a manner that the leading ends of the film holders 225 and 226 can be brought into contact with the take-up shaft 204A or the film wound round the take-up shaft 204A by means of torsion springs 225A and 226A, respectively. Also, in the periphery of the take-up shaft 204A, there is provided a claw portion 204B which is engageable with the perforations of the film 201. Therefore, after the film 201 is sent out from the film cartridge 202 and the leading end of the film 201 is guided by the guide tongue piece 222 and film holders 225, 226 and is wound round the take-up shaft 204A, if the take-up shaft 204A is rotated in the winding direction, then the claw portion 204B of the take-up shaft 204A is engaged with the perforations of the film 201 so that the film 201 can be taken up.

[Reel Drive Mechanism]

Figure 27:
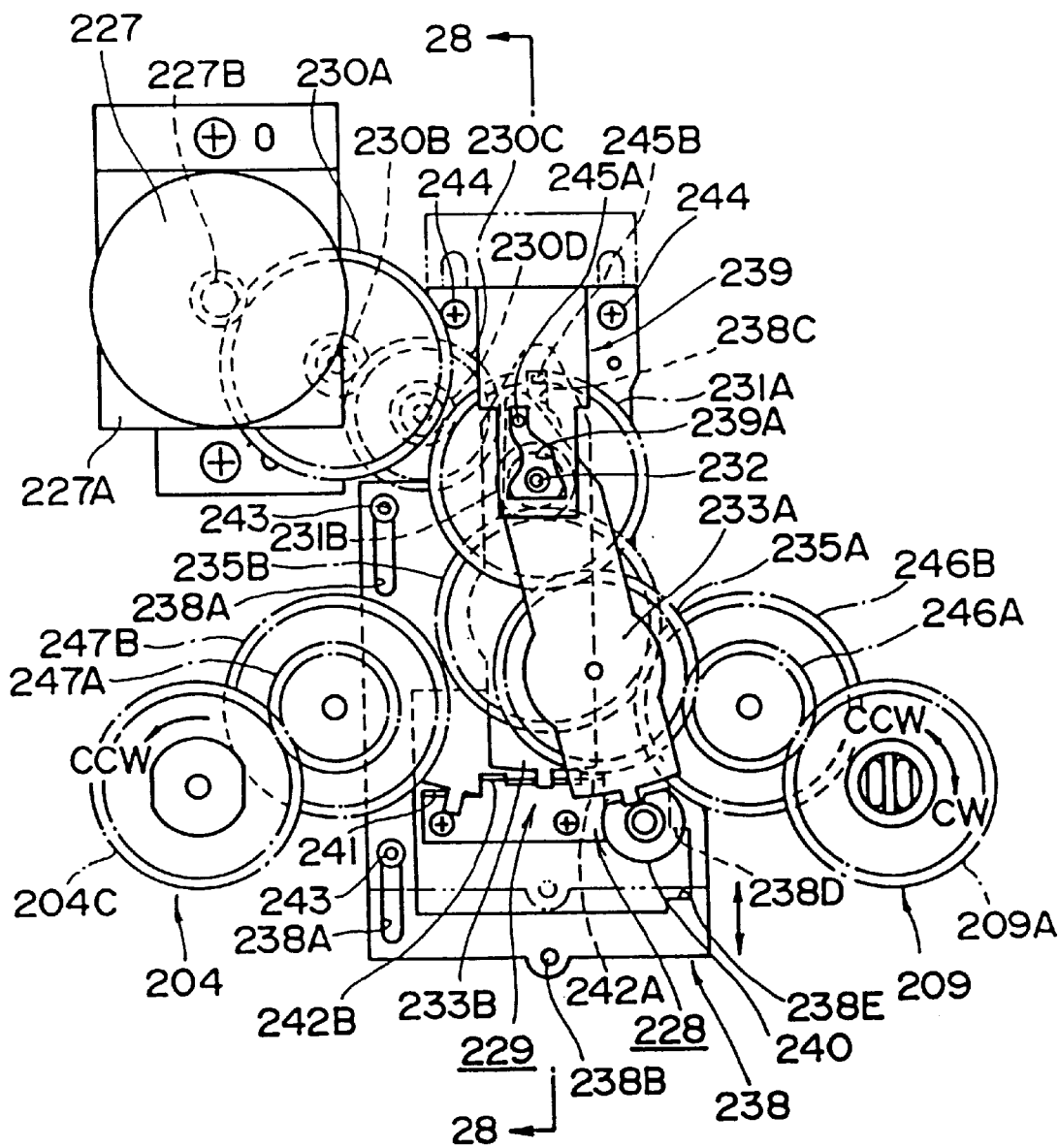
FIG. 27 is a plan view of a reel drive mechanism employed in the film image input system shown in FIG. 23.

In FIG. 27, there is shown a plan view of the film image input system of the invention, illustrating mainly a reel drive mechanism thereof. The reel drive mechanism is structured in such a manner that the fast feeding, rewinding, frame feeding, scan feeding and sending out of a film can be achieved by use of a single reel motor 227. In other words, a take-up reel 204 is rotated counter clockwise (CCW) at high speeds when the film is fast fed and the frames of the film are fed forwardly, a supply reel 209 is rotated clockwise (CW) at high speeds when the film is rewound and the frames of the film are fed reversely, the take-up reel 204 is rotated in the CCW direction at low speeds when the film is scan fed forwardly (+X scan), the supply reel 209 is rotated in the CW direction at low speeds when the film is scan fed reversely (−X scan), and the supply reel 209 is rotated in the CCW direction at high speeds when the film is sent out.

As shown in FIG. 27, the reel drive mechanism consists mainly of a reel motor 227, oscillating gear mechanisms 228, 229, and oscillation control means for controlling the oscillating ranges of the oscillating gear mechanisms 228, 229.

The reel motor 227 is a DC motor which can be rotated reversibly and the rotational speed of which can be changed on the order of 6 times when the voltage is varied in a range from 1.5 V to 9 V, for example. The reel motor 227 is placed on a motor mounting base 227A fixed to a base plate 208 (FIG. 24), and the rotary drive force of the reel motor 227 is transmitted from a gear 227B provided on the output shaft of the motor through reducing gears 230A, 230B, 230C, 230D to a gear 231A forming the oscillatory gear mechanism 228.

Figure 28:
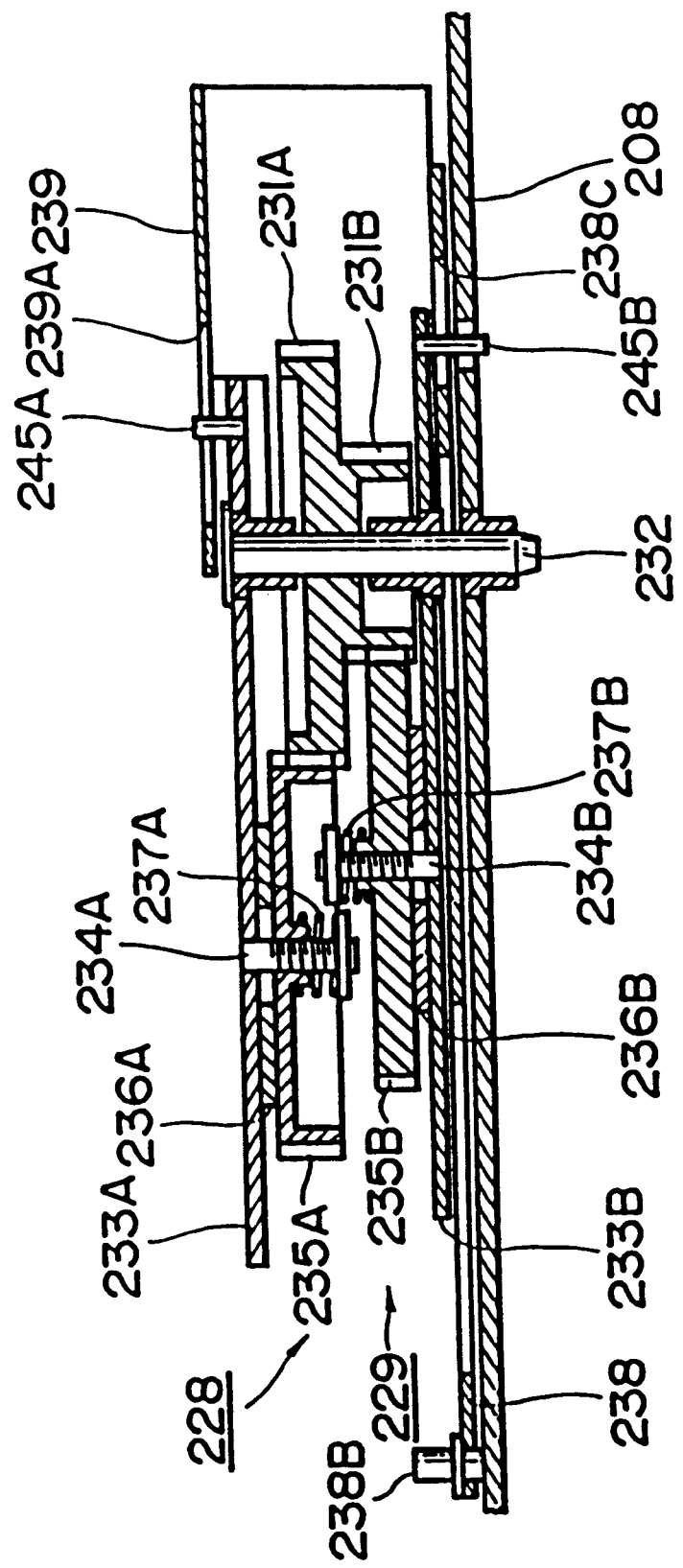
FIG. 28 is a section view taken along the line 28—28 in FIG. 27.

In FIG. 28, there is shown a section view taken along the line 28—28 in FIG. 27. As shown in FIG. 28, the oscillatory gear mechanisms 228, 229 are arranged in 2 stages, that is, in upper and lower stages. The oscillatory gear mechanism 228 in the upper stage consists mainly of an arm plate 233A and a gear 231A respectively disposed rotatable about a support shaft 232 erected on the base plate 208, and an oscillating gear 235A disposed rotatable about a threaded support shaft 234A erected on an arm plate 233A and engageable with the gear 231A. A friction member 236A is interposed between the arm plate 233A and gear 235A and the oscillating gear 235A is pressurized through a coil spring 237A in such a manner that a given rotational load by the friction member 236A can be applied thereto.

Similarly, the oscillating gear mechanism 229 in the lower stage comprises an arm plate 233B and a gear 231B respectively disposed rotatable about the support shaft 232, and an oscillating gear 235B disposed rotatable about a threaded support shaft 234B erected on the arm plate 233B and engageable with the gear 231B. A friction member 236B is interposed between the arm plate 233B and the oscillating gear 235B and the gear 235B is pressurized through a coil spring 237B in such a manner that a given rotational load by the friction member 236B can be applied thereto.

In FIG. 27, since the rotational load is applied to the oscillating gear 235A engageable with the gear 231A, if a rotational drive force is given to the gear 231A, then the arm plate 233A of the oscillating mechanism 228 in the upper stage is rotated in the same direction as the rotational direction of the gear 231A. Similarly, because the rotational load is applied to the oscillating gear 235B engageable with the gear 231B, if a rotational drive force is given to the gear 231B through the gear 231A, then the arm plate 233B of the oscillating mechanism 229 in the lower stage is rotated in the same direction as the rotational direction of the gear 231A (gear 231B).

The oscillation control means for controlling the oscillating ranges (rotating ranges) of above-mentioned the gear mechanisms 228, 229 comprises cam plates 238, 239, a holding member 240, stoppers 241, 242A, 242B and the like.

The cam plate 238 includes an elongated hole 238A which is in engagement with a pin 243 erected on the base plate 208. Due to this, the cam plate 238 is rotatably disposed on the base plate 208. The cam plate 238 includes a pin 238B erected thereon, which pin 238B is in engagement with a groove cam 283 (FIG. 38) which will be discussed later. For this reason, the cam plate 238 is moved according to the rotational positions of the groove cam 283.

Figure 29:
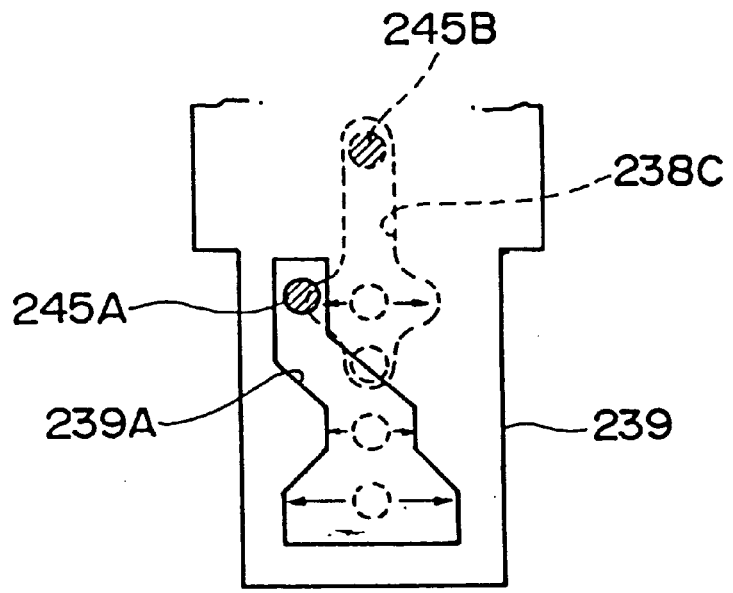
FIG. 29 is an enlarged view of main portions of FIG. 28, illustrating a cam mechanism for controlling the range of rotation of an oscillatory gear mechanism.

The cam plate 238 includes a cam groove 283C and stepped portions 238D, 238E, and a cam plate 239 having a cam groove 239A is fixed on to the cam plate 238 by a screw 244 (see FIG. 29). On the other hand, on the arm plate 233A there is erected a pin 245A which is engageable with the cam groove 239A of the cam plate 239, while on the arm plate 233B there is erected a pin 245B engageable with the cam groove 239C of the cam plate 238 (see FIG. 28).

Figure 30:
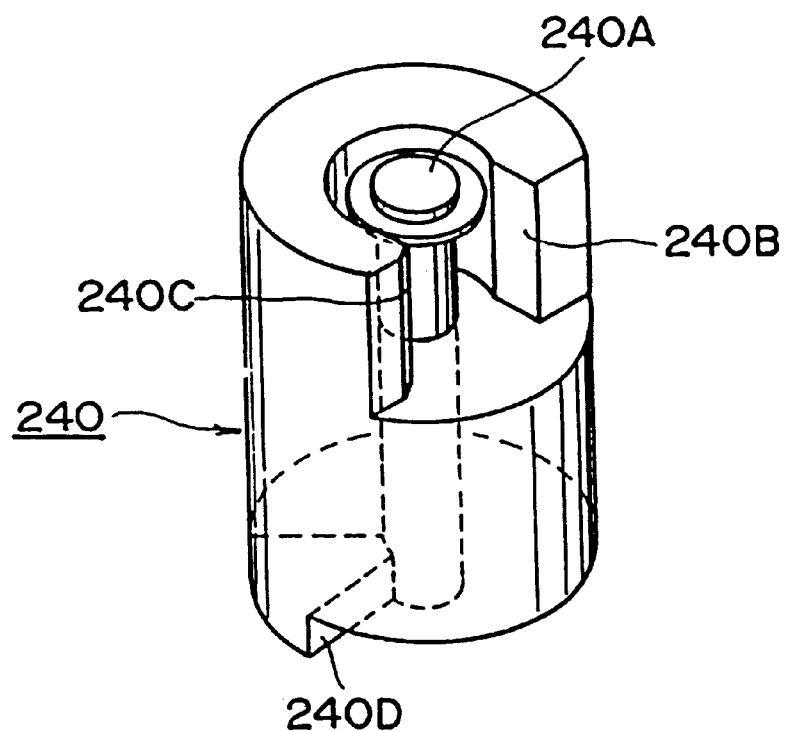
FIG. 30 is an enlarged perspective view of a press member shown in FIG. 27.

Also, a holder member 240 is disposed on the base plate 208 in such a manner that it is freely rotatable through a pin 240A, and the holder member 240 can be rotated, as occasion demands, by the stepped portions 238D, 238E of the cam plate 238. That is, as shown in FIG. 30, the holder member 240 includes an upper end portion which is formed substantially in a C shape and has stopper surfaces 240B and 240C. Also, the holder member 240 includes in the lower end portion thereof a raised portion 240D having a substantially fan shape. Due to this, if the stepped portion 238D of the cam plate 238 is brought into contact with the raised portion 240D, then the holder member 240 is rotated in the CW direction in FIG. 27 and, if the cam plate 238 is moved upwardly to bring the stepped portion 238E into contact with the raised portion 240D, then the holder member 240 is rotated in the CCW direction.

Next, description will be given below of the control of the rotating range of the oscillating gear mechanism 229 in the lower stage constructed in the above-mentioned manner.

When the cam plate 238 is situated at a position shown in FIG. 27, the pin 245B on the arm plate 233B is then inserted into a narrow groove in the cam groove 238C, with the result that the arm plate 233B is fixed to a neutral position (a position at which the oscillating gear 235B does not mesh with either of the gears 246B or 247B). For this reason, even if the rotational drive force is applied to the oscillating gear 235B from the reel motor 227, the oscillating gear 235B is not oscillated but runs idle at the neutral position.

On the other hand, if the cam plate 238 is moved upward a given amount in FIG. 27 and the pin 245B on the arm plate 233B arrives at a wide groove portion of the cam groove 238C (see FIG. 29), then the arm plate 233B becomes rotatable. And, if the gear 231B is rotated in the CCW direction by the reel motor 227, then the arm plate 233B is also rotated in the CCW direction and is abutted against the stopper 242A and the oscillating gear 235B meshes with a gear 246B. After then, if the gear 231B is rotated in the CCW direction, then the rotational drive force thereof is transmitted through the oscillating gear 235B to the gear 246B, and is further transmitted through a gear 246A coaxial with the gear 246B to the gear 209A of the supply reel 209. Due to this, the supply reel 209 is rotated in the CW direction. Similarly, if the gear 231B is rotated in the CW direction by the reel motor 227, then the arm plate 233B is also rotated in the CW direction and is abutted against the stopper 242B, and the oscillating gear 235B meshes with a gear 247B. After then, if the gear 231B is rotated in the CW direction, then the rotational drive force thereof is transmitted through the oscillating gear 235B to the gear 247B, and is further transmitted through a gear 247A coaxial with the gear 247A to the gear 204C of the take-up reel 204. Due to this, the take-up reel 204 is rotated in the CCW direction.

Next, description will be given of the control of the rotating range of the oscillating gear mechanism 228 in the upper stage.

When the cam plate 238 is situated at a position shown in FIG. 27, the pin 245A on the arm plate 233A is inserted into a narrow groove portion of the cam groove 239A, with the result that the arm plate 233A is forcibly rotated to a position at which the oscillating gear 235A meshes with the gear 246A. Also, at that time, the holder member 240 is rotated in the CW direction by the stepped portion 238D of the plate cam 238, and the stopper surface 240B (FIG. 30) is abutted against the leading end of the arm plate 233A to prevent the arm plate 233A from rotating in the CW direction.

Here, if the gear 231A is rotated in the CW direction by the reel motor 227, then a force to rotate the arm plate 233A in the CW direction is applied to the arm plate 233A. However, because the arm plate 233A is restricted by the stop surface 240B of the holder member 240 and also because the pin 245A is fitted into the narrow groove portion of the cam groove 239A, the arm plate 233A is not rotated, but the oscillating gear 235A is rotated in the CCW direction in mesh with the gear 246A. As a result of this, the gear 246A is rotated in the CW direction and the supply reel 209 is rotated in the CCW direction.

If the cam plate 238 is moved a given amount from the position shown in FIG. 27 and the pin 245A on the arm plate 233A arrives substantially at the center of the cam groove 239A, then the rotating range of the the arm plate 233A is controlled by the substantial center of the cam groove 239A (see FIG. 29). In such rotating range of the arm plate 233A, the oscillating gear 235A is not engageable with either of the gears 246A or 247A. At that time, the holder member 240 is rotatable and the rotation of the arm plate 233A is not controlled by the holder member 240. Also, due to the fact that the pin 245B on the arm plate 233B of the oscillating gear mechanism 229 in the lower stage is situated in the wide groove portion of the cam groove 238C (see FIG. 29), as described before, the supply reel 209 can be rotated in the CW direction by the oscillating gear 235B or the take-up reel 204 can be rotated in the CCW direction.

Next, if the cam plate 238 is moved from the position shown in FIG. 27 to a position shown by a one-dot chained line and the pin 245A on the arm plate 233A arrives at the wide groove portion of the cam groove 239A, then the rotating range of the the arm plate 233A will never be controlled by the cam groove 239A (see FIG. 29). Also, at that time, the holder member 240 is rotated in the CCW direction by the stepped portion 238E of the cam plate 238.

Here, if the gear 231A is rotated in the CCW direction by the reel motor 227, then the arm plate 233A is also rotated in the CCW direction and is abutted against the stopper surface 240C of the holder member 240 (FIG. 30) and the oscillating gear 235A comes into mesh with the gear 246A. After then, if the gear 231A is rotated in the CCW direction, then the rotational drive force thereof is transmitted through oscillating gear 235A and gear 246A to the gear 209A of the supply reel 209. In this way, the supply reel 209 is rotated in the CW direction. Similarly, if the gear 231A is rotated in the CW direction by the reel motor 227, then arm plate 233A is also rotated in the CW direction and is abutted against the stopper 241 and the oscillating gear 235A comes into mesh with the gear 247A. After then, if the gear 231A is rotated in the CW direction, then the rotational drive force thereof is transmitted through the oscillating gear 235A and gear 247A to the gear 204C of the take-up reel 204. In this way, the take-up reel 204 is rotated in the CCW direction.

As described above, by advancing and retreating the cam plate 238, either of the oscillating gear mechanism 228 in the upper stage or the oscillating gear mechanism 229 in the lower stage is made operable, so that the rotational drive force in the CW direction can be transmitted from the reel motor 227 to the supply reel 209 and at the same time the rotational drive force in the CCW direction can be transmitted to the take-up reel 204.

Here, when compared with the oscillating gear mechanism 228 in the upper stage, the oscillating gear mechanism 229 in the lower stage can reduce the rotary speed down to ¼. And, when the film is scan fed, the supply reel 209 or take-up reel 204 is driven through the oscillating gear mechanism 229 in the lower stage to feed the film at low speeds. On the other hand, in the winding, rewinding and frame feeding of the film, the supply reel 209 or take-up reel 204 is driven through the oscillating gear mechanism 228 in the upper stage to feed the film at high speeds. That is, as described before, since the reel motor 227 is able to change the rotational speed on the order of 6 times and also is able to change the gear ratio (1:4) by means of the upper-stage oscillating gear mechanism 228 and lower-stage oscillating gear mechanism 229, the feeding speed of the film can be changed up to on the order of 22–23 times.

Also, by advancing and retreating the cam plate 238, the oscillating gear mechanism 228, as shown in FIG. 27, is fixed unoscillatable, whereby the rotational drive force in the CCW direction can be transmitted from the reel motor 227 through the oscillating gear mechanism 228 to the supply reel 209. That is, by rotating the supply reel 209 in the CCW direction, the film 201 can be sent out from the film cartridge 202.

Figure 31:
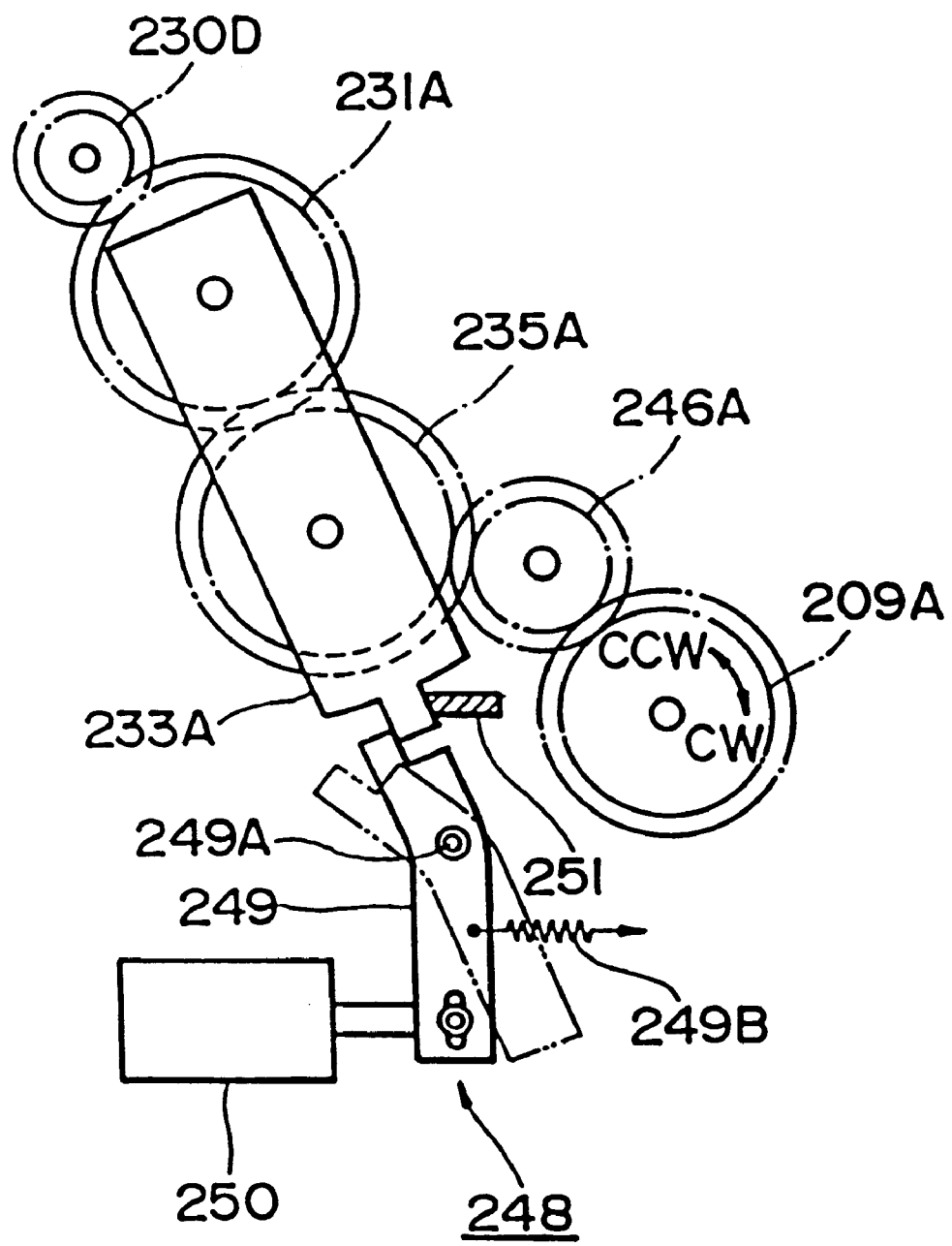
FIG. 31 is a view of a press mechanism instead of the press member shown in FIG. 27.

In FIG. 31, there is shown a holding mechanism 248 which can be used in place of the holder member 240. In FIG. 31, the same parts as in FIG. 27 are given the same designations. As shown in FIG. 31, the holding mechanism 248 consists mainly of a lever 249 and a solenoid 250.

The lever 249 is disposed rotatable by means of a support shaft 249A and it is energized in the CCW direction by a spring 249B and, normally, it is retreated from the arm plate 233A as shown by a broken line. The solenoid 250 is driven when the film is sent out, and rotates the lever 249 in the CW direction to a position shown by a solid line against the energizing force of the spring 249B. By means of this, the arm plate 233A is fixed at a position shown in FIG. 27 by the lever 249. Numeral 251 designates a stopper.

According to the above-mentioned holding mechanism 248, the oscillating gear 235A can be fixed unoscillatable as occasion demands and the supply reel 209 can be rotated in the CCW direction, that is, in such a direction as can send out the film.

[Cartridge Mounting Mechanism]

Figure 32:
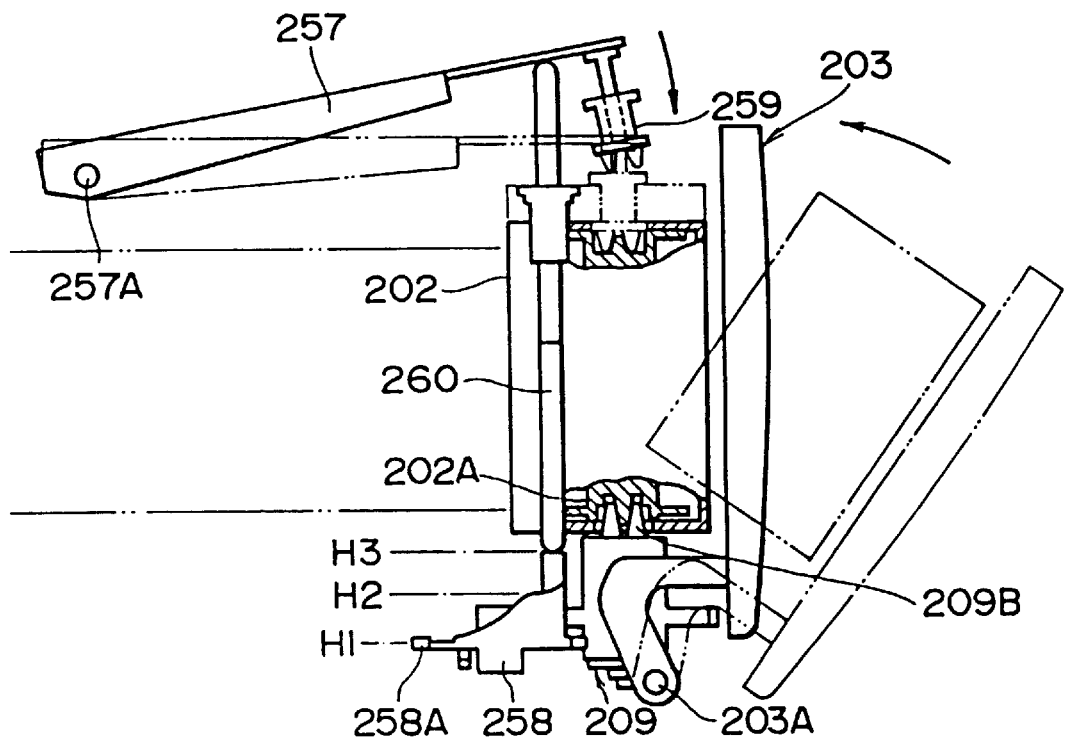
FIG. 32 is a front view of main portions of a cartridge mounting mechanism employed in the film image input system shown in FIG. 23.
Figure 33:
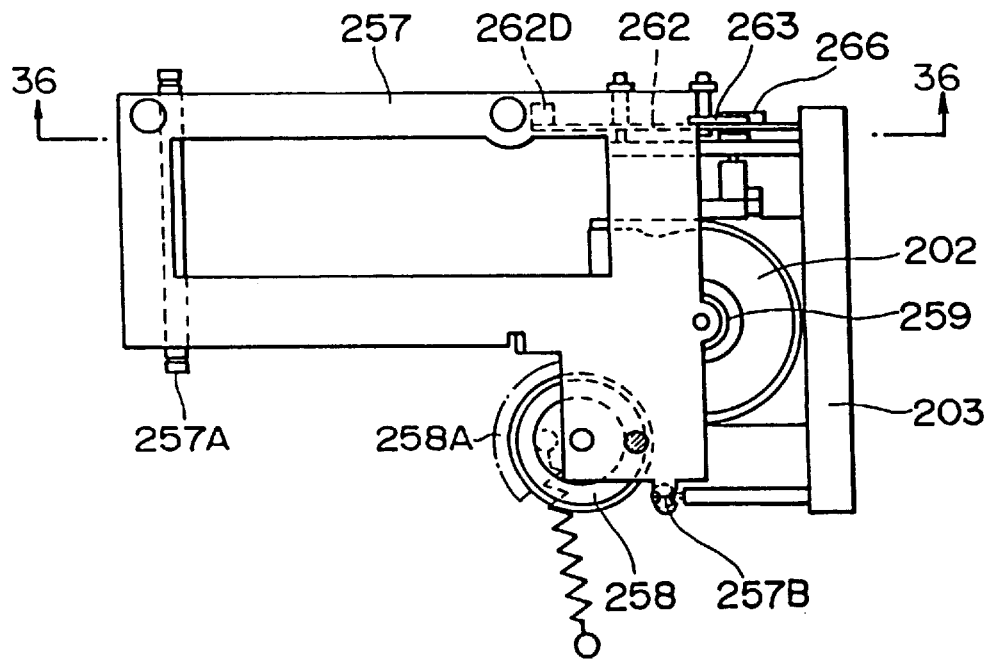
FIG. 33 is a plan view of main portions of the above-mentioned cartridge mounting mechanism.
Figure 34:
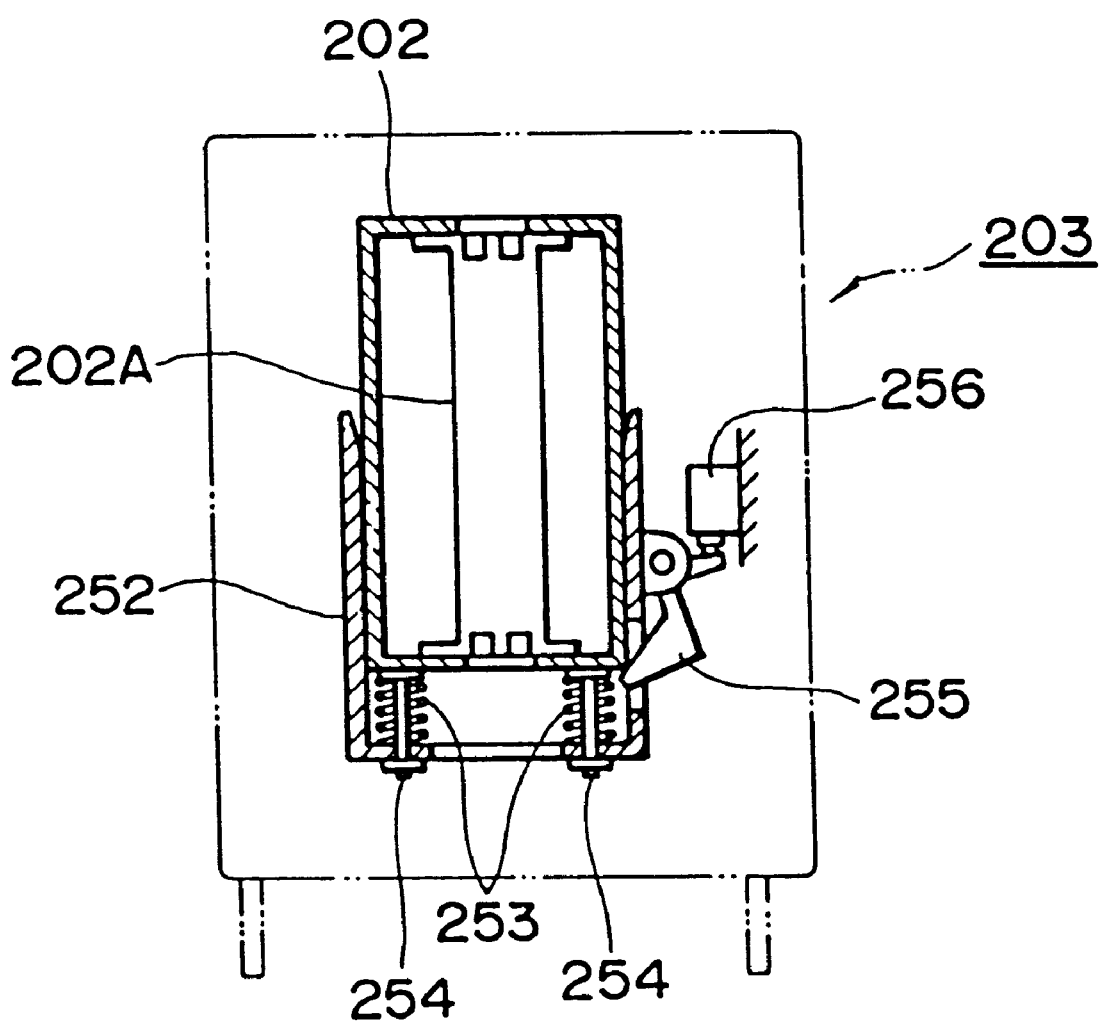
FIG. 34 is a perspective view of interiors of a cartridge holder employed in the above cartridge mounting mechanism.

FIGS. 32 and 33 are respectively front and plan views of main portions of the present film image input system, illustrating mainly a cartridge mounting mechanism thereof, and FIG. 34 is a perspective view of interiors of a cartridge holder 203.

As illustrated in these figures, the cartridge mounting mechanism consists mainly of the cartridge holder 203, a hold arm 257, an end face cam 258 and the like.

The cartridge holder 203 is constructed in such a manner that it can be opened and closed by a support shaft 203A. As shown in FIG. 23, when the cartridge holder 203 is opened and closed, the film cartridge 202 can be inserted into the film cartridge holder 203 and also the film cartridge 202 can be taken out from the cartridge holder 203.

The cartridge holder 203, as shown in FIG. 34, includes a storage portion 252 which is used to store the film cartridge 202. In the bottom portion of the storage portion 252, there is formed an opening 252A into which a head portion 209B (FIG .32) of the supply reel 209 can be inserted and also there is provided a push-up pin 254 which can be pushed up by a coil spring 253. The push-up pin 254, prior to mounting of a spool 202A of the film cartridge 202 into a head portion 209B of the supply reel 209, floats the film cartridge 202 a given amount within the storage portion 252 in order for the film cartridge 202 not to interfere with the supply reel 209.

Also, in the side portion of the storage portion 252, there is provided a cartridge detector which comprises a cartridge detect lever 255 and a microswitch 256. If the film cartridge 202 is stored in the storage portion 252, then the leading end of the cartridge detect lever 255 comes into contact with the film cartridge 202. Due to such contact, the cartridge detect lever 255 is rotated about a support shaft 255A in the CCW direction in FIG. 34, and the trailing end of the lever is pressed against a plunger of the microswitch 256 to thereby turn on the microswitch 256. For this reason, the presence and absence of the film cartridge 202 can be detected by confirming the on/off of the microswitch 256.

The hold arm 257, as shown in FIGS. 32 and 33, is disposed rotatable by means of a support shaft 257A and is also energized in the CW direction in FIG. 32 by a coil spring 257B (FIG. 33). In the leading end of the hold arm 257 there is provided a spool hold member 259 which is freely rotatable. The spool hold member 259 serves as a hold shaft which holds the upper end side of the spool 202A of the film cartridge 202 in a freely rotatable manner and also serves as a press member for pressing against the film cartridge 202 so that the lower end side of the spool 202A of the film cartridge 202 can be loaded into the head portion 209B of the supply reel 209.

The end face cam 258 is used to rotate the hold arm 257 by means of a pin 260, and includes a cam surface which, as shown in FIG. 32, has heights H1, H2, and H3 in three stages. On the periphery of the end face cam 258, in part, there is provided a gear 258A which is adapted to be able to mesh with a gear 283B of a groove cam 283 (FIG. 38) to be discussed later. Therefore, the end face cam 258 can be rotated acc ording to the rotational positions of the groove cam 283 to rotate the hold arm 257 according to the heights of the end face contacted by the pin 260.

Next, description will be given below of the operation of the cartridge mounting mechanism constructed in the above-mentioned manner.

At first, as shown in FIG. 34, the film cartridge 202 is inserted into the storage portion 252 of the cartridge holder 203. At the then time, the film cartridge 202 is being floated a given amount within the storage portion 252 by means of the push-up pin 254.

Then, the cartridge holder 203 is turned from its open state shown by a two-dot chained line in FIG. 32 into its closed state shown by a solid line in FIG. 32. It should be noted here that, when the cartridge is mounted, the end face cam 258 is previously rotated so that the lower end of the pin 260 is situated at the end face height H2.

After then, the end face cam 258 is rotated i n the CCW direction in FIG. 33 so that the lower end of the pin 260 is moved to the end face H1 from the end face H2. As a result of this, the hold arm 257 is rotated to a position shown by a two-dot chained line in FIG. 32 by the energizing force of the coil spring 257B, during which rotation the spool hold member 259 pushes down the film cartridge 202 to thereby load the low e r end side of the spool 202A into the head portion 209B of the supply reel 209. It should be noted here that the head portion 209B, as shown in FIG. 24, is energized in a projecting direction by the spring 209C, thereby allowing the lower end side of the spool 202A to be positively loaded into the head portion 209B of the supply reel 209.

Figure 35:
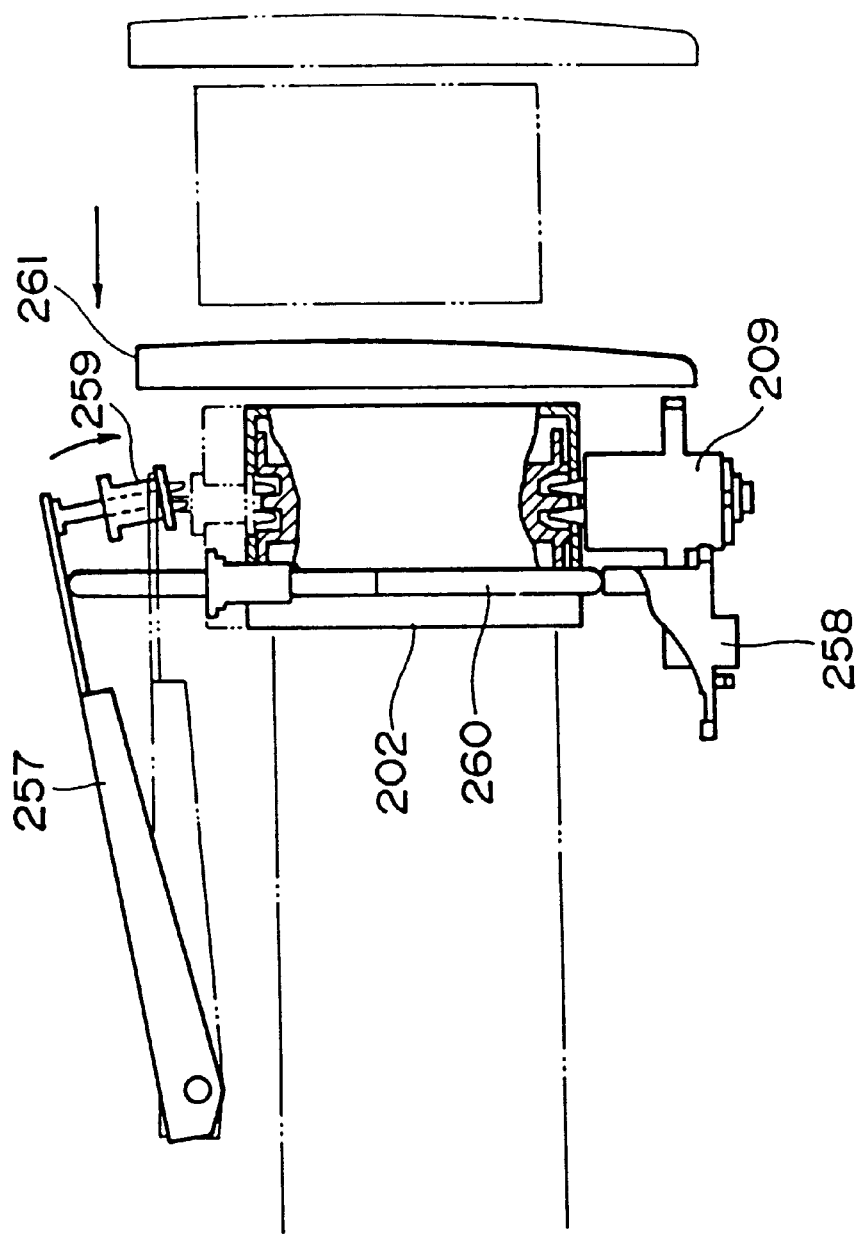
FIG. 35 is a front view of main portions of another embodiment of the cartridge mounting mechanism.

In FIG. 35, the re is shown another embodiment of a cartridge mounting mechanism according to the invention. In FIG. 35, the same parts as in FIG. 32 are given the same designations.

While the cartridge mounting mechanism illustrated in FIG. 32 and other figures is structured in such a manner that the cartridge holder 203 can be opened and closed by means of the support shaft 203A9 the cartridge mounting mechanism shown in FIG. 35 is different from the above-mentioned cartridge mounting mechanism in that a cartridge holder 261 can be moved parallel as shown by a two-dot chained line.

When the film cartridge 202 is mounted into the cartridge mounting portion by use of the present cartridge mounting mechanism, after the film cartridge 202 is stored in the cartridge holder 261, the cartridge holder 261 is manually or electrically moved parallel from a position shown by a two-dot chained line to a position shown by a solid line, and after then the film cartridge 202 is pushed into the supply reel 209 in the axial direction thereof by use of a hold arm 257.

In the above-mentioned embodiments, description has been given of a film cartridge mounting mechanisms each having a single spool. However, this is not limitative, but a cartridge mounting mechanism having two spools can also be constructed almost similarly to the above-mentioned cartridge mounting mechanisms. In this case, two hold members are necessary so as to be able to correspond to the two spools, and the take-up reel has a similar structure to the supply reel.

[Holder Lock Mechanism]

Figure 36:
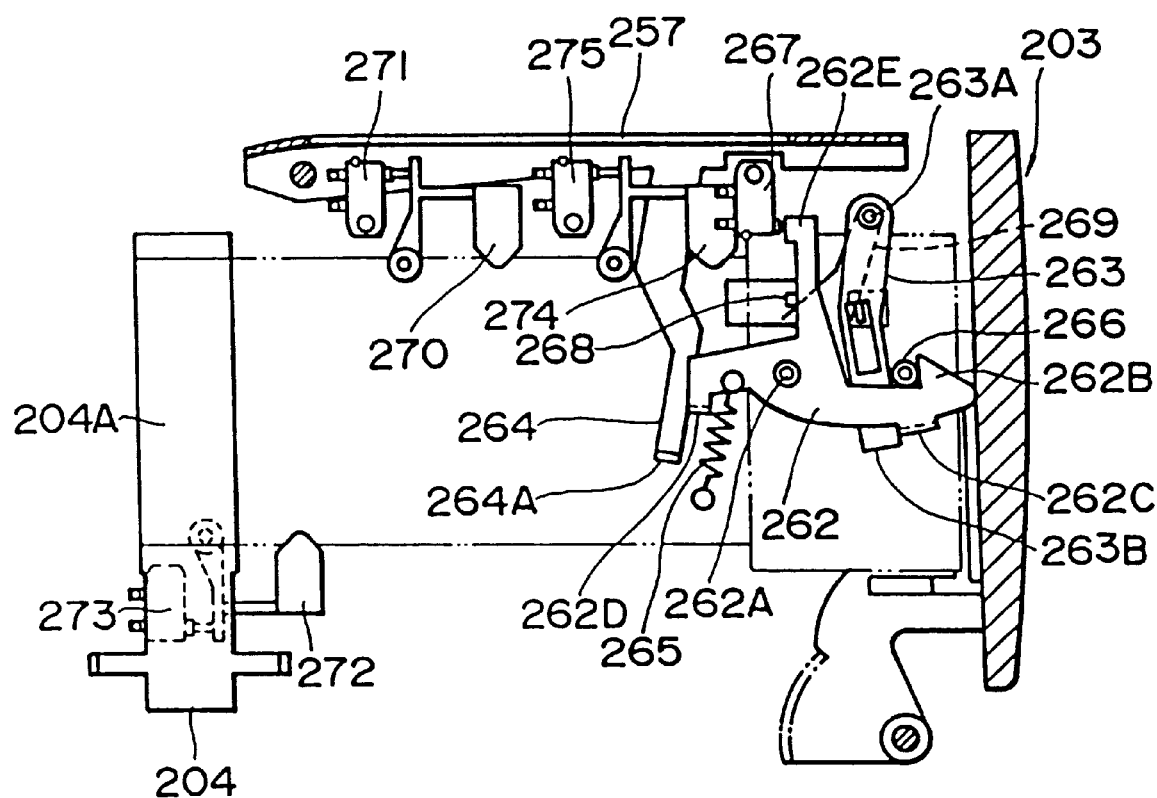
FIG. 36 is a section view taken along the line 36—36 in FIG. 33, mainly illustrating a holder lock mechanism employed in the film image input system shown in FIG. 23.

In FIG. 36, there is shown a section view taken along the line 36—36 in FIG. 33. FIG. 36 illustrates mainly a holder lock mechanism.

As shown in FIG. 36, the holder lock mechanism is used to lock the cartridge holder 203 and consists mainly of a lock lever 262, a lever 263, a lock removing member 264 and the like.

The lock lever 262 is disposed such that it is free to rotate by means of a support shaft 262A and is energized in the CCW direction by a coil spring 265. The lock lever 262 includes a hook portion 262B for engagement with a lock pin 266 provided on the side portion of the cartridge holder 203, a curved portion 262C for contact with the leading end portion 263B of the lever 263, a curved portion 262D for contact with a curved portion 264A provided in the lower end portion of the lock removing member 264, and a lever portion 262E for turning on/off a microswitch 267. Here, numeral 268 designates a stopper of the lock lever 262.

The lever 263 is disposed such that it is free to rotate by means of a support shaft 263A and is energized in the CCW direction by a torsion spring 269. Also, the lock removing member 264 is provided integrally in the hold arm 257.

Next, description will be given below of the operation of the holder lock mechanism constructed in the above-mentioned manner.

In FIG. 36, there is shown a state of the holder lock mechanism in which it is locking the cartridge holder 203, with the hook portion 262B of the lock lever 262 in engagement with the lock pin 266.

In order to remove the cartridge holder from the locked state by the holder lock mechanism, as shown in FIG. 32, the end face cam 258 is rotated so that the lower end of the pin 260 is situated at the end face height H3 and the hold arm 257 is lifted up to a position shown by a solid line. Due to this, the lock removing member 264 integral with the hold arm 257 is also lifted upwardly in FIG. 36 and is thus brought into contact with the curved portion 262D of the lock lever 262, thereby rotating the lock lever 262 in the CW direction against the energizing force of the coil spring 265. When the lock lever 262 is rotated in the CW direction, then the hook portion 262B of the lock lever 262 is disconnected from the lock pin 266 to remove the locking of the cartridge holder 203, so that the cartridge holder 203 is automatically opened by a spring (not shown).

Also, when the lock lever 262 is rotated in the CW direction, then the, lever 263 becomes rotatable and is then rotated in such a manner that the leading end 263B thereof is moved to a position above the curved portion 262C of the lock lever 262.

In this state, the end face cam 258 is rotated so that the lower end of the pin 260 is moved from the end face height H3 to the end face height H2 (FIG. 32). Due to this, while the curved portion 264A of the lock removing member 264 is separated apart from the curved portion 262D of the lock lever 262, the other curved portion 262C of the lock lever 262 is brought into contact with the leading end 263B of the lever 263. For this reason, the rotational movement of the lock lever 262 by the coil spring 265 in the CCW direction is stopped. Also, at that time, the lever portion 262E is separated apart from the plunger of the microswitch 267, thereby turning off the microswitch 267.

On the other hand, in the above state, if the cartridge holder 203 is closed, then the lock pin 266 pushes down the hook portion 262B of the lock lever 262 and after then moves the lever 263 in the CW direction. This removes the engagement between the curved portion 262C of the lock lever 262 and the leading end portion 263B of the lever 263 to thereby rotate the lock lever 262 in the CCW direction, so that the hook portion 262B of the lock lever 262 is engaged with the lock pin 266, as shown in FIG. 36.

Also, at that time, the lever portion 262E of the lock lever 262 presses against the plunger of the microswitch 267 to thereby turn on the microswitch 267. That is, it is possible to detect the opening and closing of the cartridge holder 203 by means of the on/off of the microswitch 267.

[Various Detectors Used in the Fourth Embodiment]

Various detectors used in the fourth embodiment include not only the cartridge detectors (cartridge detect lever 256, microswitch 257) shown in FIG. 34 and the holder lock detectors (lever portion 262E, microswitch 267) shown in FIG. 36, but also a frame detector, a film leading end detector, a film trailing end detector and a scan position detector.

As shown in FIG. 36, the frame detector comprises a detect lever 270 and a microswitch 271, the film leading end detector comprises a detect lever 272 and a microswitch 273, and the film trailing end detector comprises a detect lever 274 and a microswitch 275. The detect levers 270 and 274 are respectively disposed to be contactable with the upper end of the film, while the detect lever 272 is disposed to be contactable with the lower end of the film.

When it falls into the notch 124A (FIG. 10) provided in each of the frames of the film, the detect lever 270 of the frame detector is rotated in the CW direction in FIG. 36 to turn the microswitch 271 from on to off. That is, the time when the microswitch 271 is switched from on to off is a frame detect time.

The detect lever 272 of the film leading end detector is rotated in the CW direction by the stepped portion of the cutaway portion 124B (FIG. 10) formed in the leading end of the film when the film is sent out, thereby turn the microswitch 273 from off to on. That is, the time when the microswitch 273 is turned from off to on is a film leading end detect time. When the film leading end is detected, the film leading end has been sent out to a position to allow winding of the film round the take-up shaft 204A.

The detect lever 274 of the film trailing end detector is rotated in the CW direction by the stepped portion of the cutaway portion 124C (FIG. 10) formed in the trailing end portion of the film to thereby turn the microswitch 275 from on to off. That is, the time when the microswitch 275 is turned from on to off is a film trailing end detect time. However, the microswitch 275 is arranged in such a manner that, even if the detect lever 274 falls into the notch 124A shallower than the cutaway portion 124C, the microswitch 275 cannot be turned off.

Figure 37:
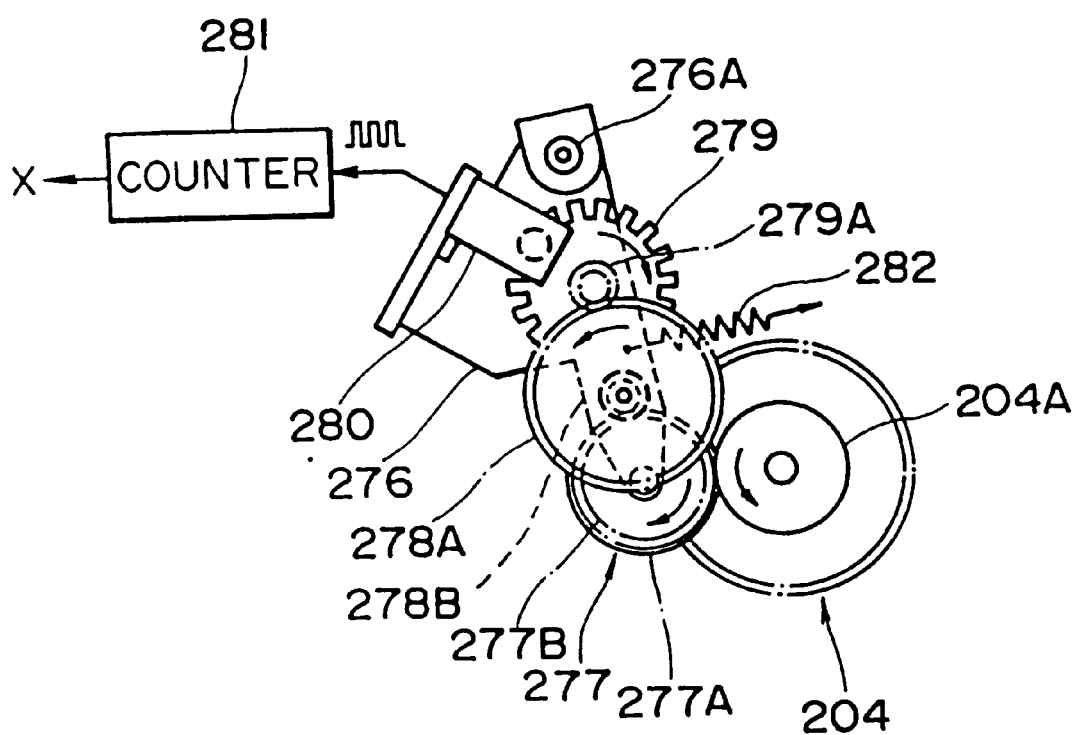
FIG. 37 is a view of a scan position detector used in the film image input system shown in FIG. 23.

Also, the scan position detector, as shown in FIG. 37, consists mainly of an arm plate 276, a roller 277, a slit plate 279, a photo interrupter 280, and a counter 281.

The arm plate 276 is disposed to be freely rotatable by means of a support shaft 276A and the roller 277 provided on the leading end of the arm plate 276 is energized by a spring 282 so that it is brought into contact with the take-up shaft 204A or with the film taken up round the take-up shaft 204A. On the outer peripheries of the roller 277, a rubber 277A is mounted and a gear 277B is also provided, and if the take-up shaft 204A is rotated, then the rotational drive force thereof is transmitted through the rubber 277A to the roller 277. In turn, the rotational drive force of the roller 277 is transmitted through the gears 277B, 278B, 278A to a gear 279A coaxial with the slit plate 279 to thereby rotate the slit plate 279. The rotational speed of the slit plate 279 is greatly increased over the rotational speed of the roller 277.

The slit plate 279 opens and closes the optical path of the photo interrupter 280 by means of its concave and convex portions and the photo interrupter 280 outputs an electric signal according to the opening and closing of the optical path thereof (namely, a signal of the number of pulses corresponding to the number of concave and convex portions to be passed).

The counter 281 is used to count the pulse signals applied from the photo interrupter 280 and the count value of the counter 281 is reset to 0 when the frame detection by the above-mentioned frame detector is executed. That is, the scan position of the film from the frame detection position (a frame reference position) can be detected by the count value of the counter 281.

[Mode Select Mechanism and Reel Brake]

Figure 38:
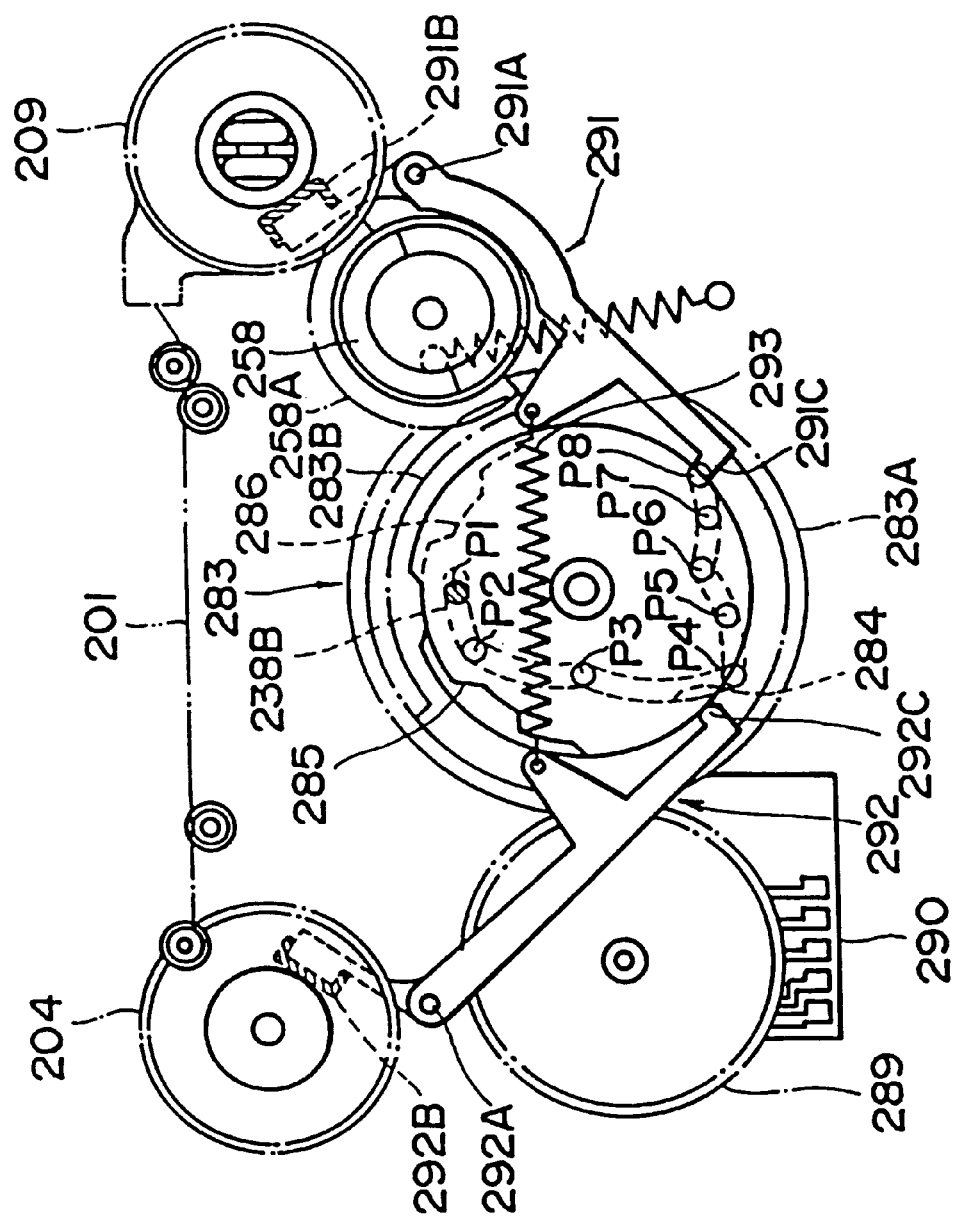
FIG. 38 is a view of main portions of a mode select mechanism and a reel brake employed in the film image input system shown in FIG. 23.

In FIG. 38, there are shown the main portions of a mode select mechanism and reel brake brakes. The mode select is used to select properly an eject mode, a wait mode, a film send-out mode, a film fast feed mode, a film rewind mode, a frame feed mode, and a scan feed mode.

As shown in FIG. 38, there is interposed a groove cam 283 between the supply reel 209 and take-up reel 204. The groove cam 283 includes a cam groove 284 on the bottom surface thereof and cam surfaces 285 and 286 respectively in upper and lower stages in the upper portion thereof.

A rotational drive force is transmitted from a mode motor (not shown) through gears 289, 283A to the groove cam 283, so that the groove cam 283 is rotated to the rotational position thereof corresponding to the mode properly selected. The gear 289 includes a brush on the lower surface thereof and a code plate 290 is disposed at a position opposed to the gear 289. And, The position of the brush of the gear 289, that is, the rotational positions of the groove cam 283 corresponding to the respective modes can be detected in accordance with the terminal outputs of the code plate 290.

The gear 258A of the end face cam 258 is in mesh with a gear 283B formed in the groove cam 283 and, only when the groove cam 283 is in a given rotating range (from 0° to 90°), the rotational drive force of the groove cam 283 is transmitted to the end face cam 258 so that the end face cam 258 can be rotated.

Now, the groove cam 283 has a cam groove 238C in engagement with a pin 238B provided in the cam plate 238 (FIG. 27). Thus, the groove cam 283 can move the cam plate 238 according to the rotation thereof to thereby the oscillating ranges of the oscillating gear mechanisms 228, 229, as described in connection with FIG. 27.

On the other hand, the reel brakes of the supply reel 209 and take-up reel 204 respectively consist mainly of brake arms 291, 292. The rotational positions of the brake arms 291, 292 are controlled by the cam surfaces 285, 286 of the groove cam 283, respectively. The brake arms 291, 292 apply soft brake and full brake to the supply reel 209 and take-up reel 204 and also release such brakes.

In other words, the brake arm 291 is disposed to be freely rotatable by means of a support shaft 291A and includes a brake pad 291B mounted to the leading end thereof and a projection 291C in the trailing end thereof, which projection 291C is engageable with the cam surface 285. Similarly, the brake arm 292 is disposed to be freely rotatable by means of a support shaft 292A. The brake arm 292 includes a brake pad 292B mounted to the leading end thereof and also includes in the trailing end thereof a projection 292C which is engageable with the cam surface 286. These brake arms 291 and 292 are respectively pulled toward each other by means of a coil spring 293 and the projections 291C and 292C are normally in contact with the cam surfaces 285 and 286, respectively. The brake pads 291B and 292B are respectively contactable with rubbers 209D and 204D (FIG. 24) respectively mounted to the supply reel 209 and take-up reel 204.

Also, the cam surfaces 285 and 286 respectively include recessed portions in two stages and differing in depth from each other. When the projections 291C, 292C fall down into the shallow recessed portions, respectively, then the brake arms 291 and 292 respectively apply the soft brake to the supply reel 209 and take-up reel 204 and, when the projections fall down into the deep recessed portions, then the brake arms 291 and 292 apply the full brake to the supply reel 209 and take-up reel 204, respectively.

Next, description will be given below in detail of the operation of the mode select mechanism constructed in the above-mentioned manner with reference to FIG. 39 in which there is shown a diagrammatic view of the groove cam 283.

A state shown in FIG. 38 provides the eject mode. If the groove cam 283 is rotated 30°, 90°, 150°, 170°, 190°, 210°, and 230° sequentially in the CW direction from the state (0°) shown in FIG. 38, then the pin 238B of the cam plate 238 is moved from the position P1 of the cam groove 284 to positions P2, P3, P4, P5, P6, P7, and P8 sequentially. Here, P2 designates a wait position, P3 a film send-out mode position, P4 a film fast feed mode position (+frame feed mode position), P5 a scan feed mode (+X scan) position, P6 a stop position, P7 a scan feed mode (−X scan) position, and P8 a film rewind mode position (−frame feed mode position).

In other words, in the eject mode (P1), as described in connection with FIG. 32, the lower end of the pin 260 is situated at the end face height H3 of the end face cam 258 and the hold arm 257 is pushed up to the end of rotation in the CCW direction. As a result of this, the locking of the cartridge holder 203 can be removed by the lock removing member 264 formed integrally with the hold arm 257 (see FIG. 36).

In the wait position (P2), the end face cam 258 is rotated in such a manner that the lower end of the pin 260 is moved from the end face height H3 to H2 (FIG. 32). As a result of this, as described before, the cartridge holder 203, which has been unlocked in the eject mode, can be locked.

In the film send-out mode (P3), the end face cam 258 is rotated so that the lower end of the pin 260 is moved from the end face height H2 to H1. Consequently, the hold arm 257 pushes down the film cartridge 202 through the spool holding member 259 and the lower end side of the spool 202A is loaded into the head portion 209B of the supply reel 209 (FIG. 32).

On the other hand, in the film send-out mode (P3), the cam plate 238 is moved by the groove cam 283 to a position shown in FIG. 27. As a result of this, as described before, the oscillating gear mechanism 228 is moved to a position shown in FIG. 27 and is also fixed unoscillatable by the hold member 240. That is, the supply reel 209 can be rotated in the CCW direction (film send-out direction) by the reel motor 227 through the oscillating gear mechanism 228. It should be noted here that the sending-out of the film can be executed only when the film cartridge 202 is inserted into the cartridge holder 203 and also the cartridge holder 203 is locked. Also, when the film leading end detector is turned from off to on during the film sending-out operation, then the sending-out of the film is completed.

In the film fast feed mode (P4), the cam plate 238 is moved by the groove cam 283 to a position shown by a two-dot chained line in FIG. 27. Consequently, the oscillating gear mechanism 228 is moved in such a manner that the oscillating gear 235A is able to mesh with the gear 246A or 247A in accordance with the direction of rotation of the reel motor 227, so that the supply reel 209 can be rotated in the CW direction at high speeds or the take-up reel 204 can be rotated in the CCW direction at high speeds.

Also, in the film fast feed mode (P4), the supply reel 209 and take-up reel 204 are respectively given soft brake by the brake arms 291 and 292. The reason why the soft brake is given to the take-up reel 204 besides the supply reel 209 is to prevent the winding of the film from being loosened when the oscillating gear mechanism 228 is oscillated.

Figure 39:
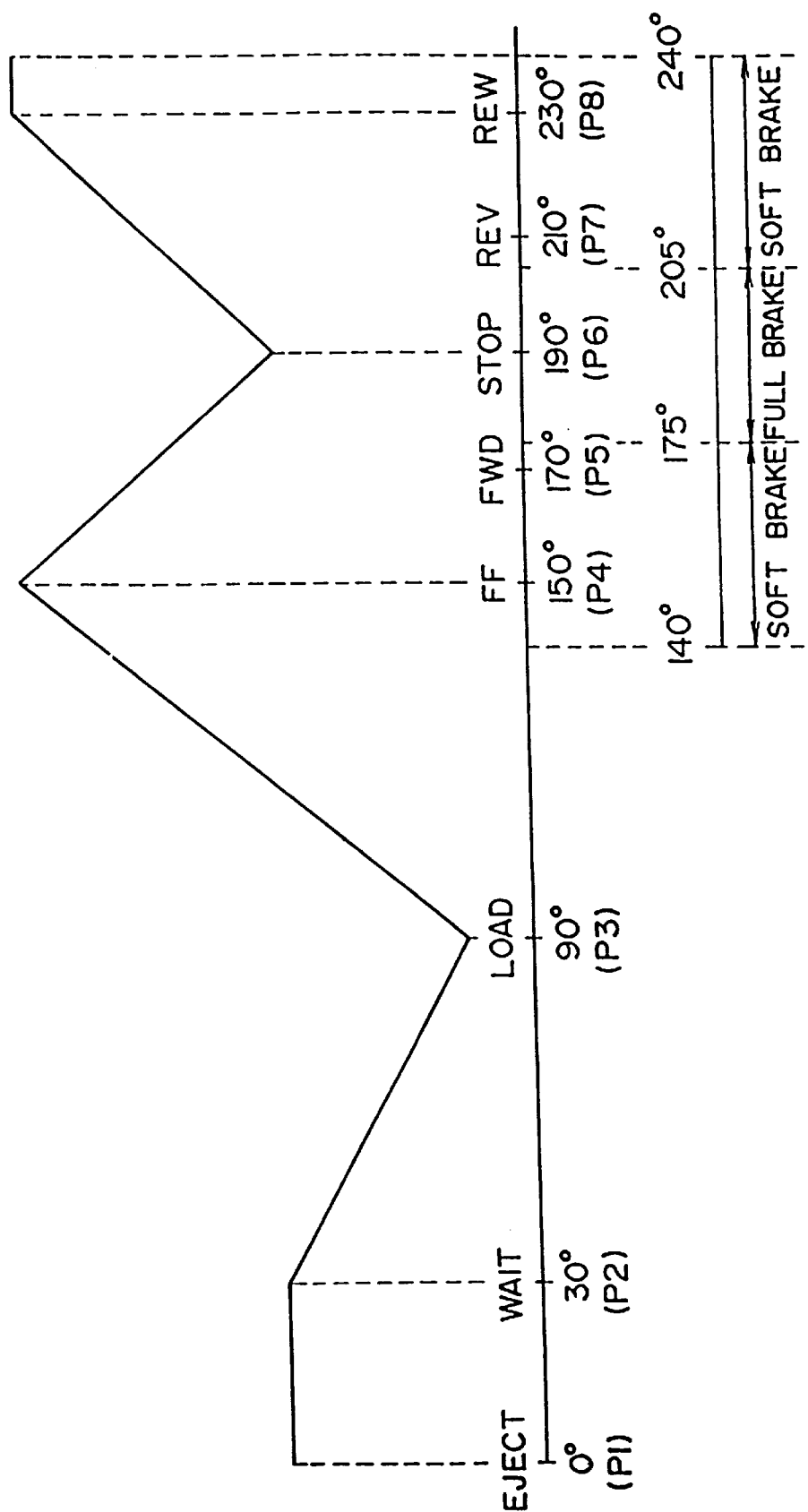
FIG. 39 is a diagrammatic view of a groove cam, illustrating the operation of the mode select mechanism shown in Fig.. 8.

Here, as shown in FIG. 39, in order that the soft brake can be applied when the angle of rotation of the groove cam 283 is in the rotational range of 140° to 175° and in the rotational range of 205° to 240° and in order that the full brake can be applied when the angle of rotation of the groove cam 283 is in the rotational range of 175° to 205°, there are formed cam surfaces 285 and 286 for braking. Also, the film is fed in the fast feed mode as well when the film is frame fed in the forward direction, but, in the frame feeding, if the next frame is detected by the frame detector, then the feeding is stopped immediately.

In the scan feed mode (+X scan) (P5), the cam plate 238 is moved by the groove cam 283 to a position situated substantially centrally between a position shown by a solid line and a position shown by a two-dot chained line in FIG. 27. As a result of this, the oscillating gear mechanism 229 is moved in such a manner that the oscillating gear 235B is able to mesh with the gear 246B or 247B according to the direction of rotation of the reel motor 227, so that the supply reel 209 can be rotated in the CW direction at low speeds or the take-up reel 204 can be rotated in the CCW direction at low speeds. Also, similarly as in the film fast feed mode, both of the supply reel 209 and take-up reel 204 can be given the soft brake.

In the stop position (P6), both of the supply reel 209 and take-up reel 204 are given the full brake.

In the scan feed made (−X scan) (P7), the cam plate 238 is moved to the same position as in the scan mode (+X scan) (P5) and the supply reel 209 and take-up reel 204 are both given the soft brake. In the film rewind mode (P8), the cam plate 238 is moved to the same position as in the film fast feed mode (P4) and the supply reel 209 and take-up reel 204 are both given the soft brake.

[Frame Feed Control and Film Send-out Speed Control]

Figure 40:
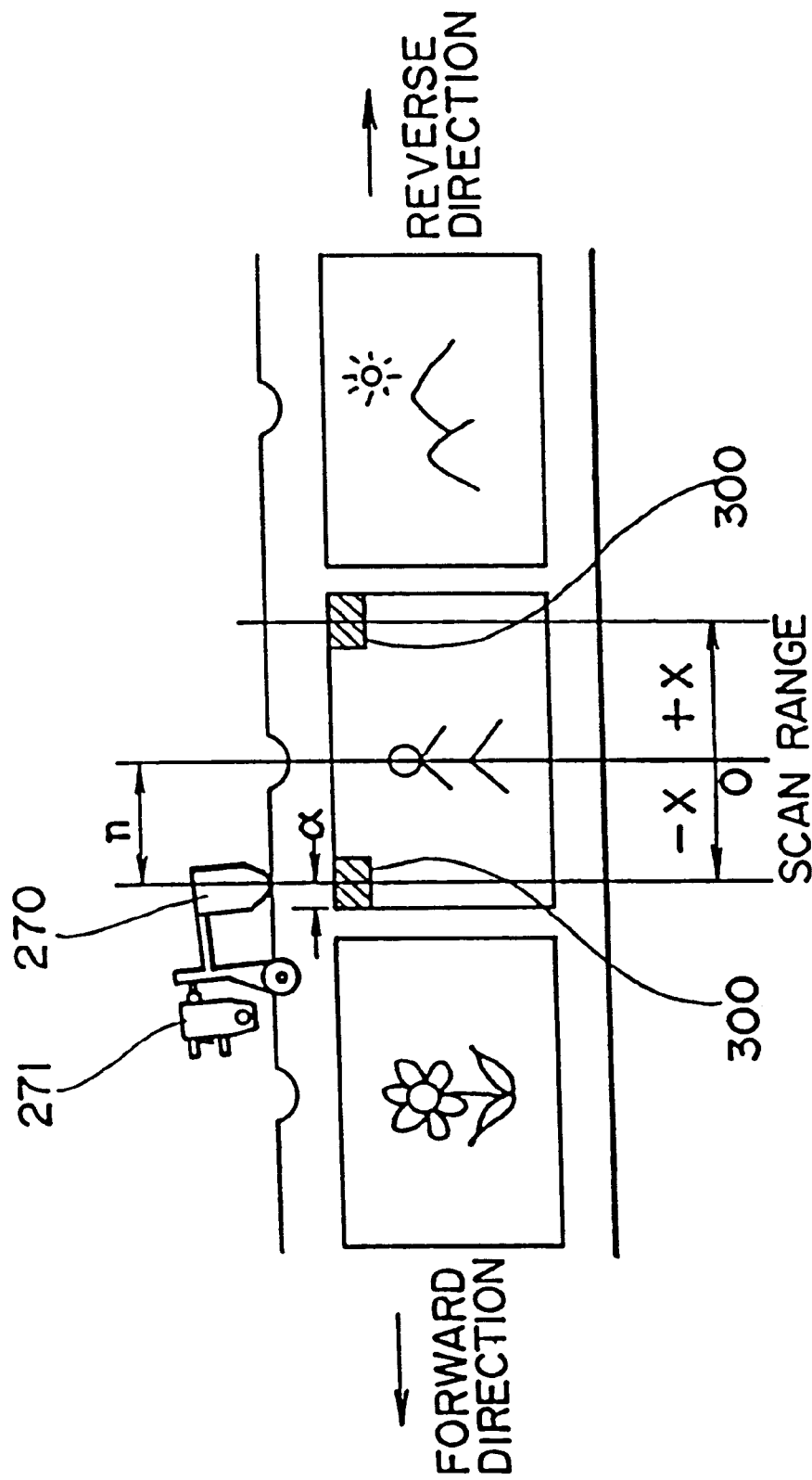
FIG. 40 is a view of a relationship between a frame detector and a film, illustrating frame feed control in the film image input system shown in FIG. 23.

The frame feeding of the film in the forward or reverse direction, as shown in FIG. 40, is executed by feeding the film in the forward or reverse direction until the frame detector consisting of the detect lever 270 and microswitch 271 detects the notch formed in the film (that is, until the detect lever 270 falls into the notch and the microswitch 271 turns from on to off). It should be noted here that, just after the frame feeding, the optical axis of the taking lens is situated at the center of the frame.

On the other hand, after the frame feeding, the X-direction scan is performed by feeding the film, and the X-direction scan range is the greatest film moving range in which the smallest zoom area 300 does not exceed the left end or right end of the frame. In FIG. 40, there is shown a case in which the film is moved in the reverse direction (that is, −X scanned) and the smallest zoom area 300 is situated at the left end of the frame. Assuming that the then distance between the scan position and the center of the frame is expressed as n and a width one-half the smallest zoom area 300 is expressed as α, then the maximum value of n+α represents a width one-half 1 frame.

Here, if the frame feeding is executed in the forward direction from the scan position shown in FIG. 40, then the frame detector detects the notch of the same frame again and thus the same frame is reproduced again, so that the next frame cannot be reproduced.

Figure 41:
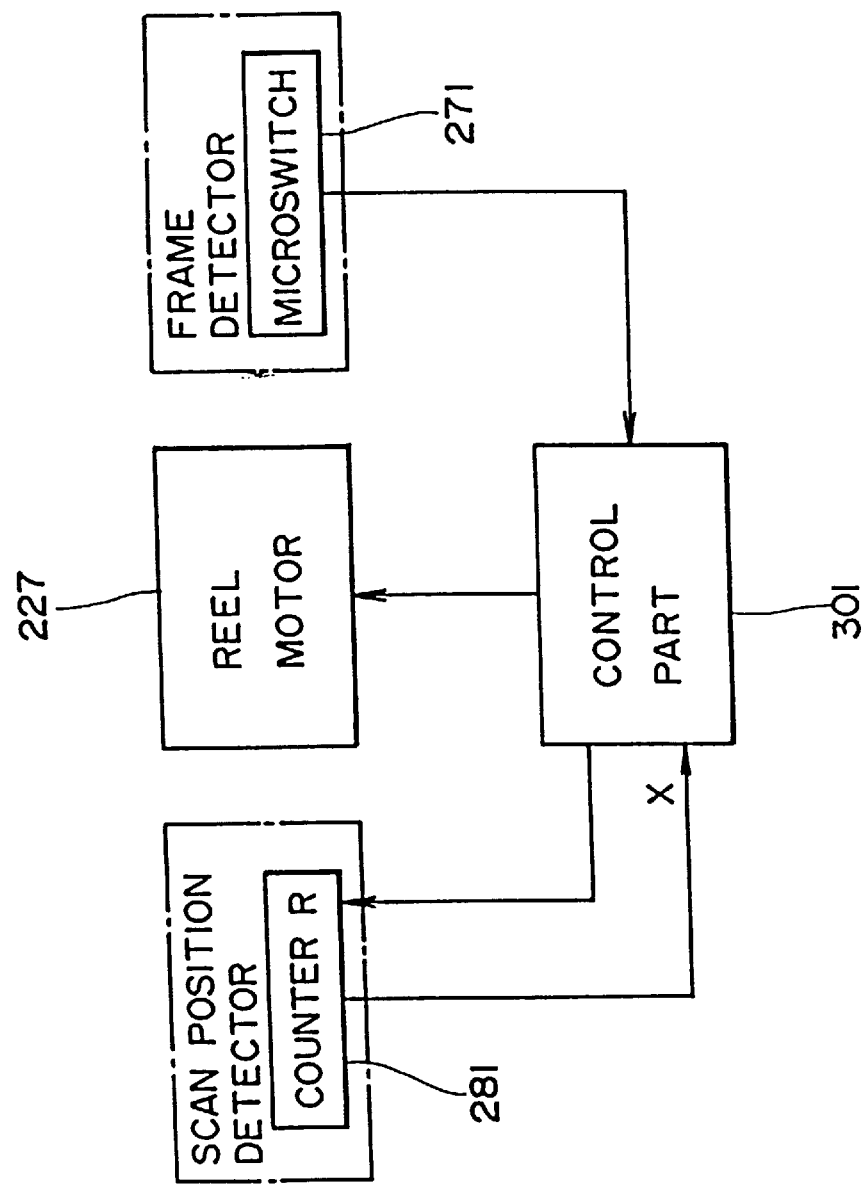
FIG. 41 is a block diagram of a, frame feed control device in the film image input system shown in FIG. 23.

In FIG. 41, there is shown a block diagram of a frame feeding control device which aims at eliminating the above-mentioned problems. The frame feeding control device consists mainly of a frame detector, a scan position detector, and a control part 301.

To the control part 301 are being applied a frame detect signal from the microswitch 271 and a scan position signal (count value (X)) from the counter 281 of the scan position detector (see FIG. 37). When the frame detect signal is input, then the control part 301 resets the count value of the counter 281 to 0.

The control part 301, after it initiates the reel motor 227, checks the next frame in accordance with the count value (X) of the counter 281 and the frame detect signal from the frame detector and then stops the reel motor 227.

Figure 42:
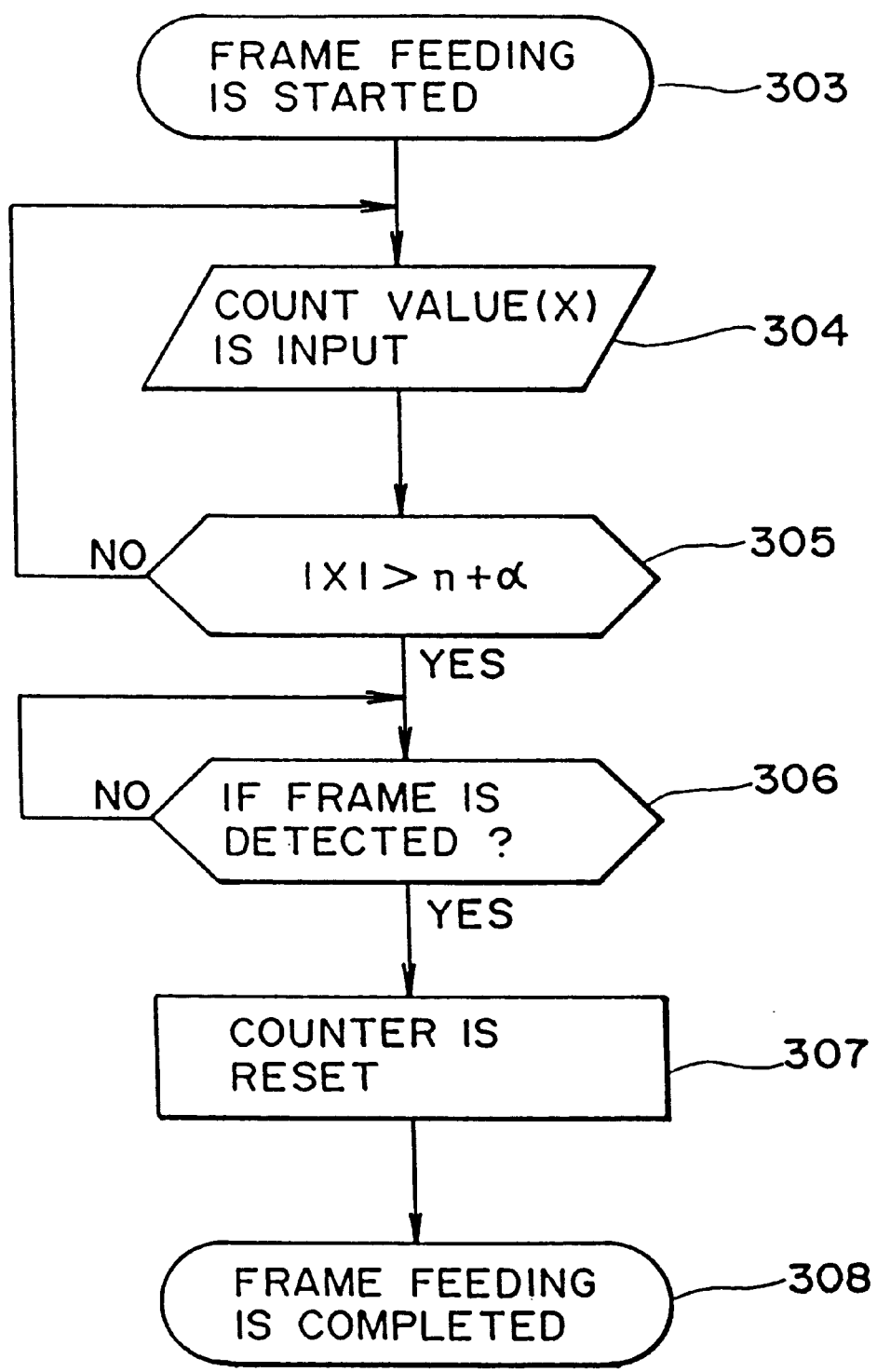
FIG. 42 is a flow chart to explain the operation of a control part shown in FIG. 41.

Next, description will be given below of the operation of the above-mentioned control part 301 with reference to a flow chart shown in FIG. 42.

At first, the reel motor 227 is initiated in order to execute the frame feeding, and the count value (X) is input from the counter 281 of the scan position detector (Steps 303, 304). Then, it is checked whether the absolute value |X| of the count value (X) input is greater than n+α, that is, |X|>n+α or not (Step 305). If |X|>n+α is not satisfied, then the count value (X) is input again after a minute time, and the checking operation is executed repeatedly until |X|>n+α is satisfied.

After |X|>n+α is satisfied, it is checked whether the frame detector has detected a frame or not (whether a frame detect signal has been input from the microswitch 271 or not) (Step 306). In other words, until |X|>n+α is satisfied, the presence/absence of input of the frame detect signal from the frame detector is ignored, and after |X|>n+α is satisfied, the presence/absence of input of the frame detect signal from the frame detector is checked. In this manner, after |X|>n+α is satisfied, the frame detect signal that is first input can be obtained at the time when the detect lever 270 falls down into the notch of the next frame.

If the frame is detected by the frame detector in Step 306, then the count value (X) of the counter 281 is immediately reset to 0 and at the same time the reel motor 227 is stopped to end the frame feeding (Steps 307, 308).

Figure 43:
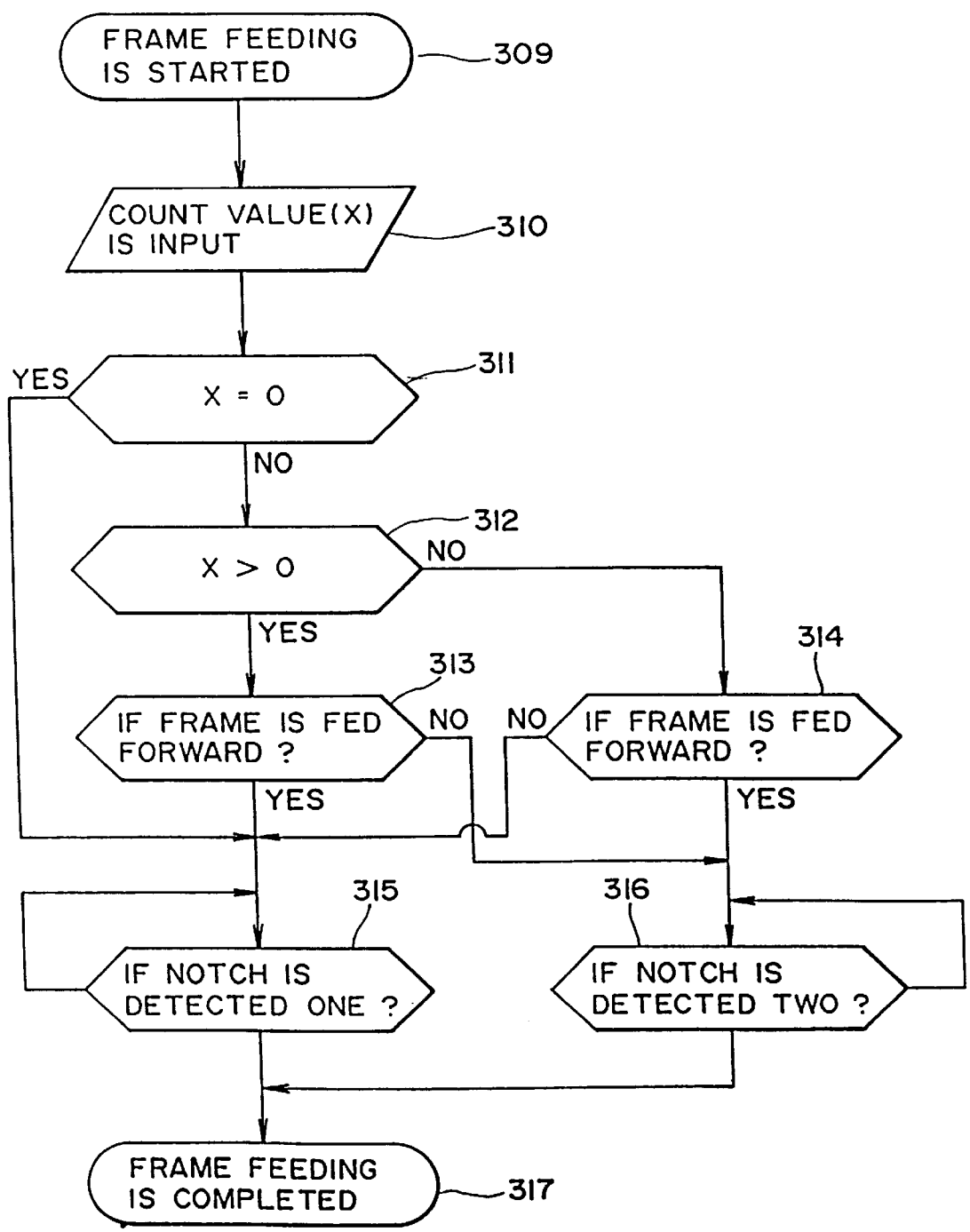
FIG. 43 is a flow chart of another embodiment of the frame feed control.

Referring now to FIG. 43, there is shown a flow chart of another embodiment of the frame feeding control of the invention. As shown in FIG. 43, at first, the reel motor 227 is started in order to feed the frame and at the same time the count value (X) is input from the counter 281 of the scan position detector (Steps 309, 310). And, the count value (X) input is checked, that is, whether X=0 or not is checked (Step 311).

If X=0, then the detect lever 270 has fallen into the notch and thus, in this case, the program advances to Step 315. In Step 315, after starting of the frame feeding, it is checked whether the notch has been detected once or not. If the notch has been detected once, then the reel motor 227 is stopped to terminate the frame feeding (Step 317).

If not X=0, then whether X>0 or not is checked (Step 312). If X>0, then it is checked whether the frame feeding is in the forward direction or not (Step 313). If the frame feeding is in the forward direction, then, after the notch is detected once in Step 315, the reel motor 227 is stopped to terminate the frame feeding (Step 317). If the frame feeding is in the reverse direction, then the program advances to Step 316. In Step 316, after starting of the frame feeding, it is checked whether the notch is detected twice or not. If detected twice, then the reel motor 227 is stopped to terminate the frame feeding (Step 317).

On the other hand, if it is found in Step 312 that X>0 is not obtained, then it is checked whether the frame feeding is in the forward direction dr not (Step 314). If in the forward direction, then the notch is detected twice in Step 316 and after then the reel motor 227 is stopped to terminate the frame feeding (Step 317). If the frame feeding is in the reverse direction, then the notch is detected once in Step 315 and after then the reel motor 227 to terminate the frame feeding (Step 317).

The method for controlling the feeding of the frames of the film is not limited to the above-mentioned method. For example, when the film is moved from the frame detect position to a position in the forward direction and the frame is fed in the reverse direction, and when the film is moved from the frame detect position to a position in the reverse direction and the frame is fed in the forward direction, the frame detect signal from the frame detector may be received at a position where the count value (X) of the scan position detector becomes 0, that is, X=0, or after the film is moved a given amount from the position of X=0. That is, in these cases, the frame detect signal from the frame detector is ignored until the film is moved back to the reference position (X=0), in order to prevent the frame detector from detecting the same frame again.

Next, description will be given below of a case in which the film feeding speed is controlled to a constant level.

As discussed with reference to FIG. 9, the film information recording/reproducing part 144 records the film information (such as the zoom information, scan position information, CCD rotation information and the like) on to the magnetic recording surface or the like of each frame in accordance with the signal from the control part 132 and also reads out the film information from the film and outputs the film information to the control part 132, so that automatic reproduction can be executed in accordance with the film information. In order to record the film information on to the magnetic recording surface of the film 124 and also reproduce the film information from the magnetic recording surface of the film 124, it is necessary to control the film feeding speed in recording and reproducing to a constant level. On the other hand, If the winding speed of the take-up reel 204 is controlled to a constant level, then the film feeding speed is varied according to the diameters of the winding, that is, the film feeding speed is slow at the starting of the feeding and the film feeding speed becomes higher as the film comes near the end thereof.

Figure 44:
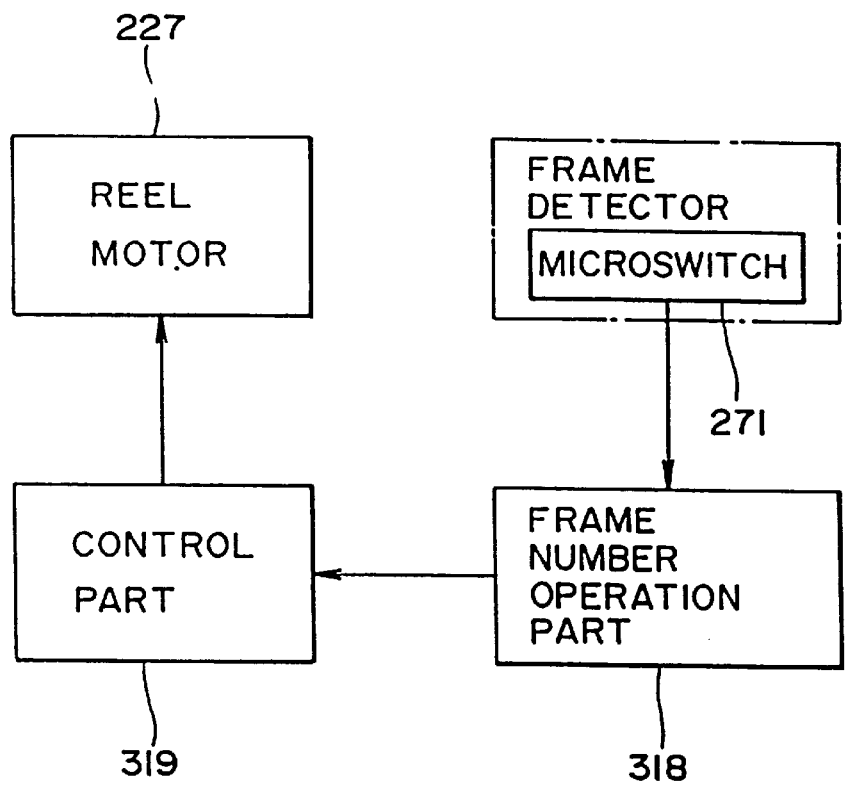
FIG. 44 is a block diagram of a film feed speed control device in the film image input system shown in FIG. 23.

In FIG. 44, there is shown a block diagram of a film feeding speed control device developed to solve the above-mentioned problem. The film feeding speed control device consists mainly of a frame detector, a frame number operation part 318A, and a control part 318B.

The frame number operation part 318A is arranged such that a frame detect signal is applied thereto from the microswitch 271 of the frame detector. The frame number operation part 318A calculates the frame number of the currently reproduced film image in accordance with the frame detect signal applied from the microswitch 271. That is, the frame number operation part 318A is a counter to count the frame detect signal. In particular, the counter resets the count value to 0 if the beginning of the film is detected, after then if the frame detect signal is input while the film is being fed in the forward direction (+X direction), then counts up the count value, and if the frame detect signal is input while the film is being fed in the reverse direction (−X direction), then counts down the count value.

Figure 45:
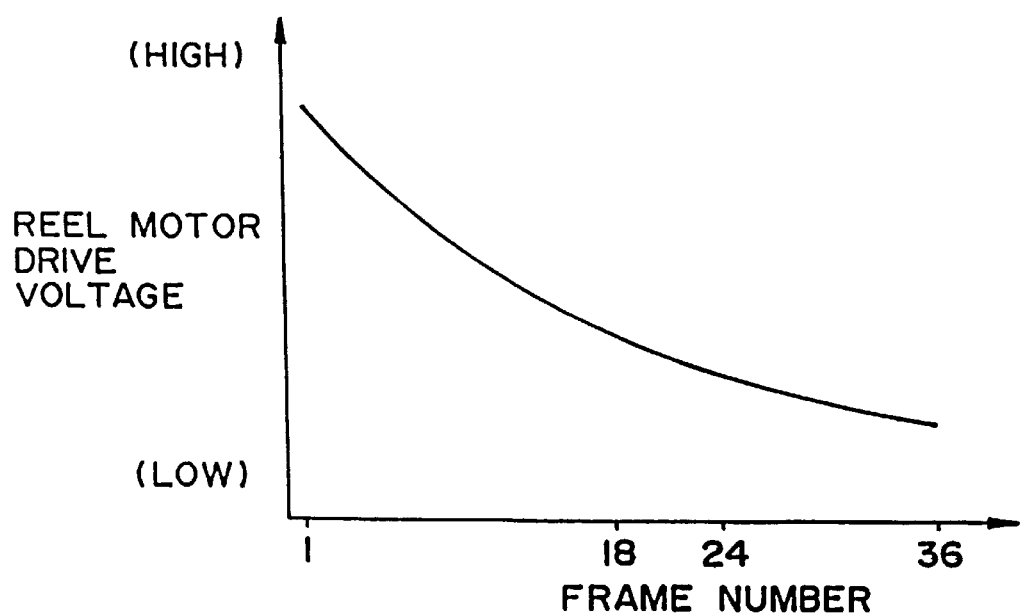
FIG. 45 is a graphical representation of a relationship between the frame number and reel motor drive voltage.

A count value (a value representing the number of the frames of the film) is being applied from the frame number operation part 318A to the control part 318B. In order to control the film feeding speed to a constant level, as shown in FIG. 45, the control part 318B outputs to the reel motor 227 a drive voltage corresponding to the film frame number being currently wound to thereby rotate the take-up shaft 204A. That is, since the thickness of the film is constant, the film winding diameter round the take-up shaft 204A has a given relationship with respect to the frame number and thus the currently winding diameter can be imagined from the frame number. For this reason, the control part 318B finds the drive voltage of the reel motor 227 from the current frame number in accordance with a table or an equation as to the frame number and the drive voltage having such a relationship therebetween as shown in FIG. 45 and then outputs the thus found drive voltage to the reel motor 227, so as to be able to control the film feeding speed to a constant level.

Alternatively, in stead of the frame number, the number of perforations from the beginning of the film may be counted and the drive voltage to be applied to the reel motor 227 may be controlled according to the number of the perforations counted.

Also, the film winding diameter may be detected directly by use of film winding diameter detect means and the drive voltage to be applied to the reel motor 227 may be controlled according to the film winding diameter detected. This film winding diameter detect means may be composed of, for example, an angle detect means which can be used to detect the angle of rotation of the arm plate 276 of the scan position detector shown in FIG. 37.

[Search Mode]

Figure 46:
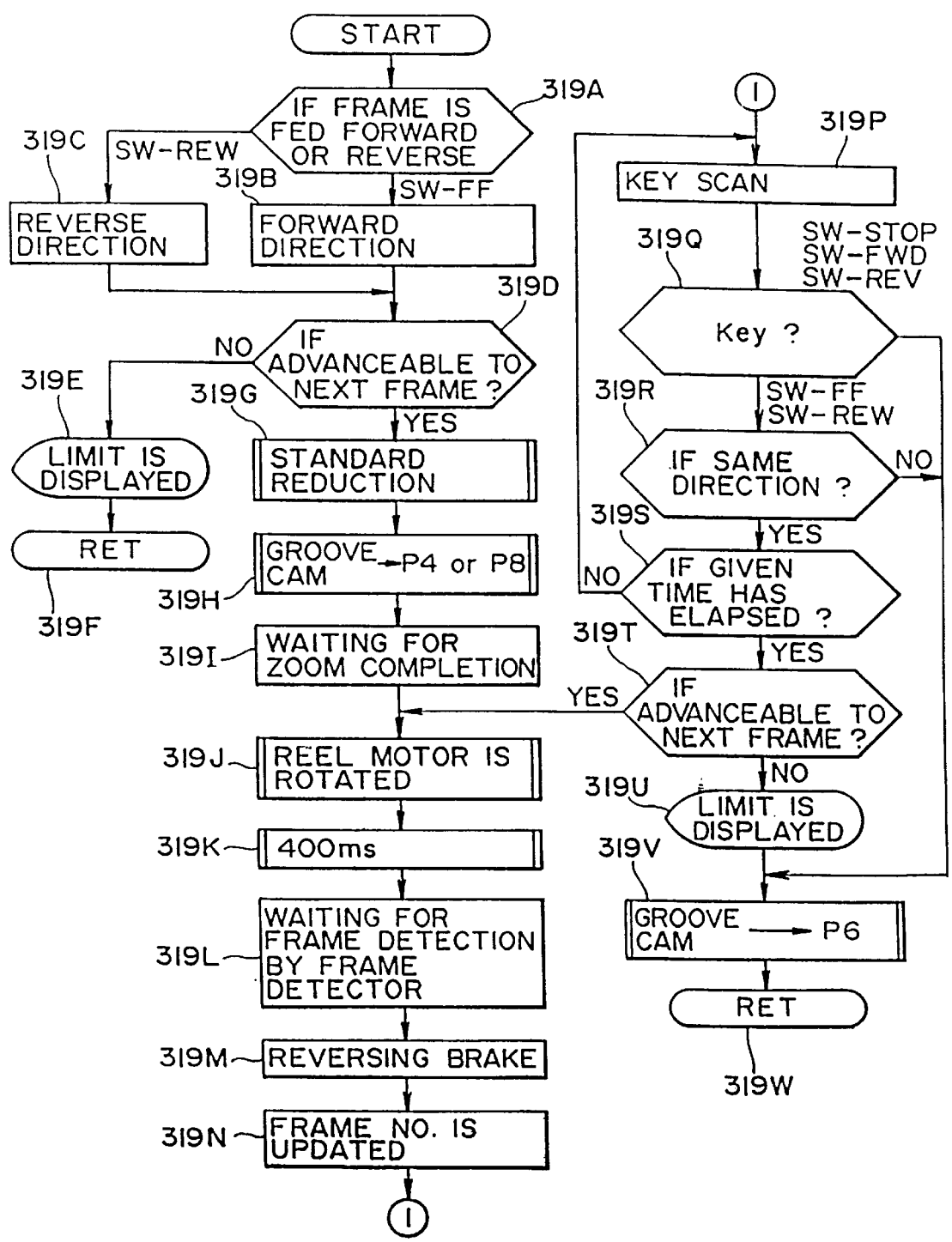
FIG. 46 is a flow chart to explain the operation of a search mode.

In FIG. 46, there is shown a flow chart illustrating a search mode. Here, a search mode is a mode in which the film is fed at similar speeds to the film feeding speeds in the film rewinding or film fast feeding mode, but the film feeding can be stopped for a given period of time at every frame to thereby be able to select a desired film image quickly.

After the search mode is selected by select means (not shown), the film feeding is executed in the search mode while a fast feeding switch SW-FF or a rewinding switch SW-REW is being depressed.

Now, when the search mode is selected once, then the frame feeding direction is checked as shown in FIG. 46 (Step 319A). In other words, when the fast feeding switch SW-FF is pressed down, then the frame feeding direction is decided as the forward direction and when the rewinding switch SW-REW is pressed down, then the frame feeding direction is decided as the reverse direction (Steps 319B, 319C). And, it is checked whether the frame is to be fed in the decide direction or not (Step 319D). For example, when the frame being currently detected is the final frame and the frame feeding direction is the forward direction, or when the frame being currently detected is the first frame and the frame feeding direction is the reverse direction, the film cannot be moved forth or back to the next frame. For this reason, in such a case, a limit display is displayed and after then the program goes back to the start (Steps 319E, 319F).

On the other hand, when the film can be moved to the next frame, then the control on the zoom lens side is started so as to be able to provide a standard reproducing state (Step 319G), at the same time the groove cam 283 is moved to the film fast feeding mode position P4 or to the film rewinding mode position P8 according to the frame feeding directions (Step 319H), where the program waits until the photographing magnification of the zoom lens becomes a standard magnification (Step 319I). When the photographing magnification of the zoom lens becomes the standard magnification, then the reel motor is rotated (Step 319J) and after the elapse of time of 400 ms (Step 319K) the frame detection by the frame detector is enabled, then waiting for the next frame to be detected (Step 319L). The reason why the frame detection by the frame detector is enabled after waiting in 400 ms from the starting of rotation of the reel motor is to prevent the same frame from being detected again.

And, if the next frame is detected, then a reverse brake is applied to the reel motor (Step 319M) and the frame number is updated and displayed (Step 319N).

Next, the key scan is performed (Step 319P). If it is found in Step, 319Q that any one of the stop switch SW-STOP, +X scan switch SW-FWD, –X scan switch SW-REV is turned on, or that none of these switches is turned on, then the program advances to Step 319V, where the groove cam 283 is moved to a stop position P6, and after then the program moves back to the first state (Step 319W).

On the other hand, if it is found in Step 319Q that the fast feeding switch SW-FF or rewind switch SW-REW is turned on, and further if it is found in Step 319R that the switch in the same direction is continuously turned on, then it is checked whether a give period of time has passed or not since the reel motor was stopped (Step 319S).

Here, the above-mentioned given period of time is the stop time of the reel motor which can be selected properly from a range of 0.1 sec. to 0.5 sec. That is, when the stop time is shorter than 0.1 sec., it is difficult to confirm visually what image is the film image being reproduced on the video monitor and, when the stop time is longer than 0.5 sec., the search time becomes too long. This is why the stop time in the above-mentioned range is set.

Now, if it is found in Step 319S that the given time has not passed, then the processings in Step 319P to Step 319S are executed repeatedly until the given time has passed, and if the given time has passed, then the program advances to Step 319T. In Step 319T, similarly to Step 319D discussed before, it is checked whether the film can moved to the next frame or not. If it is found that the film can be moved to the next frame, then the program moves back to Step 319J, in which the reel motor is rotated again to thereby feed the frame, as discussed before. On the other hand, if it is found that the film cannot be moved, then the limit display is displayed (Step 319U) and after then the program advances to Step 319V, in which the groove cam 283 is moved to the stop Position P6. After then, the program moves back to the start state (Step 319W).

[Negative/Positive Switching Control]

Figure 47:
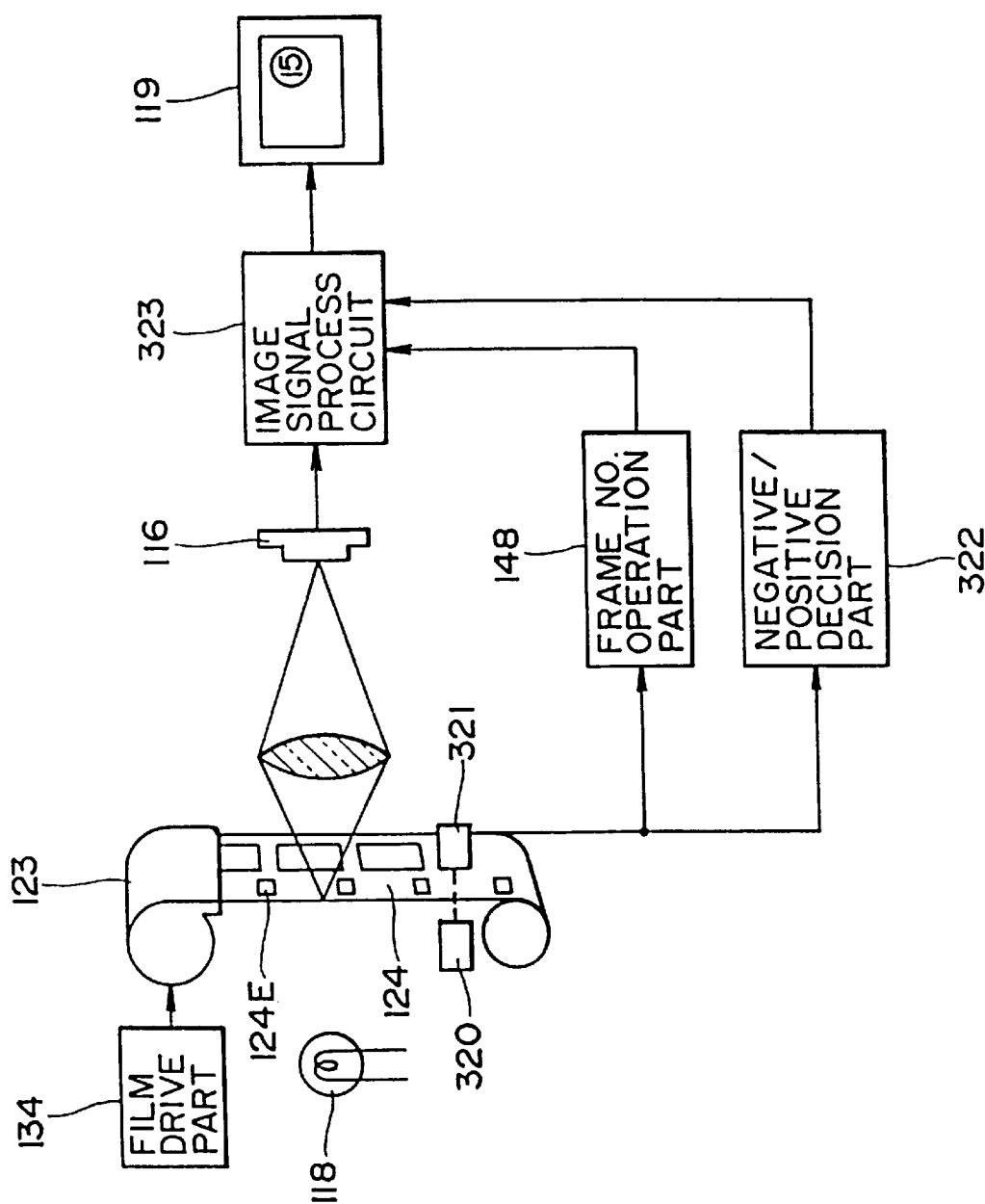
FIG. 47 is a block diagram of main portions of a film image input system including a negative/positive switching control device.

Now, in FIG. 47, there is shown an embodiment of a negative/positive switching control device. In this figure, parts used in common with FIG. 11 are given the same reference characters respectively and the detailed description thereof is omitted here.

In FIG. 47, the negative/positive switching control device consists mainly of light projecting means 320, light receiving means 321, a negative/positive decision part 322 and an image signal process circuit 323.

Figure 48:
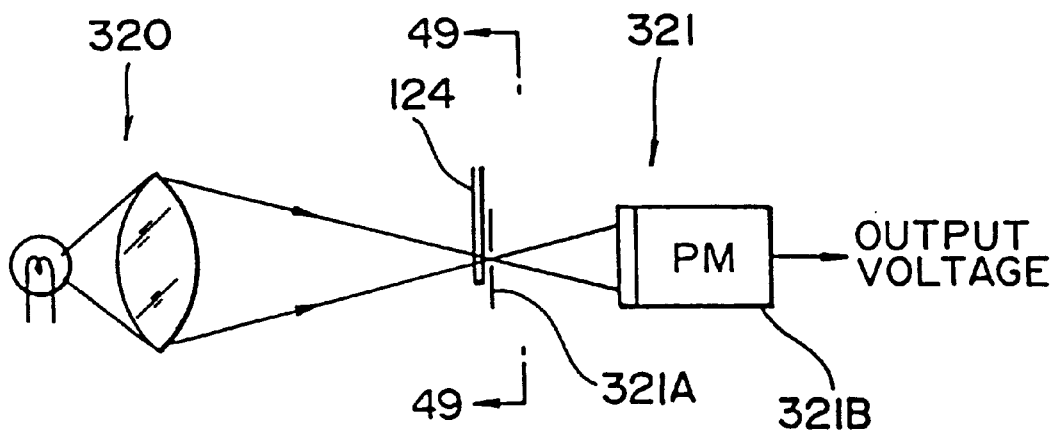
FIG. 48 is a view of details of light projecting means and light receiving means respectively shown in FIG. 47.
Figure 49:
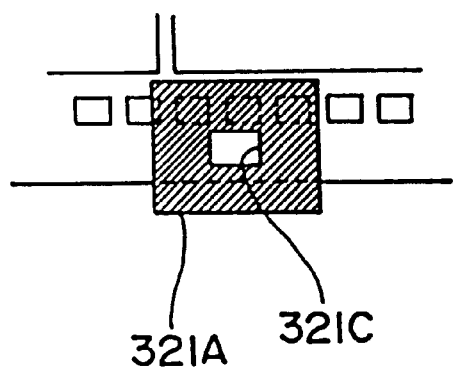
FIG. 49 is a section view taken along the line 49—49 in FIG. 48.

The light projecting means 320, as shown in FIG. 48, is composed of a light source 320A and a condensing lens 320B, while the light receiving means 321 is composed of a pin hole 321A and a photo multiplier 321B. The pin hole 321A, as shown in FIG. 49 which is a section view taken along the line 49—49 in FIG. 48, has an opening 321C to allow the light from the light projecting means 320 to pass through the film edge outside the film perforation, and guides the light passing through the opening 321C to the photo multiplier 321B.

The photo multiplier 321B has .a sensitivity in a visible area and outputs to the negative/positive decision part 322 a voltage signal corresponding to the amount of light passing through the film edge and entering the photo multiplier 321B.

The negative/positive decision part 322 comprises a comparator which compares the voltage signal input thereto and a threshold value serving as a reference for negative/positive decision. When the voltage signal is greater than the threshold value, the decision part 322 outputs a high level signal indicating a negative film, while when the voltage signal is smaller than the threshold value, it outputs a low level signal indicating a positive film.

In other words, the negative film has an opaque and orange film edge portion and the amount of the light passing through the opaque and orange film edge and entering the photo multiplier 321B is large, so that the output voltage of the photo multiplier 321B is greater than the above-mentioned threshold. On the other hand, the positive film has a black film edge portion and the amount of the light passing through the black film edge portion and entering the photo multiplier 321B is small, so that the output voltage of the photo multiplier 321B is smaller than the threshold.

The image signal process circuit 323 has a function of performing a negative image processing on an image signal applied from the CCD 116 and a function of performing a positive image processing on the image signal. If a signal (a high level signal) indicating that the film being currently photographed is a negative film is input from the negative/positive decision part 322, then the circuit 323 executes automatically the negative image processing on the image signal applied from the CCD 116. If a signal (a low level signal) indicating a positive film, then the circuit 323 executes automatically the positive image processing on the image signal applied form the CCD 116. The image signal that has been image processed is then output to the video monitor 119 and the image is reproduced as a normal image, whether the currently photographed film is negative or positive.

In FIG. 50, there is shown another embodiments of the light projecting means 320 and light receiving means 321. That is, in FIG. 50, as the light projecting means, a GaP light emitting diode (GaP-LED) 324 is used, while a silicone photo diode (SPD) 325 is used as the light receiving means. Here, GaP-LED 324 has a light emitting wavelength of 560 nm, while SPD 325 has a spectral characteristic of 320 nm–730 nm (peak 560 ±20 nm).

The light from GaP-LED passes through the film edge portion outside of the film perforations and then enters SPD 325. Also, When the film edge portion includes a through portion (a notch for frame detection) the through portion is situated on the optical pass, the light from GaP-LED 324 is allowed to pass through the through portion and then enter SPD 325.

Now, Table 1 shows densities, ratios of the amounts of the light passed and the output voltages of SPD 325 when the through portion, the negative film and the positive film are positioned on the optical path of GaP-LED 324 and SPD 325.

TABLE 1

|  | Through Portion | Nega. Film | Posi. Film |
|---|---|---|---|
| Density | 0 | About 0.6 | About 2 |
| Transmission Light Amount Ratio | 100 | 25 | 1 |
| SPD 325 | 10 V | 2.5 V | 0.1 V |

As shown in Table 1, in accordance with the output voltage of the SPD 325, the negative and positive films can be discriminated from each other as well as the through portion can be detected (that is, the frame can be detected).

It is sure that SPD 325 has a temperature dependency, but if the output of the through portion is used to correct the output voltage, then the problem raised by the temperature dependency of SPD 325 can be solved.

Also, FIG. 51 (A) shows a perspective view of a film cartridge which has two spools (two shafts), and FIG. 51 (B) shows a perspective view of a film cartridge having one spool (one shaft). In either of them, it is possible to check from the difference between the shapes of the film cartridge whether a film stored in the film cartridge is a negative film or a positive film.

For example, there is formed one notch in the film cartridge in which a negative film is stored, as shown in FIG. 52 (A), and there are formed two notches in the film cartridge in which a positive film is stored, as shown in FIG. 52 (B), while there are provided in the cartridge mounting portion two switches which are used to detect the presence or absence of the notch. And, when the film cartridge is mounted into the cartridge mounting portion, if the two switches detect the presence of the notch respectively, then the film stored is decided as a positive film, and if only of the two switches detects the presence of the notch, then the film storedis decided as a negative film.

[Control of Image Output to Video Monitor]

Figure 53:
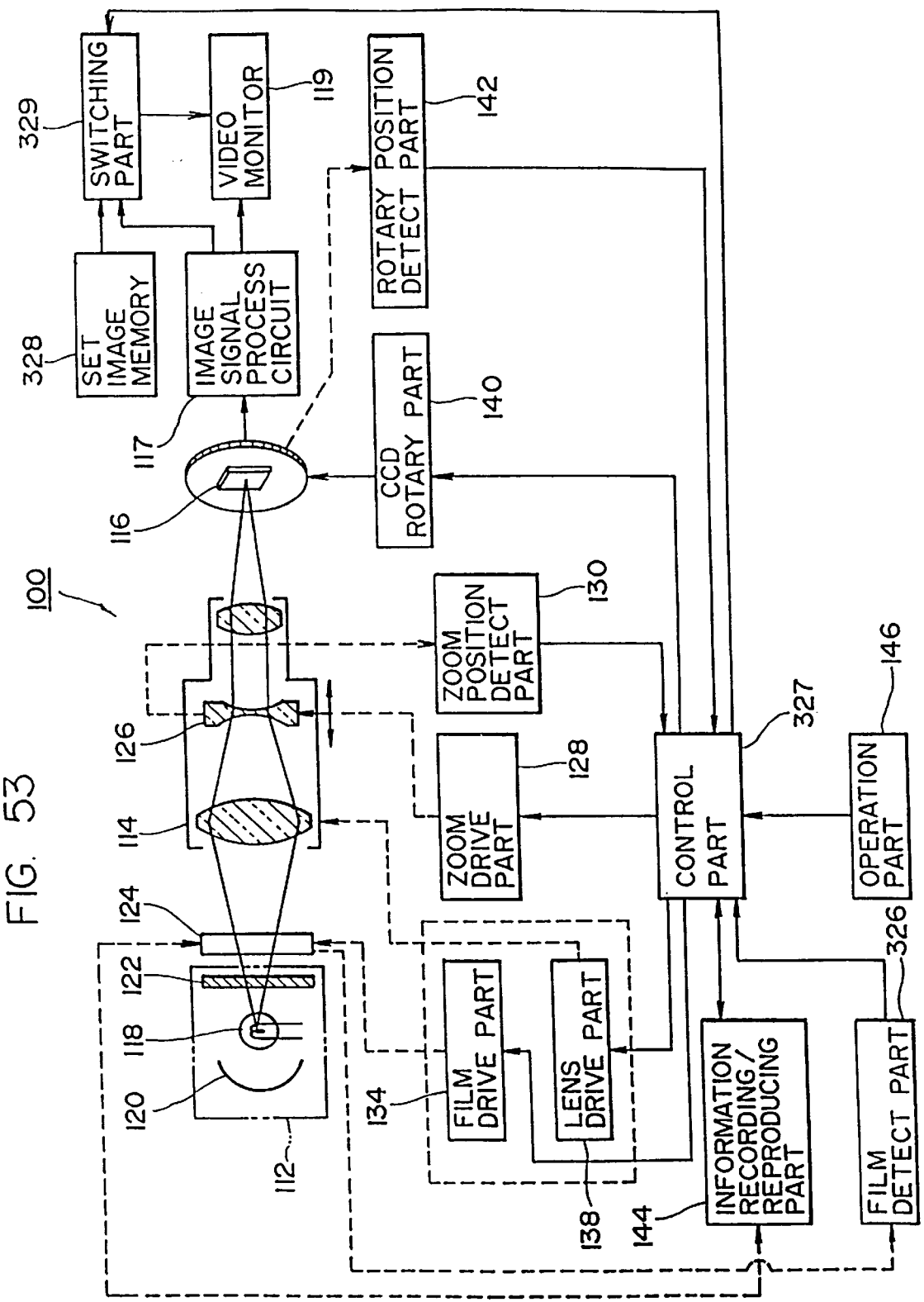
FIG. 53 is a block diagram of a film image input system including a picture output control device to a video monitor.

In FIG. 53, there is shown a block diagram of an embodiment of a control device for controlling the output of an image to the video monitor. In this figure, parts used in common with FIG. 9 are given the same reference characters and the detailed description is omitted here.

In FIG. 53, the image output control device to the video monitor is used to output a preset image to the video monitor 119 when the film 124 is not set in the photographing area of the taking lens 114. The image output control device consists mainly of a film detect part 326, a control part 327, a set image memory 328, and a switching part 329.

The film detect part 326 is used to detect whether the film 124 is set in the photographing area of the taking lens 114. For the film detect part 326, for example, the film leading end detector and/or film trailing end detector shown in FIG. 36 can be used. That is, if either of the microswitches 273 and 275 of the film leading end detector and film trailing end detector is turned on or both of them are turned on, then it is possible to detect that the film 124 is set in the photographing area of the taking lens 114.

A signal output from the film detect part 326 and indicating the presence or absence of the film is applied to the control part 327. The control part 327 in turn performs various kinds of control as discussed with reference to FIG. 9 and also switches the switching part 329 according to the presence or absence of the film. That is, when it receives the signal indicating the presence or absence of the film from the film detect part 326, the control part 327 outputs a image signal from the set image memory 328 to the video monitor 119, in place of the image signal from the image signal process circuit 117.

It should be noted here that in the set image memory 328 there have been previously stored signals indicating set images clearly different from the film images, the set images including alarms (NO FILM and so on), logo marks, geometrical patterns, and an image entirely in a single color (in a blue color or the like).

According to the image output control device structured in the above-mentioned manner, when the film 124 is not set in the photographing area of the taking lens 114, the set image is displayed on the video monitor 119. For this reason, it is possible to check immediately from the image displayed on the video monitor 119 whether the film is set or not.

[Film Fading Correction]

To execute an automatic correction for fading of a negative film or a positive film, it is necessary to know the faded condition of the film. For this purpose, when the negative or positive film is manufactured, a standard pattern for fading correction is previously formed by printing.

Figure 54:
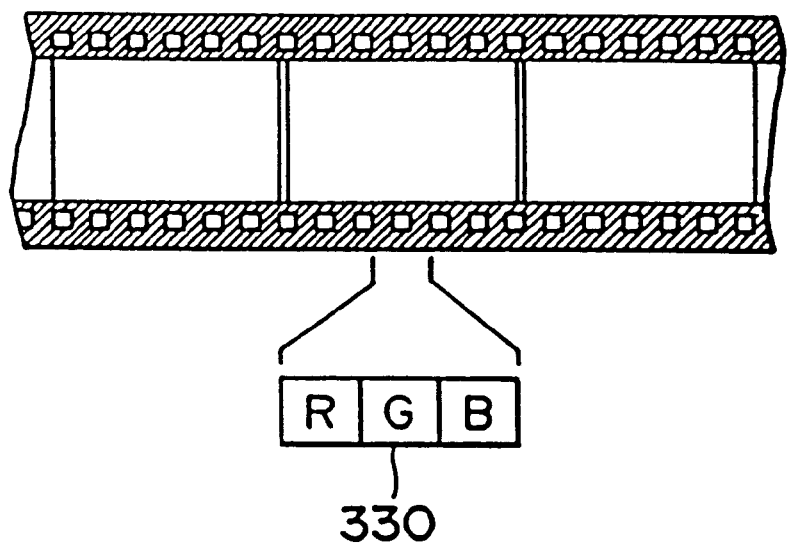
FIG. 54 is a view of a film edge portion into which a standard pattern for correction of fading is printed.
Figure 55:
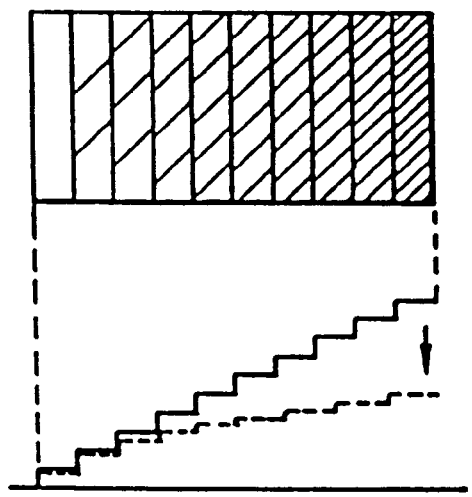
FIG. 55 is a view of a standard pattern in which one of RGB is printed in 10 gradations.

As shown in FIG. 54, in the case of a 35 mm film, since the film edges each of 5 mm in both ends of the film are not exposed, the standard pattern 330 for fading correction is previously printed into the film edges. As the standard pattern 330, a gradation pattern on the order of 10 gradations of RGB is suitable. In FIG. 55, there is shown a standard pattern which is formed by printing one of RGB colors in 10 gradations.

Figure 56:
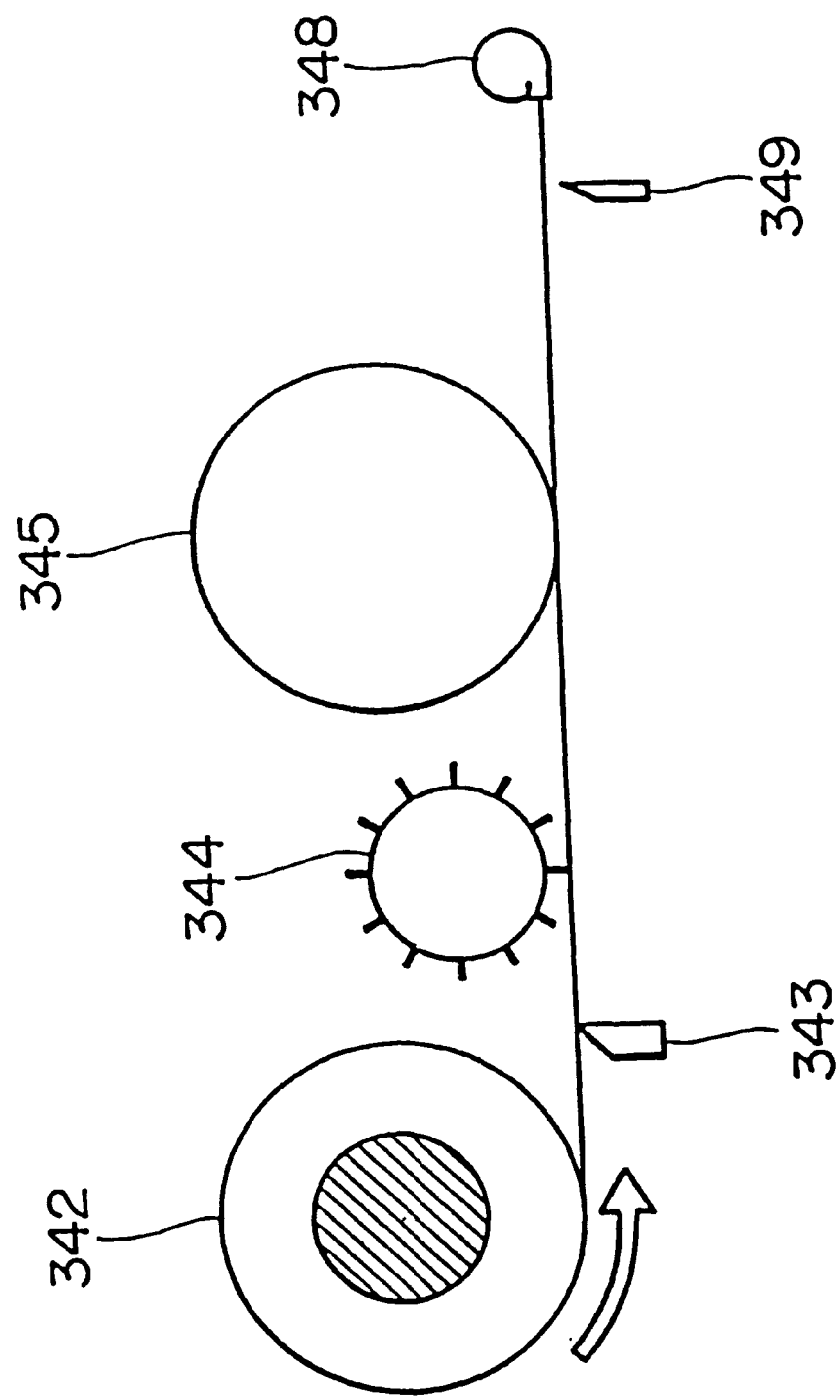
FIG. 56 is a view of a system for printing the standard pattern for fading correction in a working process from a film roll.

In FIG. 56, there is shown a system in which the standard pattern 330 for fading correction is fired in a film working process from a film roll 342. As shown in FIG. 56, a film supplied from the film roll 342 is divided into plural film sections each having a given width by use of a slitter 343 and perforations are then formed in the film sections by use of a perforator 344. After then, the frame number and the above-mentioned fading correction standard pattern 330 are printed by use of a printing drum 345.

Figure 57:
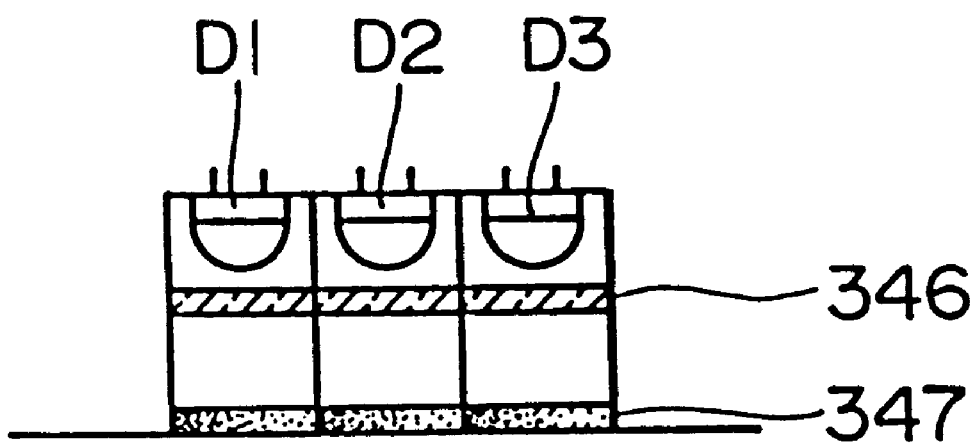
FIG. 57 is a view of details of a print device for printing the standard pattern for fading correction.

In FIG. 57, there is shown a view of the details of the printing device for firing the above-mentioned fading correction standard pattern 330. The printing device comprises red, blue, green light emitting diodes D1, D2, D3, an expansion plate 346, and a gradation transmissive filter 347, and the printing device is disposed inside of the circular peripheries of the drum 345. And, at the same time when the frame number is printed, the respective color emitting diodes D1, D2, D3 are allowed to emit colors respectively, and the fading correction standard pattern 330 is printed in the film edges through the expansion plate 346 and gradation transmissive filter 347.

The film with the frame number and standard pattern 330 printed therein is then wound round a cartridge 348 and, after wound a given amount, the film is then cut by a cutter 349.

Now, when reproducing the film image on the video monitor by means of the film image input system, by reading the standard pattern 330 and comparing the read standard pattern 330 with data obtained when no fading is developed, the degree of the fading can be decided. And, by correcting the image signal according to the degree of fading, the fading correction can be achieved. In FIG. 55, the condition of the fading is shown by a dotted line. As shown in FIG. 55, the greater the density is, the greater the degree of fading is.

Figure 58:
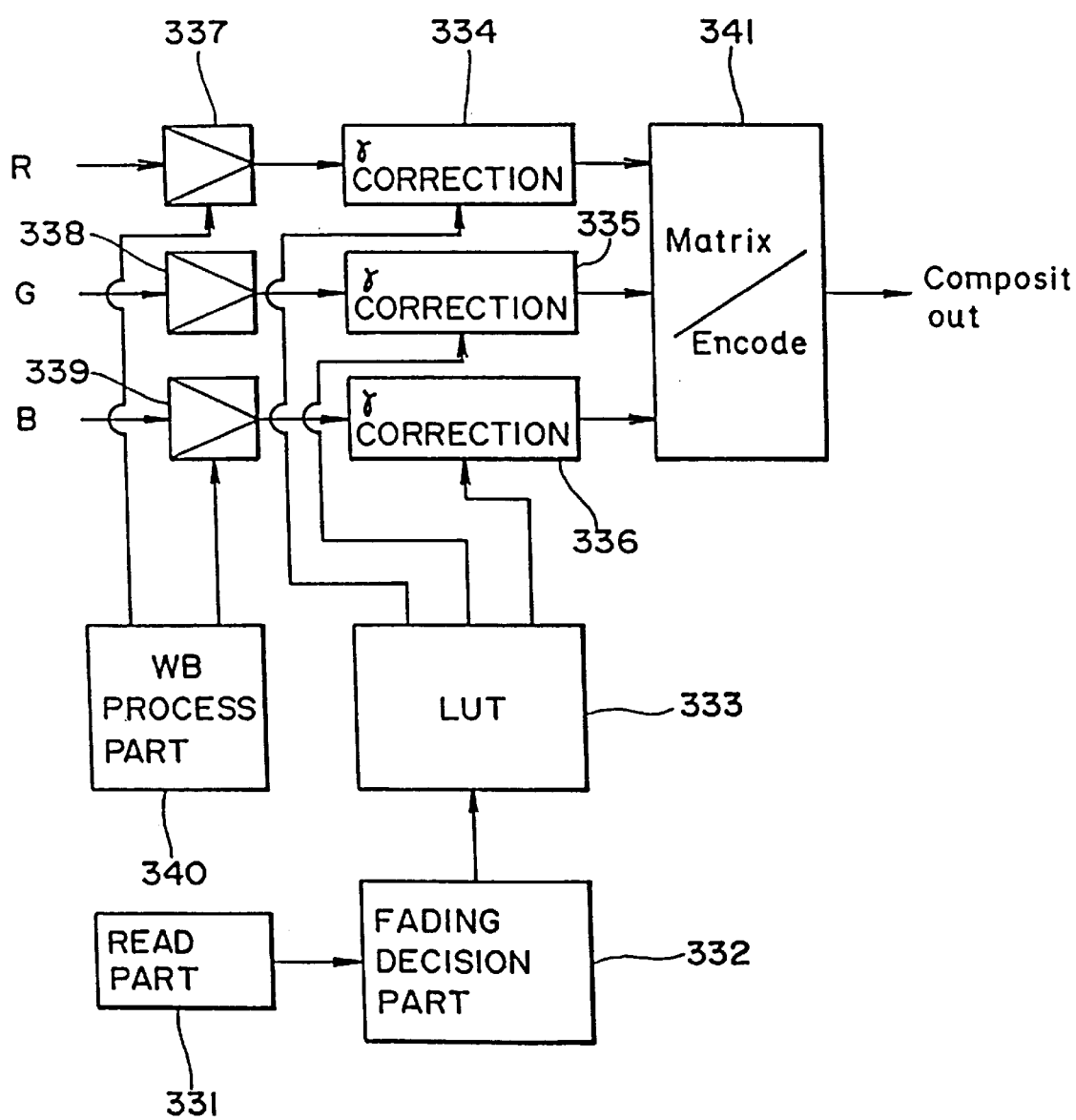
FIG. 58 is a block diagram of an embodiment of a film fading correction device in a film image input system.

In FIG. 58, there is shown a block diagram of an embodiment of a film fading correction device. As shown in FIG. 58, the fading correction device consists mainly of a read part 331, a fading decision part 332, and a look-up table (LUT) 333.

The read part 331 reads the fading correction standard pattern 330 previously printed in the film edge and then outputs data on the standard pattern 330 read to the fading decision part 332. The fading decision part 332, which has the data obtained when no fading is developed, compares the data with the data on the standard pattern 330 input from the read part 331, and decides the degree of the fading in accordance with the comparison results.

The look-up table (LUT) 333 has a plurality of correction tables corresponding to the degrees of fading. In accordance with signals indicating the respective degrees of fading of RGB applied thereto from the fading decision part 332, LUT 333 reads out the RGB correction tables corresponding to the degrees of the fading and the outputs the RGB correction tables to γ correction circuits 334, 335, 336 respectivel provided within the image signal process circuit.

The γ correction circuits 334, 335, 336 are respectively interposed between a white balance (WB) adjust circuit and a matrix and encoder circuit 341 within the image signal process circuit. The WB adjust circuit comprises amplifiers 337, 338, 339 and a WB process part 340. By adjusting the gains of the amplifiers 337 and 339 by use of the WB process part 340, the WB adjust circuit can take the white balance of the R signal, G signal and B signal.

Figure 59:
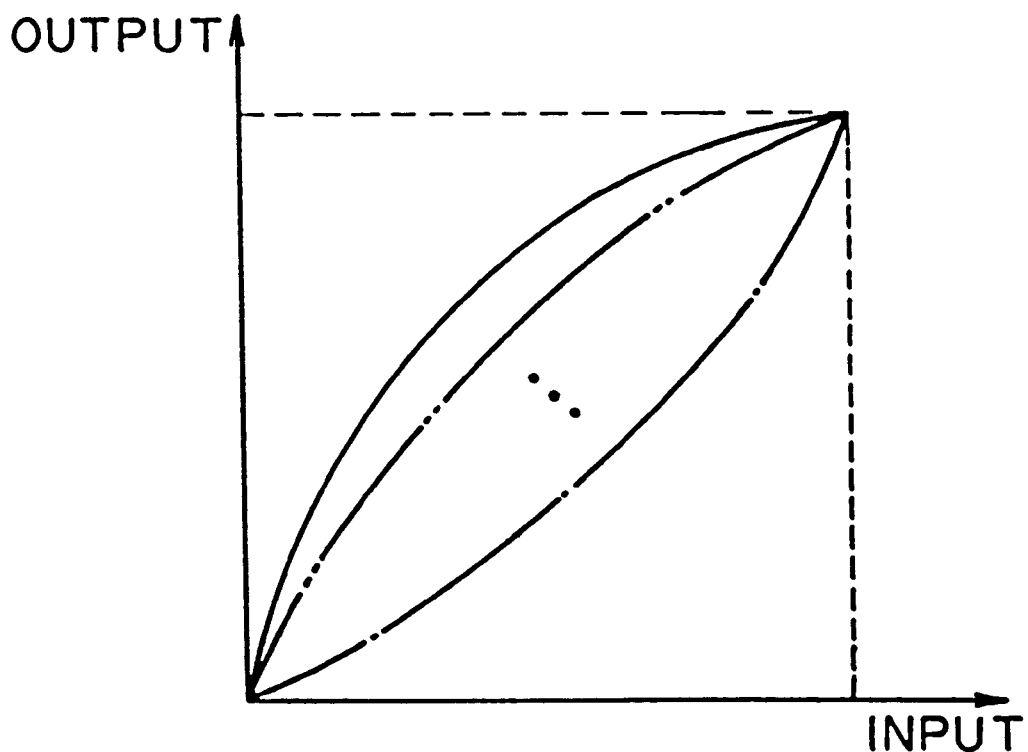
FIG. 59 is a graphical representation to explain a correction table for a lookup table in FIG. 58.

The γ correction circuits 334, 335, 336, according to the RGB correction table from the above-mentioned LUT 333, execute γ correction as well as fading correction on the R-signal, G signal, and B signal the white balances of which have been adjusted, respectively. That is, a γ correction circuit normally enhances the sensitivity of intermediate gradation signals as shown by a solid line in a graphical representation in FIG. 59, while the γ correction circuits 334, 335, 336, according to the RGB correction table from the LUT 333, enhance the sensitivity of signals having a large density, for example, as shown by a two-dot chained line or a one-dot chained line in FIG. 59, thereby executing the fading correction as well at the same time (see FIG. 55).

Figure 60:
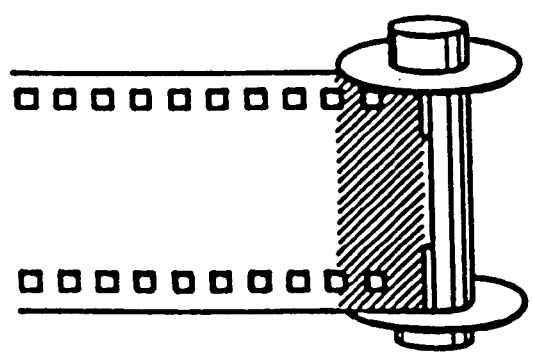
FIG. 60 is a view of another print area into which the standard pattern for fading correction is printed.
Figure 61:
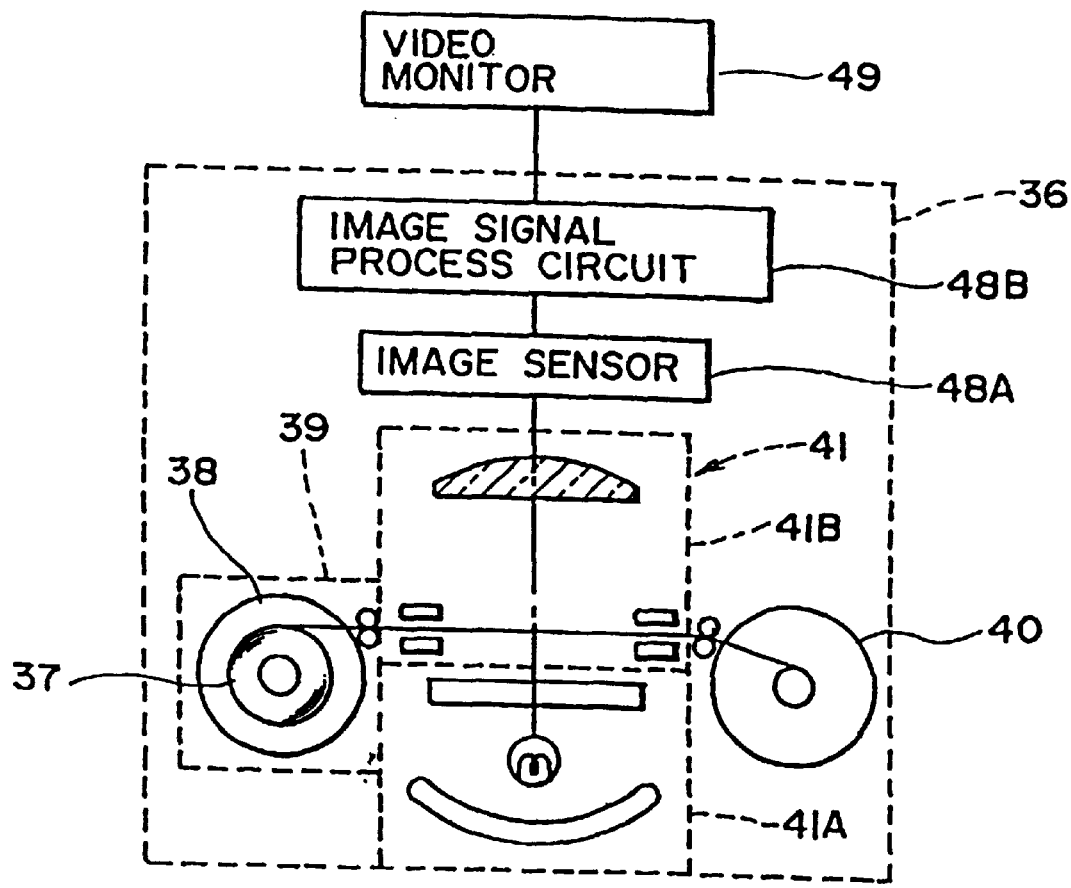
FIG. 61 is a schematic view of an embodiment of a conventional film image input system.
Figure 62:
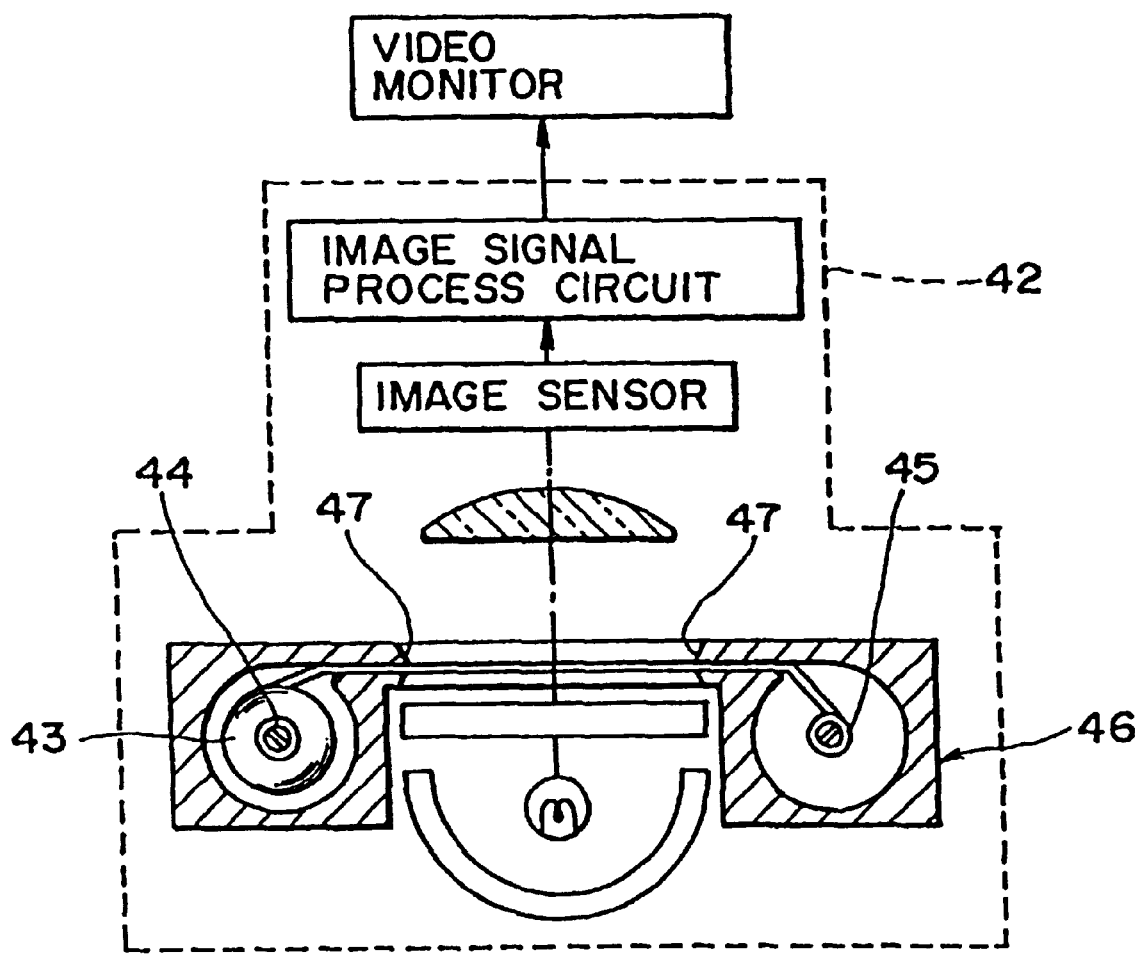
FIG. 62 is a schematic view of another embodiment of the conventional film image input system.

Although in the present embodiment the fading correction is also made by use of the γ correction circuits, the fading correction may be executed by a different correction circuit from the γ correction circuits. However, in this case, the γ correction components are not included in the RGB correction table. Also, the standard pattern 330 for fading correction may be printed in the excess space of the film when the film is supplied for developing, that is, not limited to the time when the film is manufactured in this case, there is obtained a merit that the latent image of the standard pattern previously exposed are prevented from fading. Further, the area of the film in which the standard pattern is branded is not limited to the edge of the film, but it may be the end portion of the film that is not drawn out from the cartridge as shown in FIG. 60.

As has been described heretofore, according to the film image input system of the invention, by using a compact film cartridge which stores the whole film wound round a single spool, a developed still photo film can be treated simply without damaging the same and the film image can be reproduced on a video monitor by one-touch. Also, since the film cartridge and the whole film can be disposed in one side of the film image input system, it is possible to expand the freedom of design on the number, size and position of various mechanisms disposed in the central portion and the other side of the film image input system. For this reason, it is possible to design, with high freedom, film image input systems ranging from low-price systems to high-performance systems.

As the high-performance system, by means of provision of a mechanisms which allows starting of automatic film feeding at the same time when a film cartridge is loaded, a mechanism for feeding the frames of the film after a given time during reproduction, a mechanism for automatically rewinding the film after completion of reproduction of all images, a mechanism which allows automatic discharge of the film cartridge after the film is rewound, various mechanisms relating to magnetic recording/reproducing information, and other mechanisms, a substantially completely automated film image input system can be realized. On the other hand, the low-price system can be realized by properly simplifying the above functions or by using a mechanism including a manual button or the like. Also, the film cartridge can be mounted to a cartridge mounting portion simply and positively. Especially, due to the fact that the lower end portion of a spool disposed within the film cartridge is loaded into the head portion of a reel and also the upper end portion of the spool is rotatably held by a spool holding member, a relatively long spool can be held in an excellent way and the feeding of the film from the film cartridge can be executed smoothly. Further, because the film cartridge is stored in such a manner that it is floated a given amount within the cartridge holder, there is eliminated the possibility that the film cartridge and the reel may interfere with each other when the cartridge holder is opened and closed.

Also, according to the invention, when a magnetically recordable and reproduceable film is used, there is eliminated the need to execute the repetitive film feeding in the forward and reverse direction, so that the magnetic recording and reproduction of the film can be executed when the frames of the film are fed, and the film feeding speed can be kept at a constant level by a simple structure for excellent magnetic recording and reproduction.

Further, according to the invention, due to the fact that a developed still photo film is bent in an S shape or a Z shape and is guided by film guide members respectively disposed in the entrance and outlet sides of an image pickup area, the film can be flattened without giving a great tension to the film and the taking lens can be focused over the whole of one frame. Also, due to the fact that a developed still photo film to be fed by film feeding means is guided by a guide roller which can contact at least the image surface of the film, there is eliminated the possibility that a striped damage may occur on the film during the film feeding. Further, since the guide means is disposed in such a manner that it extends from the film entrance and outlet opening of a film storage part toward a take-up shaft, when the film is sent out from the film cartridge, the leading end of the film can be guided positively to the take-up side of the take-up shaft, thereby allowing automatic winding of the film from the film cartridge. Moreover, due to the fact that, all the time while the film is being loaded between a supply reel and a take-up reel, braking is always given to the supply and take-up reels simultaneously, the film can be always maintained in a proper tension to thereby prevent the film from being flexed or the reel against loosened winding. In particular, by applying soft braking to the reel side to be driven by reel drive means as well, the flexed film and loosened winding can be prevented even when the reel to be driven by oscillating gear mechanism or the like is switched. Also, when the feeding of the film is stopped while the film is being loaded between the supply and take-up reels, full brake is applied to the supply and take-up reels, so that the flexed film and loosened winding can be prevented during the stop of the film feeding as well.

Moreover, according to the invention, because the repeated detection of the same frame by the frame detect means is nullified, the film can be fed positively to the next frame irrespective of the scan position prior to the frame feeding. Also, the proper and selective use of two oscillating gear mechanisms having different reduction ratios from each other enables the rotary speed of the supply or take-up reel to be changed over a range changeable according to a voltage to be applied to the reel motor. Due to this, the film feeding speed can be changed, for example, on the order of 22–23 times and thus the film feeding ranging from the high speed film feeding necessary for the fast feeding of the film and the like to the low speed feeding necessary for the scan feeding of the film image can be realized by a single motor. Further, since the supply reel can be rotated in the reverse direction as well by fixing the oscillating gear mechanism unrotatable, the film can be sent out from the film cartridge by use of the oscillating gear mechanism.

In addition, according to the invention, due to the fact that an image signal previously stored in a set image memory is output to a video monitor in place of an image signal from image pickup means when a film is not set, it is possible to visually confirm from the display image on the video monitor whether a film is set or not in the image pickup area, and when the film is not set, it is possible to prevent output of an image which is of no sense. Also, because it can be automatically checked whether a developed still photo film is a negative film or a positive film and the image can be processed according to the results checked, a normal image can be automatically reproduced on the video monitor whether the film used is a negative film or a positive film. Further, since the degrees of fading of the respective colors R, G, B of the film can be automatically decided and the respective R, G, B image signals can be corrected according to the degrees of fading before they are output to the video monitor, the film image of the developed still photo film can always be reproduced in a non-faded condition even if the film image is actually faded.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film cartridge to be returned by a photofinishing laboratory, said film cartridge comprising:

developed continuous photo film;

a cartridge main body for housing said photo film therein, said cartridge body having a cylindrical inner periphery and an outlet opening to send out said photo film, said outlet opening extending out in a direction tangent to the inner periphery of said film cartridge main body;

a single spool rotatably provided in said cartridge main body, and having one end of said photo film affixed thereto in the longitudinal direction thereof, said photo film being wound around said single spool;

an IC memory installed in said cartridge main body; and wherein said film cartridge is capable of containing said photo film by winding the entire photo film around said spool, and said spool, around which said photo film is wound, is rotated in a direction reverse to a winding direction to thereby feed said photo film from said film cartridge, wherein said photo film is provided with one of holes and notches respectively formed in each frame of said photo film for respectively indicating a position of each frame, and wherein said film cartridge main body is provided with a display part for indicating whether said photo film has been developed.

2. A film cartridge to be returned by a photofinishing laboratory, said film cartridge comprising:

developed continuous photo film;

a cartridge main body for housing said photo film therein, said cartridge body having a cylindrical inner periphery and an outlet opening to send out said photo film, said outlet opening extending out in a direction tangent to the inner periphery of said film cartridge main body;

a single spool rotatably provided in said cartridge main body, and having one end of said photo film affixed thereto in the longitudinal direction thereof, said photo film being wound around said single spool;

an IC memory installed in said cartridge main body; and wherein said film cartridge is capable of containing said photo film by winding the entire photo film around said spool, and said spool, around which said photo film is wound, is rotated in a direction reverse to a winding direction to thereby feed said photo film from said film cartridge, and wherein said photo film is coated with a magnetic recording layer which is capable of recording information on said photo film.

3. A film cartridge to be returned by a photofinishing laboratory, said film cartridge comprising:

developed continuous photo film;

a cartridge main body for housing said photo film therein, said cartridge body having a cylindrical inner periphery and an outlet opening to send out said photo film, said outlet opening extending out in a direction tangent to the inner periphery of said film cartridge main body;

a single spool rotatably provided in said cartridge main body, and having one end of said photo film affixed thereto in the longitudinal direction thereof, said photo film being wound around said single spool;

an IC memory installed in said cartridge main body; and wherein said film cartridge is capable of containing said photo film by winding the entire photo film around said spool, and said spool, around which said photo film is wound, is rotated in a direction reverse to a winding direction to thereby feed said photo film from said film cartridge, and wherein said photo film is provided with one of holes and notches respectively formed in each frame of said photo film for respectively indicating a position of each frame.

4. A film cartridge to be returned by a photofinishing laboratory, said film cartridge comprising:

developed continuous photo film;

a cartridge main body for housing said photo film therein, said cartridge body having a cylindrical inner periphery and an outlet opening to send out said photo film, said outlet opening extending out in a direction tangent to the inner periphery of said film cartridge main body;

a single spool rotatably provided in said cartridge main body, and having one end of said photo film affixed thereto in the longitudinal direction thereof, said photo film being wound around said single spool;

an IC memory installed in said cartridge main body; and wherein said film cartridge is capable of containing said photo film by winding the entire photo film around said spool, and said spool, around which said photo film is wound, is rotated in a direction reverse to a winding direction to thereby feed said photo film from said film cartridge, and wherein said film cartridge main body is provided with a display part for indicating whether said photo film has been developed.

* * * * *

UNITED STATES PATENT AND TRADEMARK OFFICE
CERTIFICATE OF CORRECTION

PATENT NO. : 6,278,484 B1  Page 1 of 1
DATED : August 21, 2001
INVENTOR(S) : Shigenori Oosaka, Katuo Asami, Hitoshi Yozawa, Kazuo Ikari, Takeshi Misawa and Nakao Oi et al.

It is certified that error appears in the above-identified patent and that said Letters Patent is hereby corrected as shown below:

<u>Title page,</u>
Item [30], Foreign Application Priority Data, please add -- Apr. 30, 1991 (JP) 3-98983 --.

Signed and Sealed this

Eleventh Day of June, 2002

*Attest:*

*Attesting Officer*

JAMES E. ROGAN
*Director of the United States Patent and Trademark Office*